United States Patent
Lorito et al.

(10) Patent No.: US 11,019,825 B2
(45) Date of Patent: Jun. 1, 2021

(54) PRODUCT

(71) Applicant: ALPHA BIOPESTICIDES LIMITED, Cambridge (GB)

(72) Inventors: Matteo Lorito, Naples (IT); Alfeo Vecchi, Reggio Emilia (IT)

(73) Assignee: Alpha Biopesticides Limited, Cambridge (GB)

( * ) Notice: Subject to any disclaimer, the term of this patent is extended or adjusted under 35 U.S.C. 154(b) by 0 days.

(21) Appl. No.: 15/576,932

(22) PCT Filed: May 27, 2016

(86) PCT No.: PCT/GB2016/051560
§ 371 (c)(1),
(2) Date: Nov. 27, 2017

(87) PCT Pub. No.: WO2016/189329
PCT Pub. Date: Dec. 1, 2016

(65) Prior Publication Data
US 2018/0146683 A1    May 31, 2018

(30) Foreign Application Priority Data
May 27, 2015 (GB) ..................... 1509055

(51) Int. Cl.
*A01N 63/30* (2020.01)
*A01N 37/02* (2006.01)
*A01N 37/06* (2006.01)
*A01N 43/36* (2006.01)

(52) U.S. Cl.
CPC ............. *A01N 63/30* (2020.01); *A01N 37/02* (2013.01); *A01N 37/06* (2013.01); *A01N 43/36* (2013.01)

(58) Field of Classification Search
None
See application file for complete search history.

(56) References Cited

U.S. PATENT DOCUMENTS

| | | | |
|---|---|---|---|
| 5,173,419 A | 12/1992 | Harman et al. | |
| 5,190,754 A | 3/1993 | Sztejnberg | |
| 5,326,561 A | 7/1994 | Harman et al. | |
| 6,174,920 B1 | 1/2001 | Hicks et al. | |
| 6,251,390 B1 | 6/2001 | Harman et al. | |
| 6,512,166 B1 | 1/2003 | Harman et al. | |
| 10,017,795 B2 * | 7/2018 | Chandran | C12M 23/58 |
| 10,299,484 B2 * | 5/2019 | Eiben | A01N 63/30 |
| 2006/0021470 A1 * | 2/2006 | Lorito | A01N 37/02 75/710 |
| 2009/0104165 A1 | 4/2009 | Lorito et al. | |
| 2015/0167035 A1 * | 6/2015 | Chandran | C12M 23/58 435/134 |
| 2018/0146683 A1 * | 5/2018 | Lorito | A01N 37/02 |
| 2018/0352816 A1 * | 12/2018 | Leonardi | A01N 37/02 |
| 2020/0008426 A1 * | 1/2020 | Goertz | A01N 25/34 |

FOREIGN PATENT DOCUMENTS

| | | |
|---|---|---|
| CN | 101036458 A2 | 9/2007 |
| EP | 1886570 A2 | 2/2008 |
| EP | 2735607 A1 | 5/2014 |
| WO | 9219104 A2 | 11/1992 |
| WO | 9417667 A1 | 8/1994 |
| WO | 9424271 A1 | 10/1994 |
| WO | 2004089831 A2 | 10/2004 |
| WO | 2005112880 A2 | 12/2005 |
| WO | 2008062413 A2 | 5/2008 |
| WO | 2015069708 A1 | 5/2015 |
| WO | WO-2016189329 A1 * | 12/2016 ............. A01N 37/02 |

OTHER PUBLICATIONS

Lui et al, Mycopathologia, 2008, 166:93-102. published online:Apr. 29, 2008 (Year: 2008).*
Mehta et al. Compost Science and Utilization, 2016, 24/2:105-116. (Year: 2016).*
Huo et al, Biotechnol. Lett., 2012, 34:925-933. published online: Feb. 1, 2012 (Year: 2012).*
Marra et al, J. Agricultural and Food Chemistry. 2019, 67:1814-1822. published Jan. 18, 2019 (Year: 2019).*
Stadler et al. (1994) Planta Medica, 60(2) 128-132.
Butt et al. (2000) Pesticide outlook 186-191.
Harman (2006) Phytopathology, 96(2), 190-194.
Vinale et al. (2006) Letters in Applied Microbiology 43, 143-148.
Liu S. et al., Mycopathologia (2008) 166:93-102.
Reino et al. (2008) Phytochemistry Reviews 7(1) 89-123.
Yang et al.(2010), World Journal of Microbiology and Biotechnology, 26(12) 2297-2302.
Pohl et al. (2011) "Antifungal free fatty acids: A Review" in Science against microbial pathogens: communicating current research and technological advances, pp. 61-71.
Vinale et al. (2014) The Open Mycology Journal 2014, 8, (Suppl-1, M5) 127-139.
Woo et al.(2014) The Open Mycology Journal 8, suppl-1, M4.
Gochev, et al., "Nutritive Medium Engineering Enhanced Production of Extracellular Lipase by Trichoderma Longibrachiatum", Biotechnology & Biotechnological Equipment, vol. 26, No. 2, Apr. 16, 2014, 2875-2882.
Nelson, et al., "Enhancement of Trichoderma-Induced Biological Control of Pythium Seed Rot and Pre-Emergence Damping-Off of Peas", Soil Biology and Biochemistry, vol. 20, No. 2, 1988, 145-150.

* cited by examiner

*Primary Examiner* — Nita M. Minnifield
(74) *Attorney, Agent, or Firm* — Vos-IP, LLC

(57) ABSTRACT

The invention provides an agrochemical composition comprising: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens. Also provided is a method for controlling fungi or oomycetes at a locus, a method for promoting growth in a plant and a method for controlling nematodes at a locus.

9 Claims, 29 Drawing Sheets

PRODUCT

FIELD OF THE INVENTION

The present invention relates to agrochemical compositions and products, in particular agrochemical compositions for controlling fungi, oomycetes or nematodes, or for promoting growth. The invention also relates to a method of controlling fungi or oomycetes at a locus, a method of protecting a plant against fungi or oomycetes, a method for promoting growth in a plant, and a method for protecting a plant against nematodes. Use of the compositions of the invention is also described.

BACKGROUND OF THE INVENTION

Fungi can cause substantial damage to crops leading to significant losses in yield and quality. Oomycetes are fungus-like organisms which can also damage plants and crops. Fungicides are the primary mechanism through which fungal infections are controlled in agriculture, either through prevention or treatment of fungal infections in crops. Fungicides are therefore of great importance in agriculture. However, as with many agrochemicals, there are concerns as to the environmental impact of the use of fungicides, and particularly synthetic small molecule fungicides. For instance, some fungicides are believed to cause damage to non-target species and beneficial animals such as bees. There is an increasingly greater emphasis of development of fungicides with a reduced risk to the environment.

A wide variety of different types of agent have previously been described for use as fungicides. Examples include kelp, cinnamaldehyde, milk, naturally occurring oils (such as tea tree oil, cinnamon essential oil, citronella oil, jojoba oil, neem oil, oregano oil, rosemary oil—see e.g. U.S. Pat. No. 6,174,920), fatty acids (see e.g. Liu S. et al., Mycopathologia (2008) 166:93-102) and bacterium (such as *Bacillus subtilis*), other fungi (such as *Ulocladium oudemansii*, species of the genus *Trichoderma*, and *Ampelomyces quisqualis*—see e.g. Phytopathology, Vol 96, No. 2, 2006 and U.S. Pat. No. 5,190,754), metabolites of other fungi (such as Monocerin).

Improved agrochemical compositions and products are sought, particularly environmentally-acceptable agrochemical products which nevertheless have high efficacy.

SUMMARY OF THE INVENTION

The inventors have surprisingly found that the combination of fatty acids (and derivatives thereof) and a species of fungus or oomycete, or metabolite thereof, which species or metabolite directly or indirectly (i) inhibits the growth or reproduction of plant pathogens or (ii) kills plant pathogens, produces highly effective agrochemical compositions and products, particularly as regards antifungal activity. This is unexpected. The effect is observed in particular for species or metabolites of fungi of the genus *Trichoderma*. Although fatty acids and fungal species (e.g. *Trichoderma* spp.) are each known to have fungicidal activity, one may have expected any antifungal activity of a fungal species or metabolite to be inhibited by the presence of an antifungal fatty acid. However, the inventors have found that fungi such as *Trichoderma* spp. can be tolerant to fatty acids leading to agrochemical compositions which make use of the combined efficacy of fatty acids (and derivatives thereof) and a strain, culture, culture filtrate, spores (i.e. conidiospores, chlamydospores, ascospores, zoospores etc.) or mycelia of a species of a fungus or oomycete (fungus-like organism), or a metabolite produced by a species of a fungus or oomycete, which strain, culture, culture filtrate, spores, mycelia, or metabolite directly or indirectly (i) inhibits the growth or reproduction of plant pathogens or (ii) kills plant pathogens. An effective combination has in particular been observed for the combination of fatty acids with *Trichoderma* spp. or *Trichoderma* metabolites.

The invention provides an agrochemical composition comprising:
  (a) one or more fatty acids or derivatives thereof; and
  (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

The invention also provides an agrochemical product comprising: (a) one or more fatty acids or derivatives thereof as defined herein; and (b) a strain, culture, culture filtrate, spores or mycelia of a species of a fungus or oomycete or a metabolite produced by a species of a fungus or oomycete as defined herein; wherein components (a) and (b) are formulated for simultaneous or separate treatment of a locus.

Also provided is a method for controlling fungi or oomycetes at a locus, which method comprises treating the locus simultaneously or sequentially with: (a) one or more fatty acids or derivatives thereof as defined herein; and (b) a strain, culture, culture filtrate, spores or mycelia of a species of a fungus or oomycete or a metabolite produced by a species of a fungus or oomycete as defined herein.

The invention further provides a method for protecting a plant against fungi or oomycetes, which method comprises treating part or all of the plant itself, the seed from which the plant grows, or the place at which the plant grows, simultaneously or separately with: (a) one or more fatty acids or derivatives thereof as defined herein; and (b) a strain, culture, culture filtrate, spores or mycelia of a species of a fungus or oomycete or a metabolite produced by a species of a fungus or oomycete as defined herein.

Further provided by the invention is a method for promoting growth in a plant, which method comprises treating part or all of the plant itself, the seed from which the plant grows, or the place at which the plant grows, simultaneously or separately with: (a) one or more fatty acids or derivatives thereof as defined herein; and (b) a strain, culture, culture filtrate, spores or mycelia of a species of a fungus or of a oomycete or a metabolite produced by a species of a fungus or oomycete as defined herein.

The invention also provides a method for controlling nematodes at a locus, which method comprises treating the locus simultaneously or sequentially with: (a) one or more fatty acids or derivatives thereof as defined herein; and (b) a strain, culture, culture filtrate, spores or mycelia of a species of a fungus or oomycete or a metabolite produced by a species of a fungus or oomycete as defined herein.

The invention further provides a method for protecting a plant against nematodes, which method comprises treating part or all of the plant itself, the seed from which the plant grows, or the place at which the plant grows, simultaneously or separately with: (a) one or more fatty acids or derivatives thereof as defined herein; and (b) a strain, culture, culture filtrate, spores, mycelia of a species of a fungus or oomycete or a metabolite produced by a species of a fungus or oomycete as defined herein.

The invention also provides a process for producing a crop product, which process comprises cultivating a plant, wherein part or all of the plant itself, the seed from which the plant grows, or the place at which the plant grows, is treated simultaneously or separately with: (a) one or more fatty acids or derivatives thereof as defined herein; and (b) a strain, culture, culture filtrate, spores or mycelia of a species of a fungus or oomycete or a metabolite produced by a species of a fungus or oomycete as defined herein.

Figure 1:
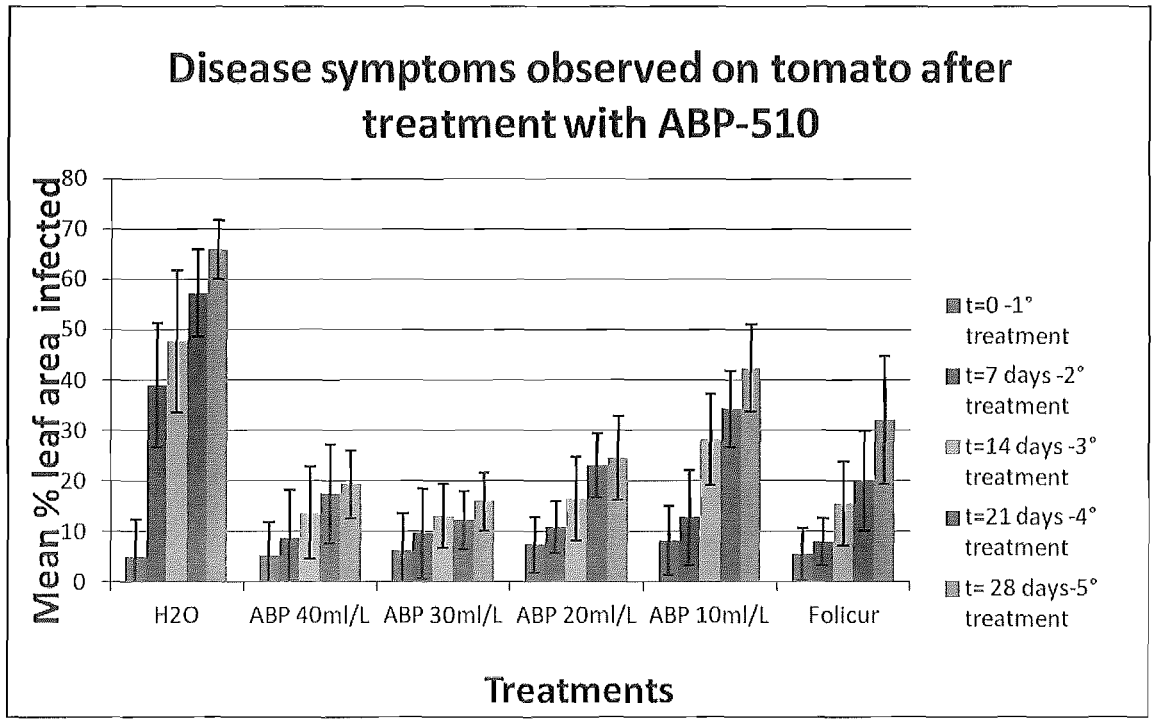
FIG. 1 shows the percentage of tomato leaf area affected by powdery mildew after treatment with ABP-510 (fatty acid product).

Where a figure contains a two dimensional bar chart, within in each group (or pair) of adjacent bars, the ordering of the individual bars as viewed from left to right corresponds to the ordering in the key as viewed from top to bottom.

DETAILED DESCRIPTION OF THE INVENTION

Composition

The invention provides an agrochemical composition comprising: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

Typically, component (b) is a strain, culture, culture filtrate, spores or mycelia of a species of a fungus, or a metabolite produced by a species of a fungus. The spores may be conidiospores, chlamydospores, ascospores or zoospores.

Fungal Component

The species of fungus or oomycete may be selected from a number of different species, provided the species or derivative thereof (i.e. strain, culture, culture filtrate, spores, mycelia, or metabolite of the species) directly or indirectly (i) inhibits the growth or reproduction of plant pathogens or (ii) kills plant pathogens. The skilled person can readily identify which fungal or oomycete species fulfill this requirement by performing simple tests, for instance by treating a plant pathogen with the species or derivative thereof and observing inhibition of growth or reproduction or death of the pathogen. Often, the species of fungus or oomycete or derivative thereof directly or indirectly kills plant pathogens. The species of fungus or oomycete should generally be one which the fatty acid component does not prevent from exerting its desired effect in the relevant context. Again, this can be readily determined by simple tests, for instance by treating the species with the fatty acids and monitoring the effect of the fatty acid on the activity of the species.

The use of the fungal or oomycete component in the present invention is advantageous because it enables methods for controlling fungi or oomycetes responsible for crop diseases in a manner which is not seen as environmentally damaging.

Examples of preferred species of fungus or oomycetes (and a strain, culture, culture filtrate, spores, mycelia, or metabolites thereof) include species of genus *Trichoderma*, *Fusarium*, *Pythium*, *Gliocladium*, *Candida*, *Coniothyrium*, *Ampelomyces*, *Cryptococcus*, *Verticillium*, *Metarhizium*, *Beauveria*, *Paecilomyces* or *Lagenidium*.

For instance, the fungal or oomycete species (typically a fungal species) may be of the genus *Trichoderma*, *Fusarium*, *Pythium*, *Gliocladium*, *Candida*, *Coniothyrium*, *Ampelomyces* or *Cryptococcus*. Preferably, the species of a fungus is a species of the genus *Trichoderma*. Thus, the composition preferably comprises a strain, culture, culture filtrate, spores or mycelia of a species of a fungus of the genus *Trichoderma*, or a metabolite produced by a species of a fungus of the genus *Trichoderma*, which strain, culture, culture filtrate, spores, mycelia or metabolite directly or indirectly (i) inhibits the growth or reproduction of plant pathogens or (ii) kills plant pathogens. The spores may be conidiospores or chlamydospores.

The species of genus *Trichoderma* may be selected from *Trichoderma aggressivum*, *Trichoderma amazonicum*, *Trichoderma asperellum*, *Trichoderma atroviride*, *Trichoderma aureoviride*, *Trichoderma austrokoningii*, *Trichoderma brevicompactum*, *Trichoderma candidum*, *Trichoderma caribbaeum* var. *aequatoriale*, *Trichoderma* caribbaeum var. caribbaeum, *Trichoderma catoptron, Trichoderma cremeum, Trichoderma ceramicum, Trichoderma cerinum, Trichoderma chlorosporum, Trichoderma chromospermum, Trichoderma cinnamomeum, Trichoderma citrinoviride, Trichoderma crassum, Trichoderma cremeum, Trichoderma dingleyeae, Trichoderma dorotheae, Trichoderma effusum, Trichoderma erinaceum, Trichoderma estonicum, Trichoderma fertile, Trichoderma gelatinosus, Trichoderma ghanense, Trichoderma hamatum, Trichoderma harzianum, Trichoderma narcissi, Trichoderma helicum, Trichoderma intricatum, Trichoderma konilangbra, Trichoderma koningii, Trichoderma koningiopsis, Trichoderma longibrachiatum, Trichoderma longipile, Trichoderma minutisporum, Trichoderma oblongisporum, Trichoderma ovalisporum, Trichoderma petersenii, Trichoderma phyllostahydis, Trichoderma piluliferum, Trichoderma pleuroticola, Trichoderma pleurotum, Trichoderma polysporum, Trichoderma pseudokoningii, Trichoderma pubescens, Trichoderma reesei, Trichoderma rogersonii, Trichoderma rossicum, Trichoderma saturnisporum, Trichoderma sinensis, Trichoderma sinuosum, Trichoderma songyi, Trichoderma sp. MA 3642, Trichoderma sp. PPRI 3559, Trichoderma spirale, Trichoderma stramineum, Trichoderma strigosum, Trichoderma stromaticum, Trichoderma surrotundum, Trichoderma taiwanense, Trichoderma thailandicum, Trichoderma thelephoricolum, Trichoderma theobromicola, Trichoderma tomentosum, Trichoderma velutinum, Trichoderma virens, Trichoderma viride,* and *Trichoderma viridescens.* Preferred species of the genus *Trichoderma* are *Trichoderma harzianum* and *Trichoderma virens.* Any strain of the species may be used. Preferred strains include *Trichoderma harzianum* T22, *Trichoderma harzianum* T39, *Trichoderma harzianum* M10, *Trichoderma harzianum* P101 and *Trichoderma virens* GV41.

In some cases, the composition may comprise strains of two different species of *Trichoderma,* for instance *T. virens* GV41 and *T. harzianum* M10.

The species of genus *Fusarium* may be selected from *Fusarium avenaceum, Fusarium bubigeum, Fusarium culmorum, Fusarium graminearum, Fusarium langsethiae, Fusarium oxysporum, Fusarium poae, Fusarium sporotrichioides, Fusarium tricinctum, Fusarium verticillioides* and *Fusarium virguliforme.*

The species of the genus *Pythium* may be selected from *Pythium acanthicum, Pythium acanthophoron, Pythium acrogynum, Pythium adhaerens, Pythium amasculinum, Pythium anandrum, Pythium angustatum, Pythium aphanidermatum, Pythium apleroticum, Pythium aquatile, Pythium aristosporum, Pythium arrhenomanes, Pythium attrantheridium, Pythium bifurcatum, Pythium boreale, Pythium buismaniae, Pythium butleri, Pythium campanulatum, Pythium canariense, Pythium capillosum, Pythium carbonicum, Pythium carolinianum, Pythium catenulatum, Pythium chamaehyphon, Pythium chondricola, Pythium citrinum, Pythium coloratum, Pythium conidiophorum, Pythium contiguanum, Pythium cryptoirregulare, Pythium cucurbitacearum, Pythium cylindrosporum, Pythium cystogenes, Pythium debaryanum, Pythium deliense, Pythium destruens, Pythium diclinum, Pythium dimorphum, Pythium dissimile, Pythium dissotocum, Pythium echinulatum, Pythium erinaceum, Pythium flevoense, Pythium folliculosum, Pythium glomeratum, Pythium graminicola, Pythium grandisporangium, Pythium guiyangense, Pythium helicandrum, Pythium helicoides, Pythium heterothallicum, Pythium hydnosporum, Pythium hypogynum, Pythium indigoferae, Pythium inflatum, Pythium insidiosum, Pythium intermedium, Pythium irregulare, Pythium iwayamae, Pythium jasmonium, Pythium kunmingense, Pythium litorale, Pythium longandrum, Pythium longisporangium, Pythium lutarium, Pythium macrosporum, Pythium mamillatum, Pythium marinum, Pythium marsipium, Pythium mastophorum, Pythium megacarpum, Pythium megalacanthum, Pythium middletonii, Pythium minus, Pythium monospermum, Pythium montanum, Pythium multisporum, Pythium myriotylum, Pythium nagaii, Pythium nodosum, Pythium nunn, Pythium oedochilum, Pythium okanoganense, Pythium oligandrum, Pythium ornacarpum, Pythium orthogonon, Pythium ostracodes, Pythium pachycaule, Pythium pachycaule, Pythium paddicum, Pythium paroecandrum, Pythium parvum, Pythium pectinolyticum, Pythium periilum, Pythium periplocum, Pythium perniciosum, Pythium perplexum, Pythium phragmitis, Pythium pleroticum, Pythium plurisporium, Pythium polymastum, Pythium porphyrae, Pythium prolatum, Pythium proliferatum, Pythium pulchrum, Pythium pyrilobum, Pythium quercum, Pythium radiosum, Pythium ramificatum, Pythium regulare, Pythium rhizo-oryzae, Pythium rhizosaccharum, Pythium rostratifingens, Pythium rostratum, Pythium salpingophorum, Pythium scleroteichum, Pythium segnitium, Pythium spiculum, Pythium spinosum, Pythium splendens, Pythium sterilum, Pythium stipitatum, Pythium sulcatum, Pythium sylvaticum, Pythium terrestris, Pythium torulosum, Pythium tracheiphilum, Pythium ultimum, Pythium ultimum* var. *ultimum, Pythium uncinulatum, Pythium undulatum, Pythium vanterpoolii, Pythium vexans, Pythium viniferum. Pythium violae, Pythium volutum, Pythium zingiberis*, and *Pythium zingiberum.*

The species of the genus *Gliocladium* may be selected from *Gliocladium catenulatum, Gliocladium virens, Gliocladium penicilloides, Gliocladium roseum* and *Gliocladium deliquescens.*

The species of the genus *Candida* may be selected from *Candida albicans, Candida ascalaphidarum, Candida amphixiae, Candida antarctica, Candida argentea, Candida atlantica, Candida atmosphaerica, Candida blattae, Candida bromeliacearum, Candida carpophila, Candida carvajalis, Candida cerambycidarum, Candida chauliodes, Candida corydali, Candida dosseyi, Candida dubliniensis, Candida ergatensis, Candida fructus, Candida glabrata, Candida fermentati, Candida guilliermondii, Candida haemulonii, Candida insectamens, Candida insectorum, Candida intermedia, Candida jeffresii, Candida kefyr, Candida keroseneae, Candida krusei, Candida lusitaniae, Candida lyxosophila, Candida maltosa, Candida marina, Candida membranifaciens, Candida milleri, Candida mogii, Candida oleophila, Candida oregonensis, Candida parapsilosis, Candida quercitrusa, Candida rugosa, Candida sake, Candida shehatea, Candida temnochilae, Candida tenuis, Candida theae, Candida tolerans, Candida tropicalis, Candida tsuchiyae, Candida sinolaborantium, Candida sojae, Candida subhashii, Candida viswanathii, Candida utilis, Candida ubatubensis,* and *Candida zemplinina.*

The species of the genus *Coniothyrium* may be selected from *Coniothyrium acaciae, Coniothyrium ampelopsidis-hederaceae, Coniothyrium bambusicola, Coniothyrium batumense, Coniothyrium boydeanum, Coniothyrium caespitulosum, Coniothyrium carpaticum, Coniothyrium celmisiae, Coniothyrium celtidis-australis, Coniothyrium cerealis, Coniothyrium clematidis-rectae, Coniothyrium coffeae, Coniothyrium concentricum, Coniothyrium conicola, Coniothyrium conoideum, Coniothyrium conorum, Coniothyrium crepinianum, Coniothyrium cupressacearum, Coniothyrium cydoniae, Coniothyrium dispersellum, Coniothyrium dracaenae, Coniothyrium equiseti, Coniothy-*

*rium ferrarisianum, Coniothyrium fluviatile, Coniothyrium fraxini, Coniothyrium genistae, Coniothyrium glomerulatum, Coniothyrium henriquesii, Coniothyrium ilicinum, Coniothyrium ilicis, Coniothyrium insitivum, Coniothyrium jasmini, Coniothyrium juniperi, Coniothyrium kallangurense, Coniothyrium lavandulae, Coniothyrium leguminum, Coniothyrium lignorum, Coniothyrium obiones, Coniothyrium olivaceum, Coniothyrium opuntiae, Coniothyrium palmarum, Coniothyrium palmicola, Coniothyrium palmigenum, C. phormii, Coniothyrium platani, Coniothyrium populinum, Coniothyrium psammae, Coniothyrium pteridis, Coniothyrium quercinum, Coniothyrium rhododendri, Coniothyrium rosarum, Coniothyrium sarothamni, Coniothyrium slaptoniense, Coniothyrium sphaerospermum, Coniothyrium tamaricis, Coniothyrium tamarisci, Coniothyrium terricola, Coniothyrium ulmeum* and *Coniothyrium wernsdorffiae*

The species of the genus *Ampelomyces* may be *Ampelomyces quisqualis*.

The species of the genus *Cryptococcus* may be *Cryptococcus laurentii, Cryptococcus albidus, Cryptococcus neoformans, Cryptococcus gattii, Cryptococcus unguttulatus, Cryptococcus adeliensis, cryptococcus aerius, Cryptococcus albidosimtilis, Cryptococcus antarticus, Cryptococcus aquaticusm, Cryptococcus ater, Cryptococcus bhutanensis, Cryptococcus consortionis, Cryptococcus curvatus, Cryptococcus phenolicus, Cryptococcus skinneri, Cryptococcus terreus* and *Cryptococcus vishniacci*.

In some cases a strain of the fungus or oomycete may be used. In some cases a culture of the fungus or oomycete may be used. In some cases a culture filtrate of the fungus or oomycete may be used. In some cases spores (e.g conidiospores, chlamydospores, ascospores or zoospores) of the fungus or oomycete may be used. In some cases mycelia of the fungus or oomycete may be used. In some cases a combination of spores and a culture filtrate of the fungus or oomycete may be used.

The species of a fungus may, for instance, be a species of the genus *Trichoderma* which is *T. harzianum* or *T. virens*, optionally wherein the strain of *T. harzianum* is T22, T39, M10 or P101, preferably P101, or the strain of *T. virens* is GV41. For instance, the composition may comprise spores of the strain of *T. harzianum* M10 or spores of the strain of *T. virens* GV41.

It has been found that secondary metabolites of the fungi described above may be particularly effective in combination with the fatty acid component. Synergystic improvements can be observed for this combination. Often, the composition comprises a secondary metabolite produced by a species of the genus *Trichoderma*. Secondary metabolites are those species which are produced by the fungus or oomycete but which are not directly and solely involved in the central growth, development or reproduction of the fungus or oomycete. Removal of secondary metabolites would not necessarily therefore result in immediate death of the fungus or oomycete. Secondary metabolites may be excreted by the fungus or oomycete to aid defence against other species. Secondary metabolites of a species of fungus or oomycete may be obtained by culturing the fungus or oomycete in an aqueous liquid and extracting secondary metabolites with an organic solvent, for instance ethyl acetate. The extract may then be evaporated and the resulting solids separated by chromatography.

Typically, when a secondary metabolite is used, the composition comprises a secondary metabolite produced by a species of the genus *Trichoderma* selected from harzianic acid, demethylharzianic acid, homoharzianic acid, 6-n-pentyl-6H-pyran-2-one, a hydrophobin, pachybasin, chrysophanol, emodin, 1,3,6,8-tetrahydroxyanthraquinone, 1-acetyl-2,4,5,7-tetrahydroxyanthraquinone, xanthone, 1-hydroxy-3-methylanthraquinone, 1,8-dihydroxy-3-methylanthraquinone, and compounds of the following formulae:

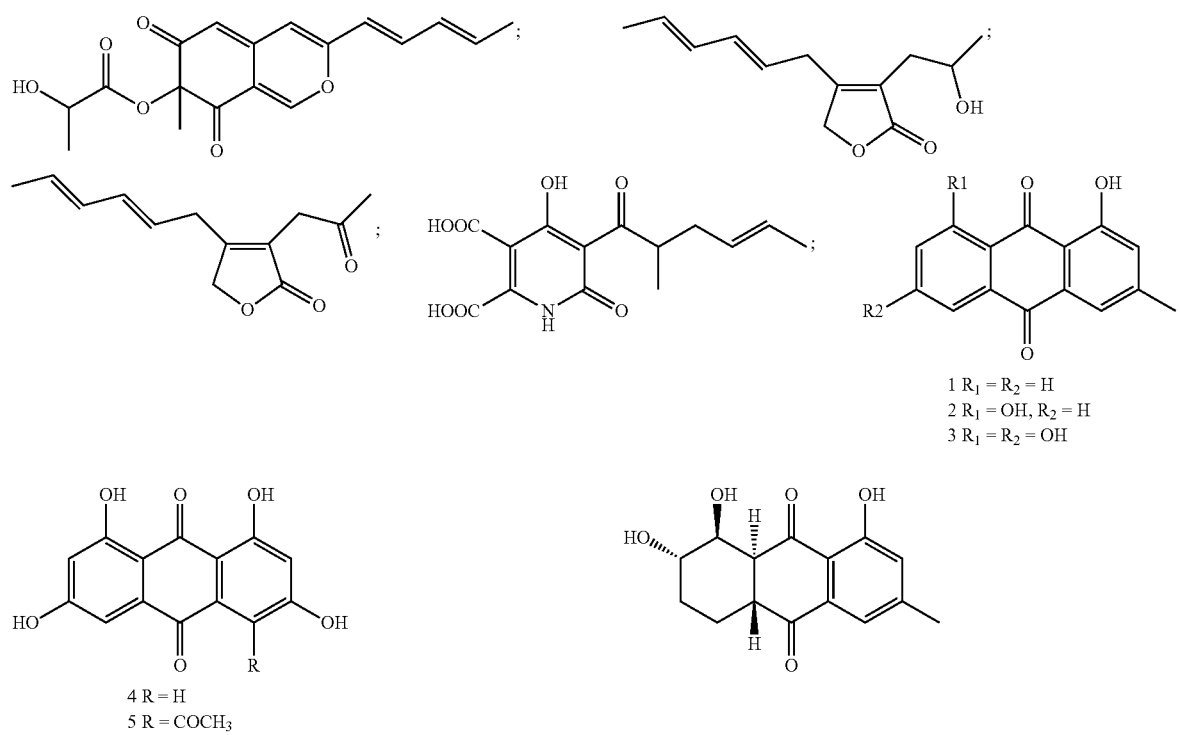

-continued
7
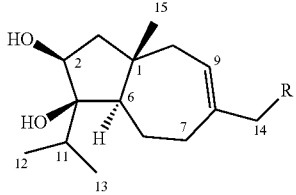
8 R = H
9 R = OCO(CH₂)₇CH=CH(CH₂)₇CH₃
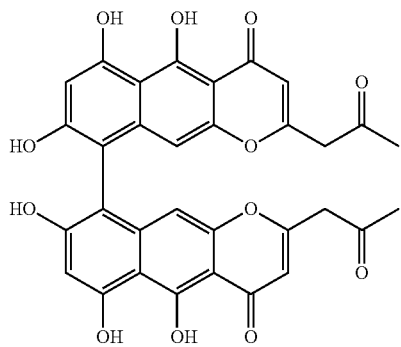
10
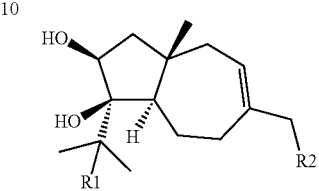
11 R1 = H, R2 = OH
12 R1 = R2 = OH
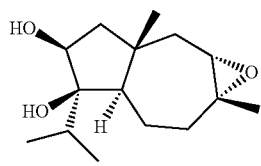
13
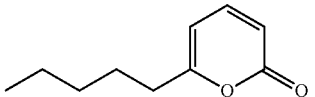
14
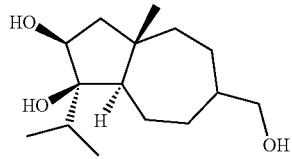
15
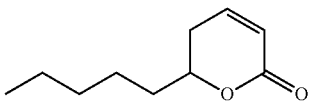
16
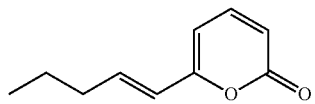
17
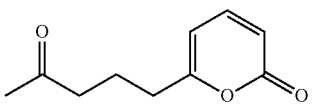
18
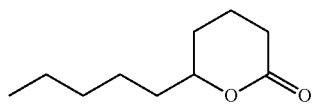
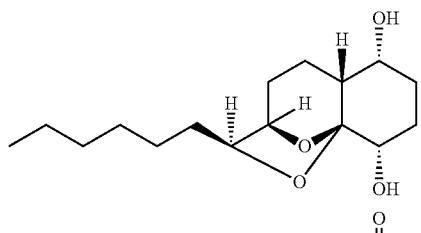
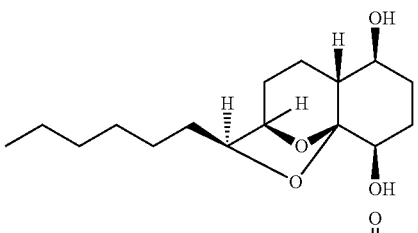
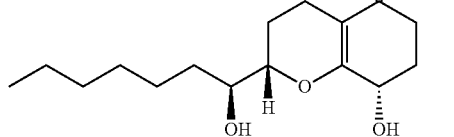
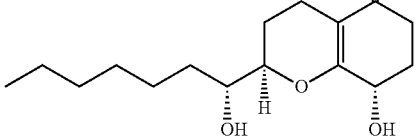
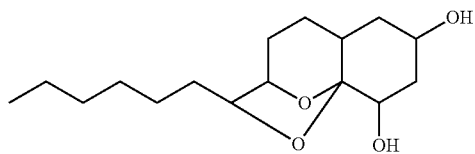
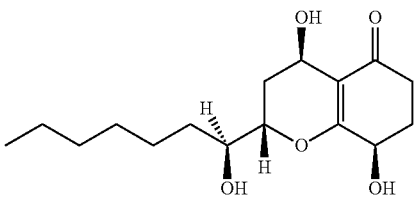

-continued
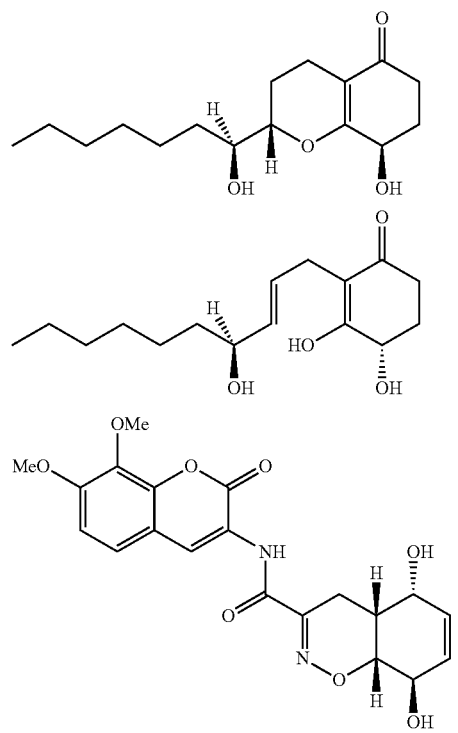
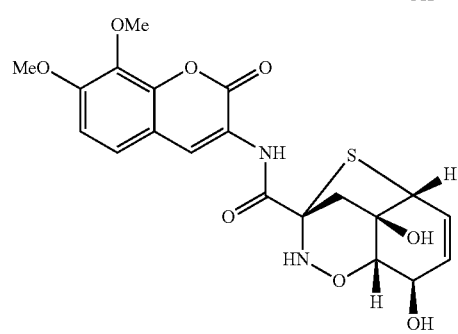
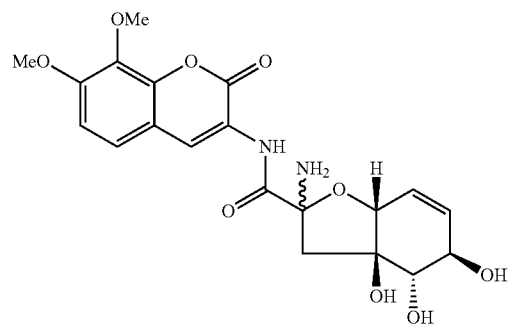
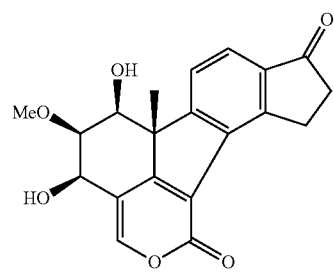
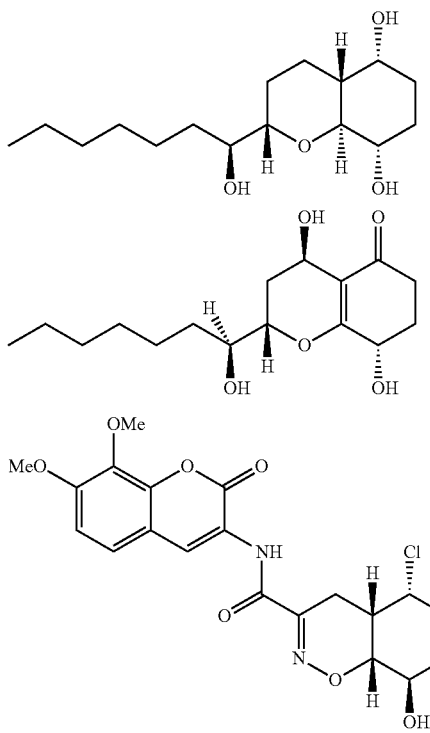
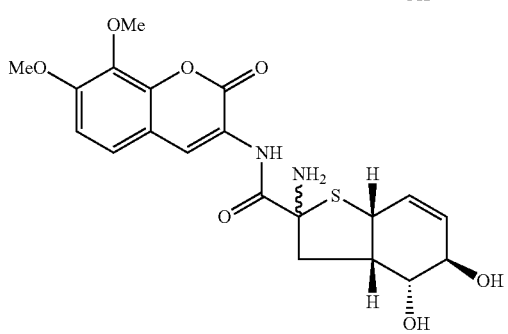
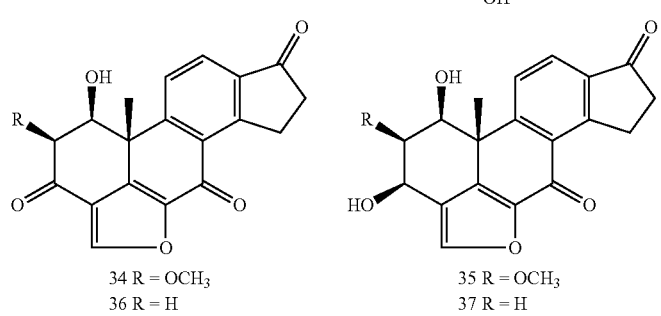
34 R = OCH$_3$
36 R = H
35 R = OCH$_3$
37 R = H
35a
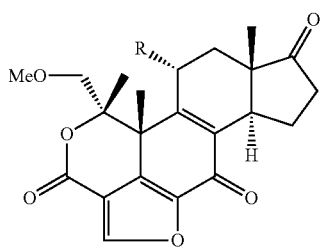
38 R = OAc
39 R = H -continued
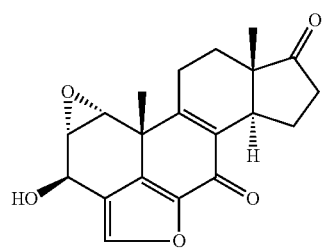
15
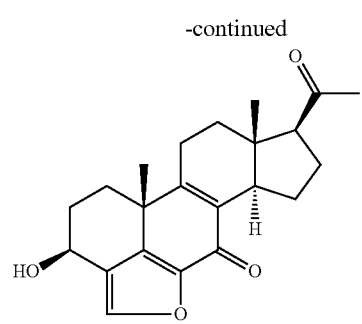
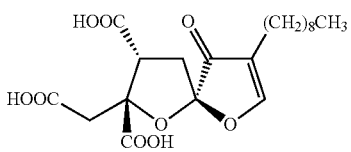
16
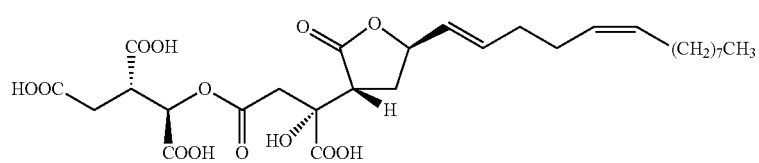
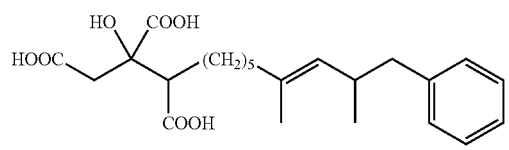
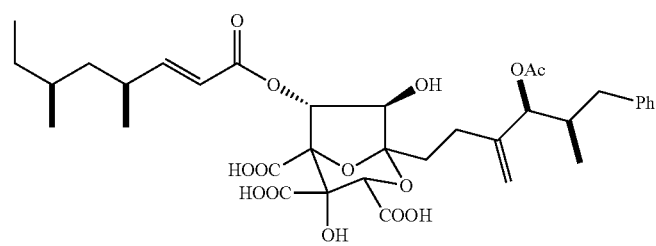
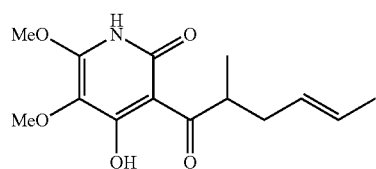
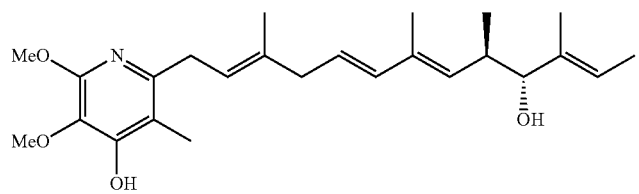
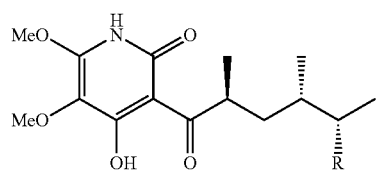
58 R = Cl
59 R = H
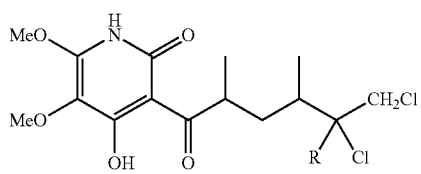
60 R = H
61 R = Cl
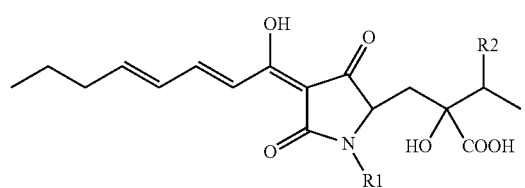
62 R1 = Me, R2 = Me
63 R1 = H, R2 = Me
64 R1 = Me, R2 = Et
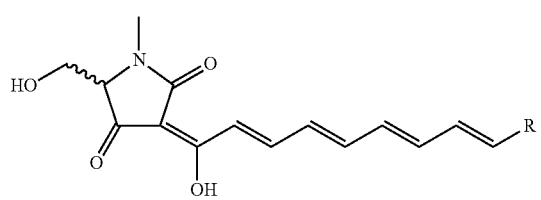
65 R = —CH=CH—COOH
66 R = —COOH -continued
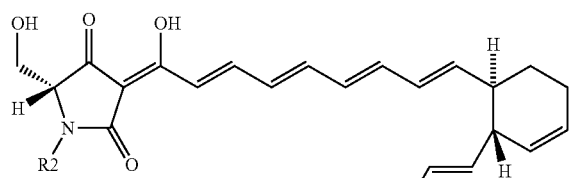
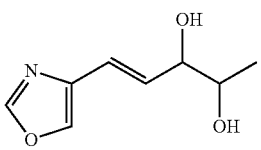
69
67 R1 = Me, R2 = H
68 R1 = R2 = Me
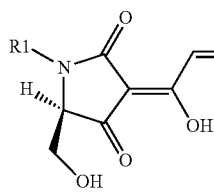
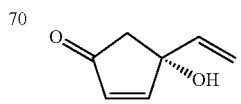
70
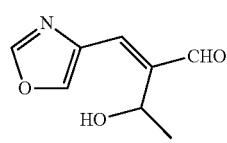
71
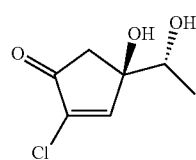
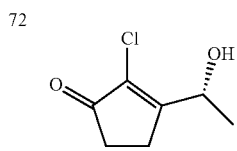
72
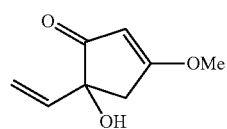
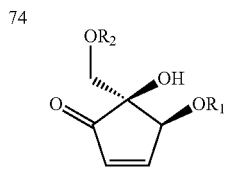
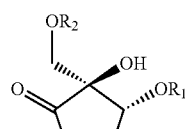
73
74
75 R1 = R2 H
76 R1 = Ac, R2 = H
77 R1 = H, R2 = Ac
78 R1 = R2 H
79 R1 = Ac, R2 = H
80 R1 = H, R2 = Ac
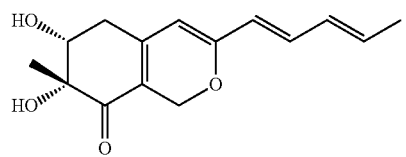
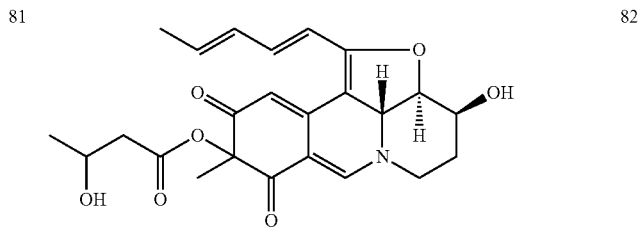
81
82
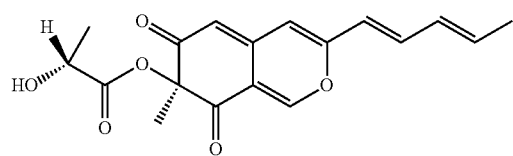
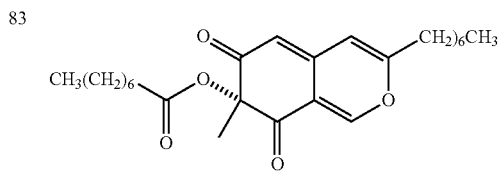
83
84
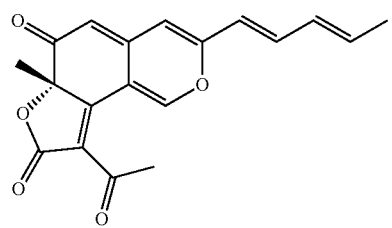
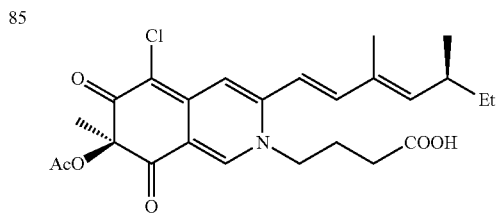
85
86

-continued
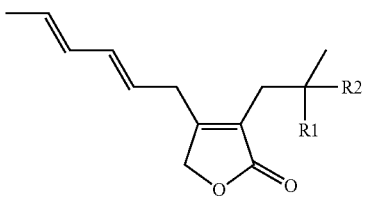
89 R1 = H, R2 = OH
91 R1, R2 = O
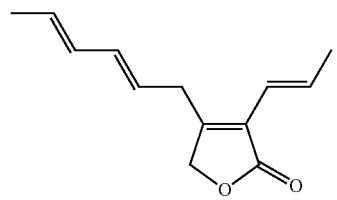
90
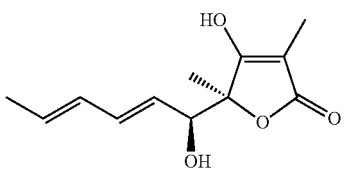
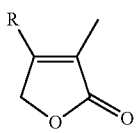
92
93 R = —(CH$_2$)$_3$CH(OH)CH$_3$
94 R = —(CH$_2$)$_4$CH(OH)CH$_2$CH$_3$
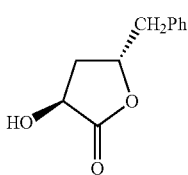
87
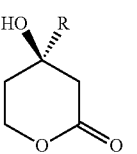
88 R = —CH=CH$_2$
88a R = Me
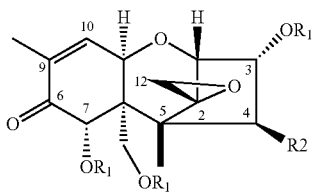
95 R1 = Ac, R2 = H
96 R1 = H, R2 = OH
99 R1 = R2 = H
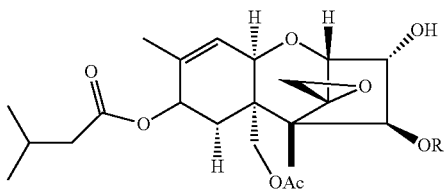
97 R = H
98 R = Ac
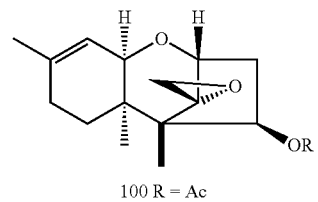
100 R = Ac
101 R = H
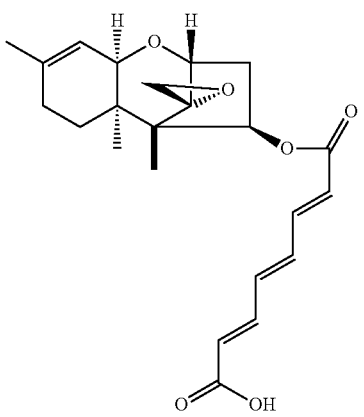
102
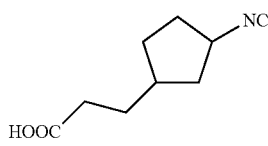
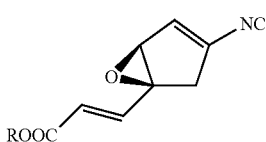
105 R = H
106 R = CH$^3$
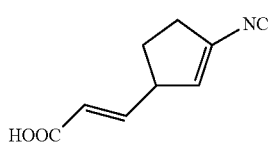
107

-continued
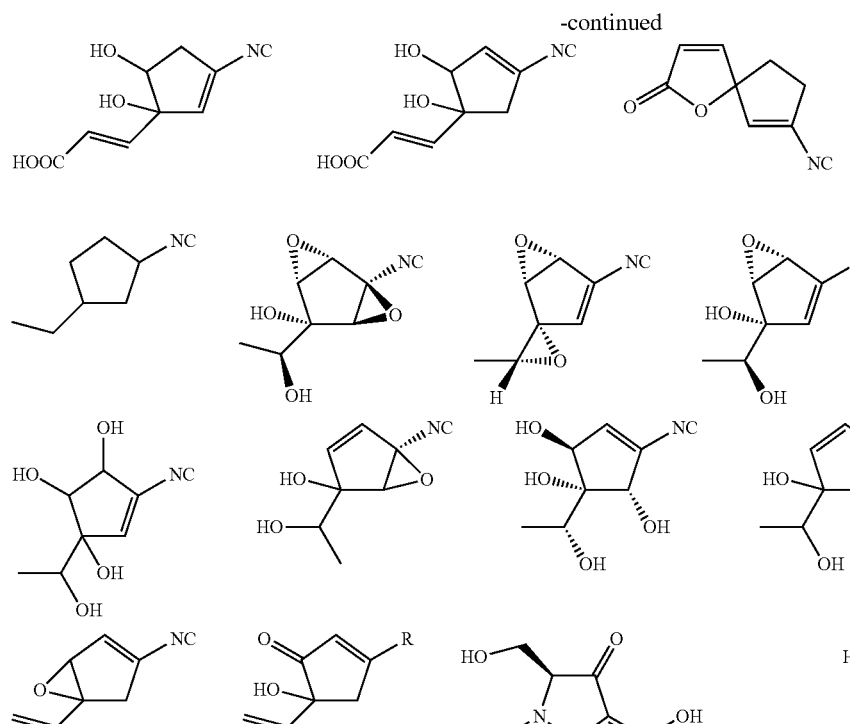
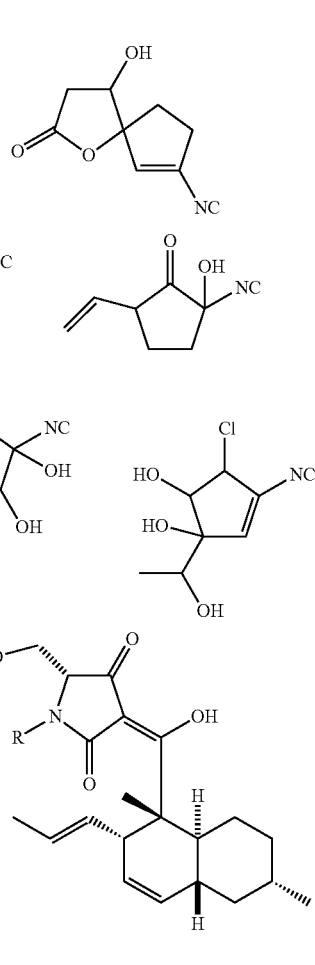
126 R = H
127 R = Me
122 R = NC
123 R = NH$_2$
124 R = NHCHO
125 R = N(CH$_3$)$_2$
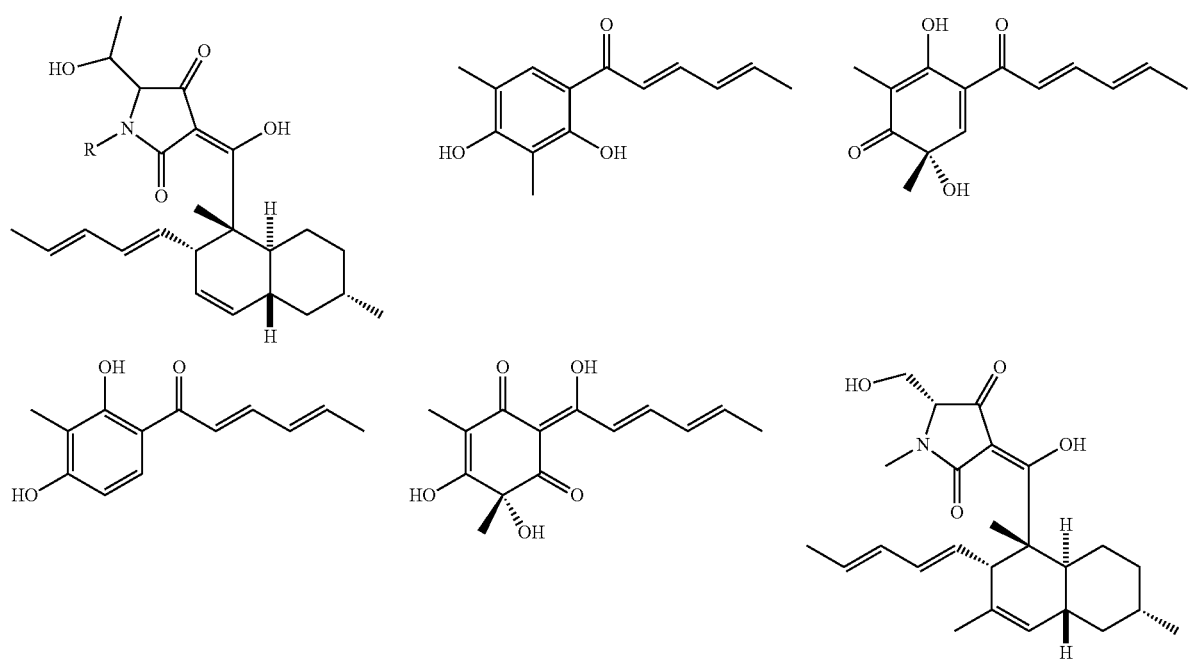

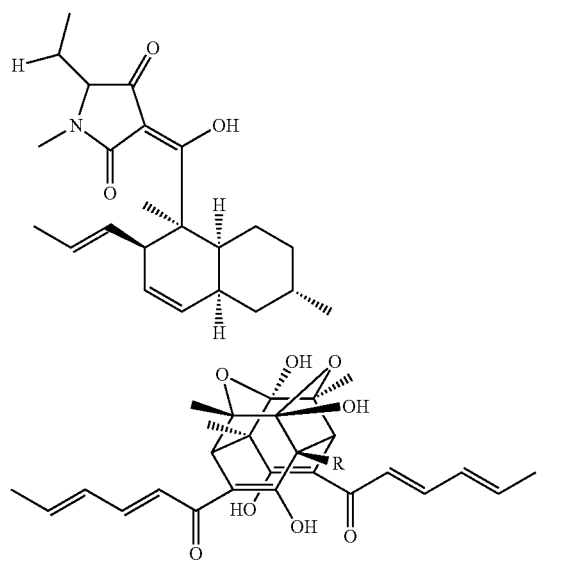
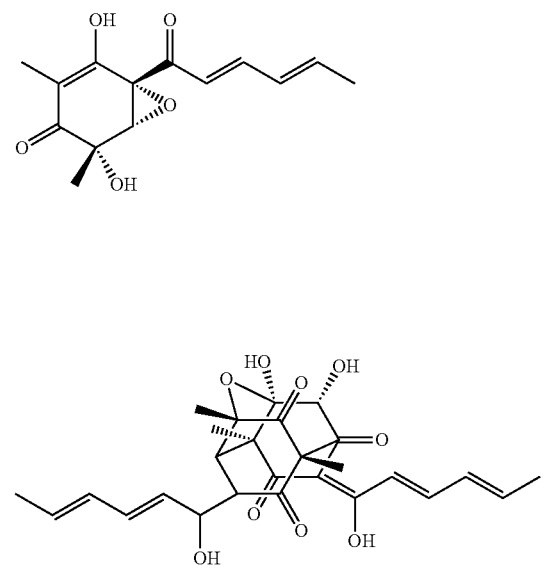
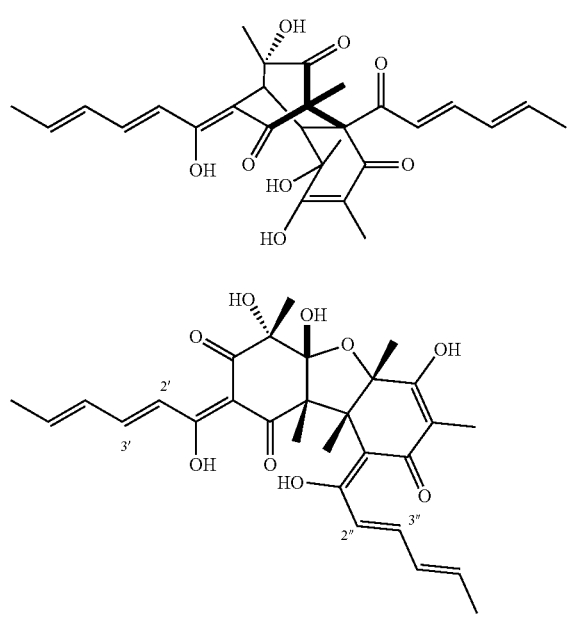
135 R = Me
136 R = H
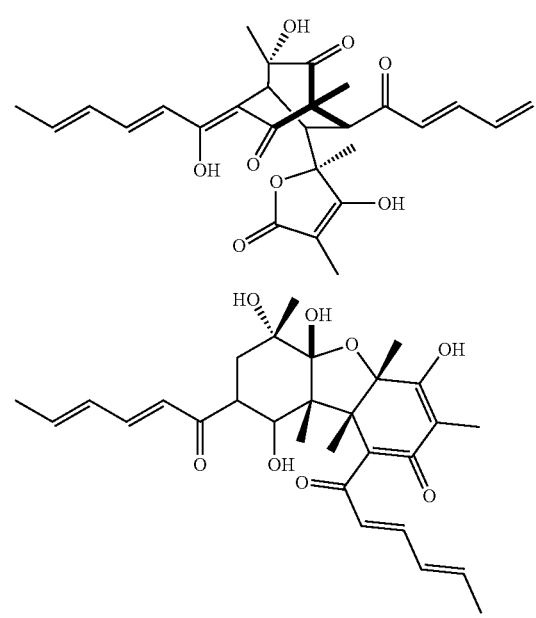
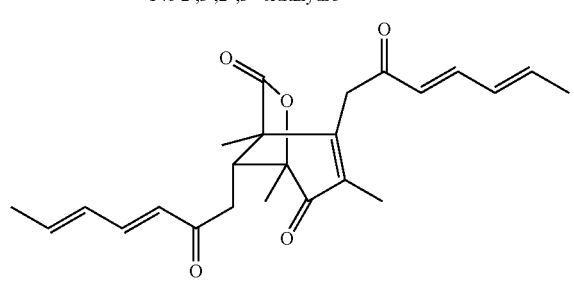
147 2′,3′-dihydro
148 2′,3′,2″,3″-tetrahydro
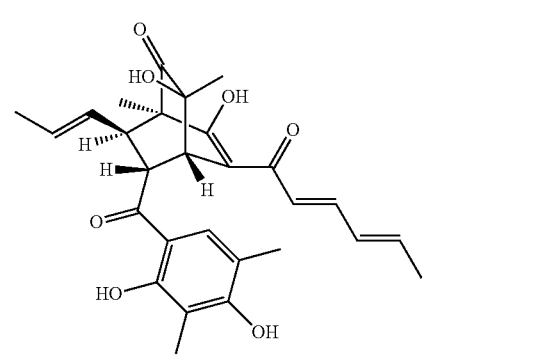

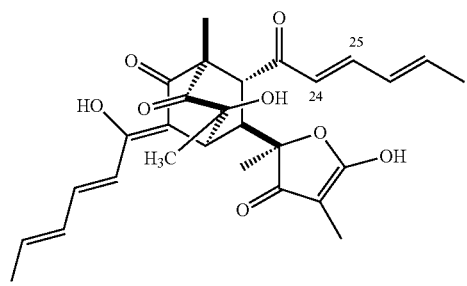
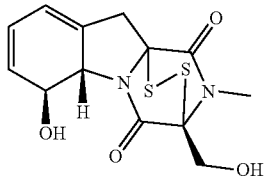
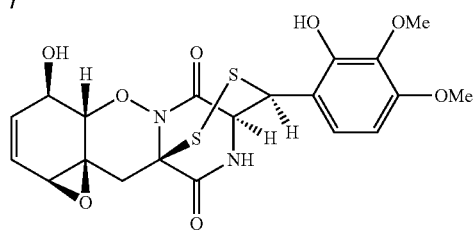
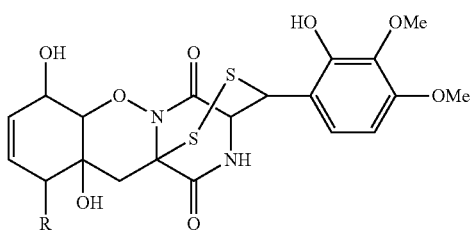
151a R = Cl
151b R = Br
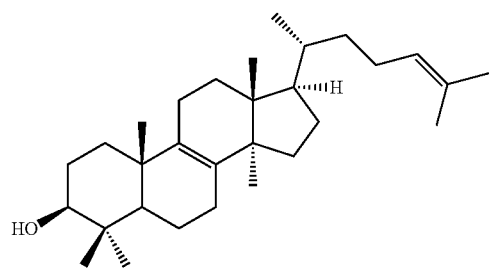
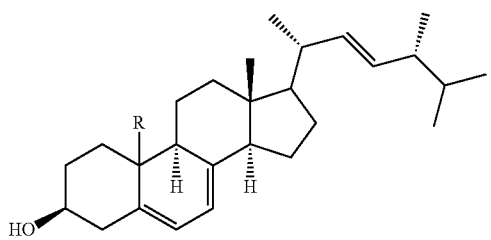
153 R = β-Me
154 R = α-Me
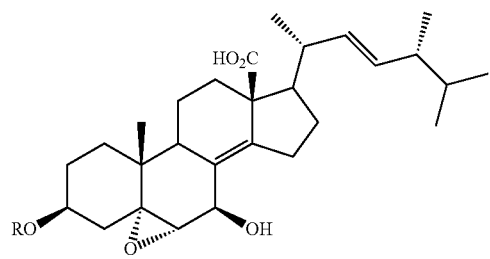
155 R = COCH(NH₂)CH(OSO₃H)CHMe₂
156 R = H
157 R = COC(NH₂)Me₂
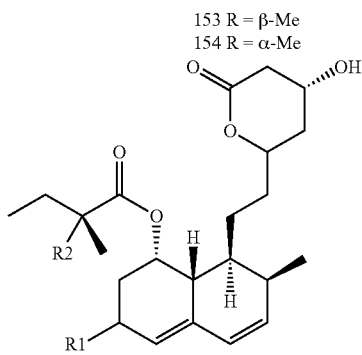
165 R1 = R2 = H
166 R1 = α-Me, R2 = H
167 R1 = R2 = α-Me
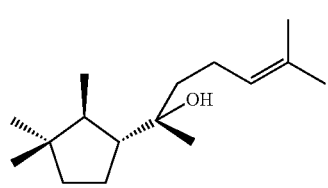
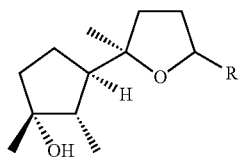
161
162 R = β-CMe₂OH
163 R = α-CMe₂OH
164
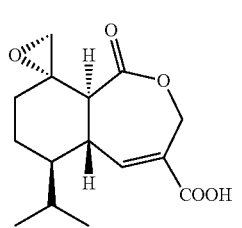
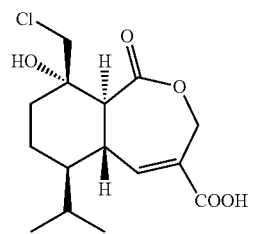

-continued
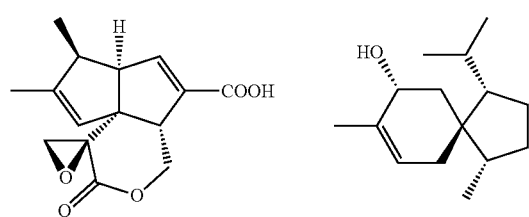
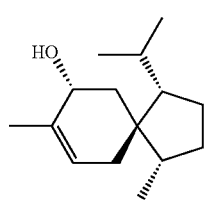
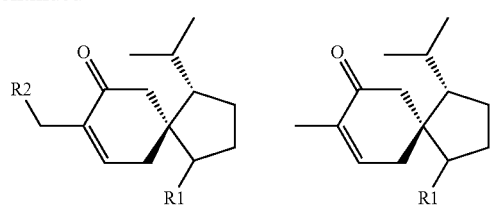
172 R1 = α-Me, R2 = OH
173 R1 = α-Me, R2 = OH
175 R1 = β-Me, R2 = H
174 R = α-Me
176 R = β-Me
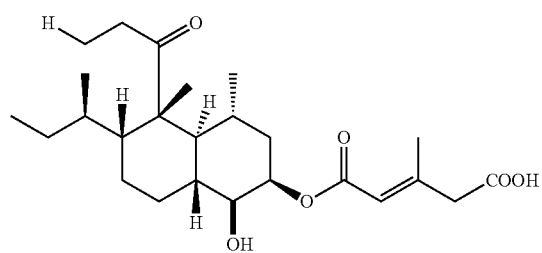
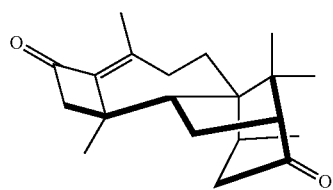
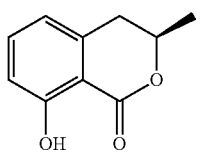
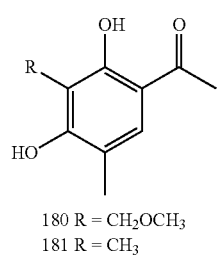
180 R = CH₂OCH₃
181 R = CH₃
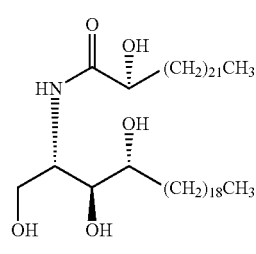
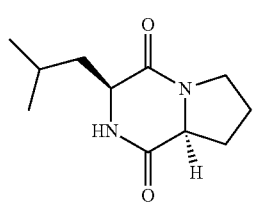
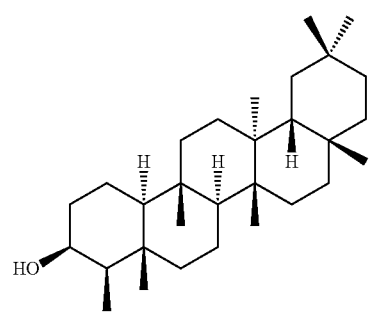
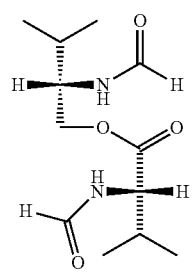
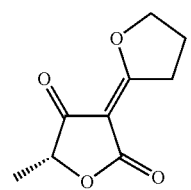
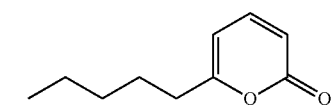
1
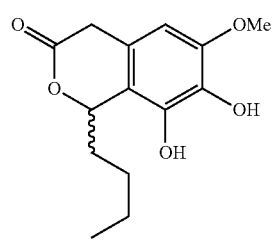
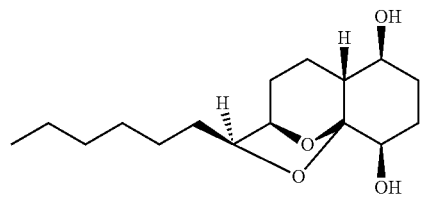
2     3
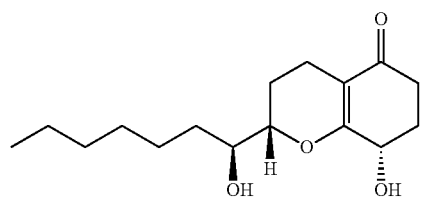
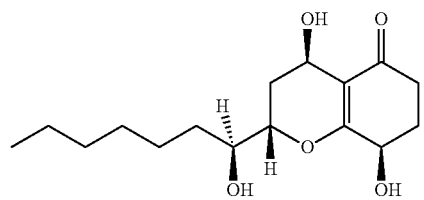
4     5

-continued
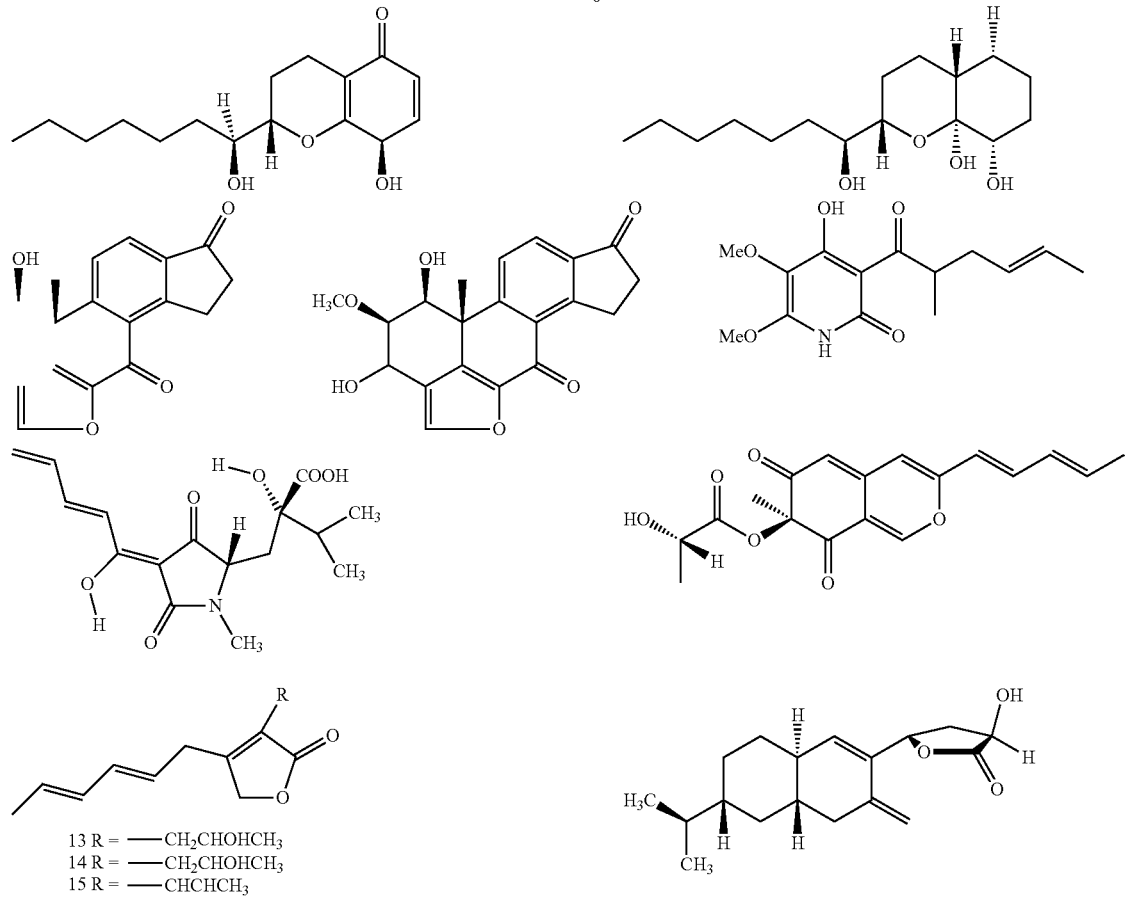
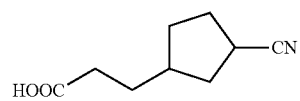
13 R = —CH$_2$CHOHCH$_3$
14 R = —CH$_2$CHOHCH$_3$
15 R = —CHCHCH$_3$
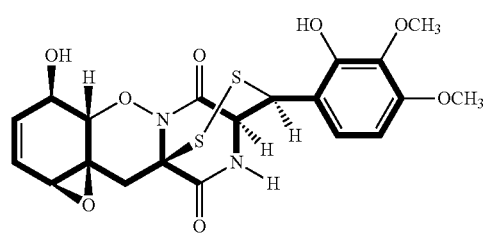
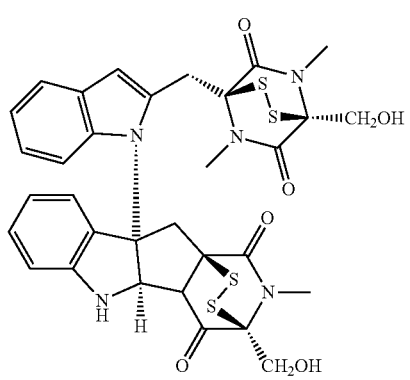

-continued
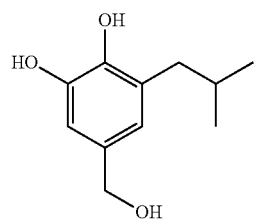
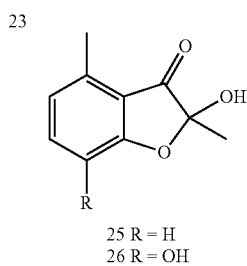
25 R = H
26 R = OH
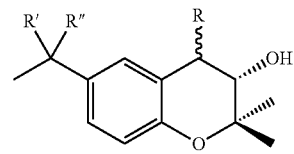
27 R = bOH; R' + R" = O
28 R = aOH; R' + R" = O
29 R = BOH; R' = H R" = OH
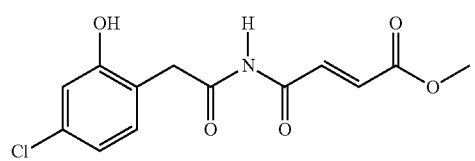
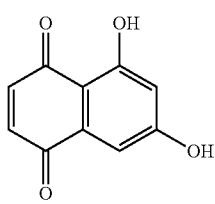
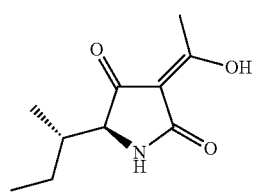
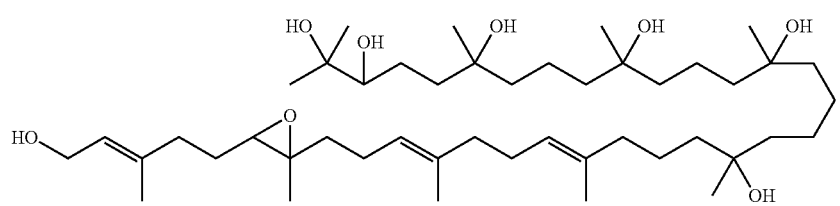
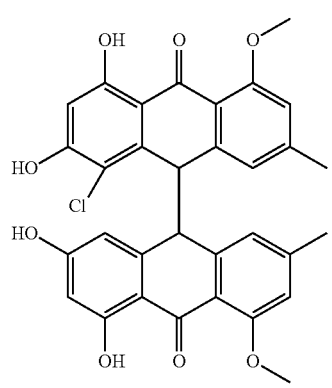
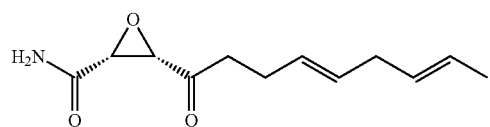

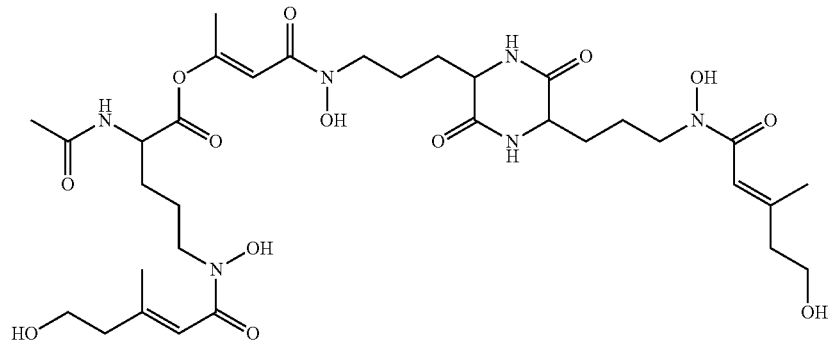
37
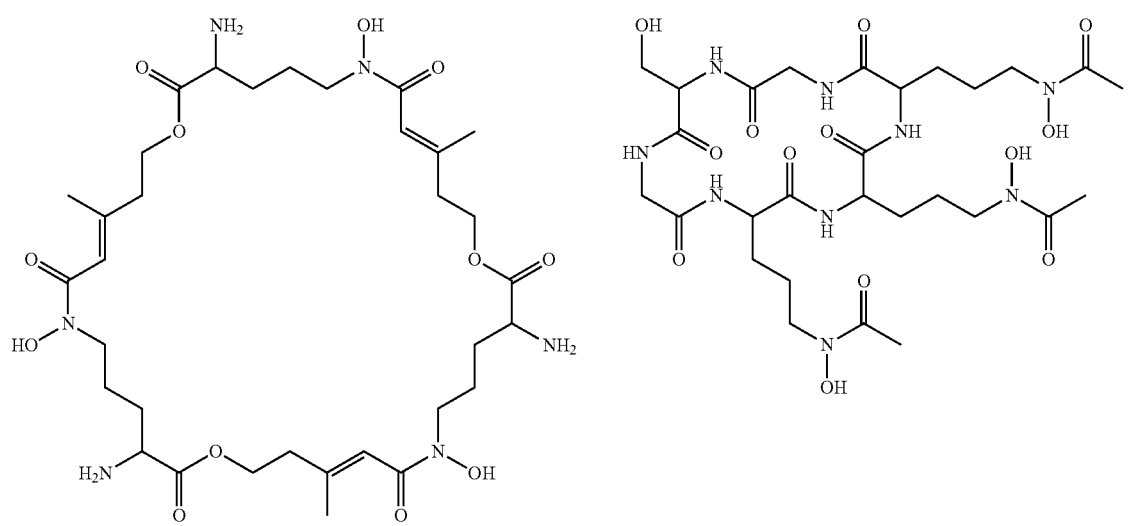
39
40
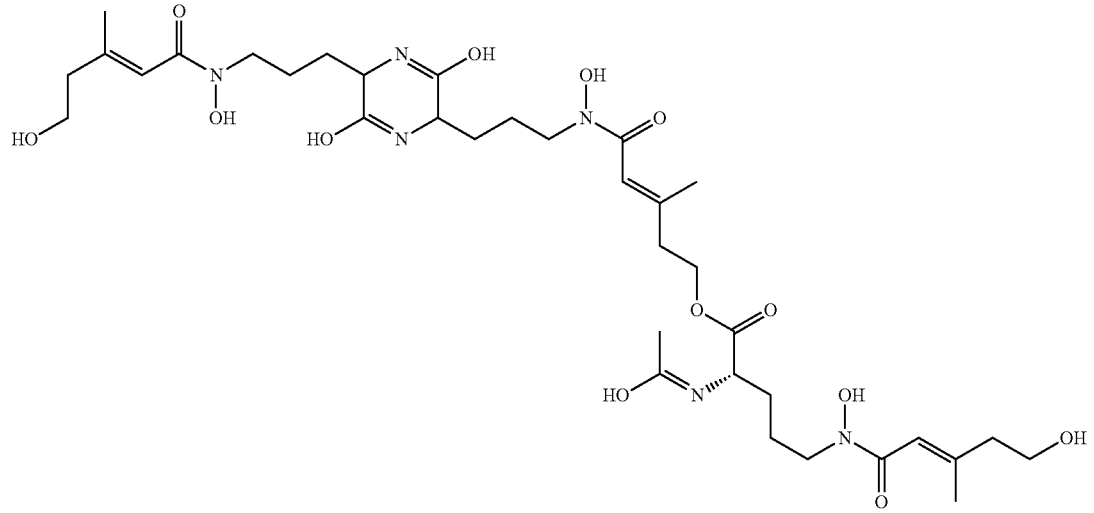
36
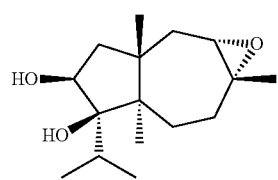
41
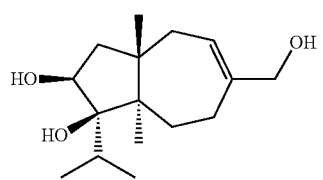
42

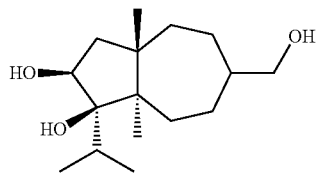

43

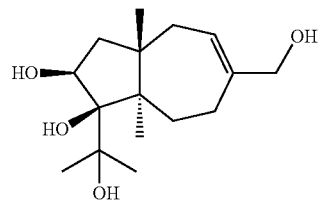

44

-continued

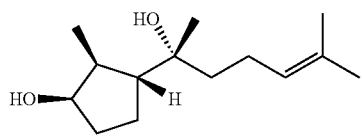

45

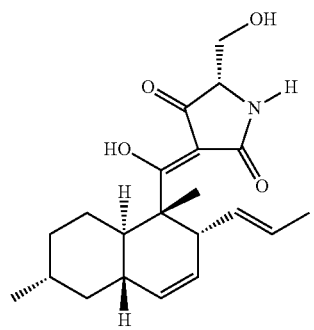

46

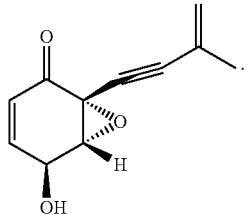

47

Preferably, the composition comprises harzianic acid. The composition may comprise a secondary metabolite selected from griseofulvin, dechloro-griseofulvin, aspyrone, penicilic acid, dehydropenicillic acid, mellein and ocrhatoxin (A, B, C or D).

The plant pathogen which the strain, culture, culture filtrate, spores, mycelia or metabolite directly or indirectly (i) inhibits the growth or reproduction of or (ii) kills may be any plant pathogen. Thus, the plant pathogen may be a fungus, an oomycete, a bacteria or a nematode. Typically, the plant pathogen is a fungus, an oomycete or a bacteria.

Examples of fungus or oomycete plant pathogens are species of genus *Botrytis, Alternaria, Rhizoctonia, Sclerotinia, Fusarium, Pythium, Uncinula, Leveillula, Sclerotium, Thielaviopsis, Verticillium, Magnaporthe, Ustilago, Phakospora, Puccinia, Colletotrichum, Phytophthora,* and *Armillaria* and powdery mildew.

Often the plant pathogen is a species of fungus or oomycete of genus *Botrytis, Alternaria, Rhizoctonia, Sclerotinia, Fusarium, Pythium, Uncinula, Leveillula, Phytophthora* and *Sclerotium*. For instance, the plant pathogen is typically a fungus or oomycete selected from *Botrytis cinerea, Rhizoctonia solani, Uncinula necator, Leveillula taurica, Pythium ultimum, Sclerotium rolfsii, Sclerotinia sclerothium, Magnaporthe oryzae, Fusarium graminearum, Blumeria graminis, Mycosphaerella graminicola, Ustilago maydis, Melampsora lini, Phytophthora infestans, Fusarium oxysporum* and *Fusarium oxysporum lycopersici*.

Example of nematode plant pathogens include nematode species of genus *Belonolaimus, Globodera, Longidorus, Xiphenema, Criconemoides, Trichodorus, Rotylenchulus, Helicotylenchus, Tylenchulus, Pratylenchus, Radopholus, Meloidogyne, Heterodera, Radopholus, Naccobus, Bursaphelenchus, Ditylenchus, Ditylenchus, Anguina* or *Aphelenchoides*.

Examples of nematode pathogens include cyst nematodes such as *Globodera rostochiensis, Heterodera avenae, Radopholus similis, Pratylenchus pratensis, Helicotylenchus multicinctus, Belonolaimus gracilis, Tylenchulus semipenetrans, Rotylenchulus reniformis, Criconemoides similis, Rotylenchus robustus, Hemicycliophora gracilis* and *Trichodorus primitivus;* root-knot nematodes such as *Meloidogyne incognita;* dagger nematodes such as *Xiphinema diversicaudatum, Longidorus elongates, Hoplolaimus coronatus, Aphelenchoides ritzema-bosi, Aphelenchoides besseyi;* and eelworm such as *Ditylenchus dipsaci*.

In some contexts a given species may be a fungicide for use in accordance with the invention, while in other contexts it may be a pathogen. Generally the component (b) for use in accordance with the invention is different to the plant pathogen.

Fatty Acid Component

The composition of the invention comprises one or more fatty acids or derivatives thereof. Fatty acids are compounds of formula $RCO_2H$ where R is an aliphatic hydrocarbon group. Typically R is a long chain aliphatic hydrocarbon group. R may be a saturated or unsaturated aliphatic hydrocarbon group having from 3 to 29 carbons (i.e. a $C_{4-30}$ fatty acid). Typically, R is a linear, saturated or unsaturated aliphatic hydrocarbon group having from 3 to 27 carbon atoms, e.g. a linear $C_{3-27}$ alkane group or a linear $C_{3-27}$ alkene group. R is often a linear, saturated or unsaturated, aliphatic hydrocarbon group having from 11 to 21 carbon atoms, e.g. a linear $C_{11-21}$ alkane group or a linear $C_{11-21}$ alkene group. Unsaturated aliphatic hydrocarbon groups typically contain from 1 to 4 double bonds, for instance 1 or 2 double bonds.

Derivatives of fatty acids include salts, esters and amides of the fatty acid. Typically, a derivative of the fatty acid, as used herein is a salt or an ester of the fatty acid.

An ester of a fatty acid is typically an ester of the fatty acid with an alcohol such as methanol, ethanol, propanol, butanol, ethane-1,2-diol, propane-1,3-diol and propane-1,2,3-triol (glycerol). The derivative of the fatty acid may be a salt of the fatty acid or a methy ester of the fatty acid (i.e. $RCO_2Me$).

A salt of a fatty acid is typically a metal salt of the fatty acid. Often, the one or more fatty acids or derivatives thereof are one or more metal salts of fatty acids. The metal salts are typically alkali metal salts. Alkali metal salts of fatty acids include lithium, sodium, potassium and rubidium salts of fatty acids. The composition may therefore comprise one or more fatty acids or sodium or potassium salts thereof. For instance, component (a) may be one or more sodium or potassium salts of fatty acids. Such salts may be formed by reacting the one or more fatty acids with a base comprising the desired metal cation, for instance by reacting one or more fatty acids with sodium hydroxide or potassium hydroxide.

The one or more fatty acids or derivatives thereof are typically selected from: saturated acids selected from butyric acid (C4), valeric acid (C5), caproic acid (C6), enanthic acid (C7), caprylic acid (C8), pelargonic acid (C9), capric acid (C10), undecylic acid (C11), lauric acid (C12), tridecylic acid (C13), myristic acid (C14), pentadecanoic acid (C15), palmitic acid (C16), margaric acid (C17), stearic acid (C18), nonadecylic acid (C19), arachidic acid (C20), heneicosylic acid (C21), behenic acid (C22), tricosylic acid (C23), lignoceric acid (C24), pentacosylic acid (C25), cerotic acid (C26), heptacosylic acid (C27) montanic acid (C28) and derivatives thereof; and unsaturated acids selected from α-linolenic acid (C18:3), stearidonic acid (C18:4), eicosapentaenoic acid (C20:5), docosahexaenoic acid (C22:6), linoleic acid (C18:2), γ-linolenic acid (C18:3), dihomo-γ-linolenic acid (C20:3), arachidonic acid (C20:4), adrenic acid (C22:4), palmitoleic acid (C16:1), vaccenic acid (C18:1), paullinic acid (C20:1), oleic acid (C18:1), elaidic acid (Ctrans-18:1), gondoic acid (C20:1), erucic acid (C22:1), nervonic acid (C24:1), mead acid (20:3) and derivatives thereof.

The notation CM:N fatty (where M and N are integers), as used herein, means that the fatty acid comprises M carbon atoms and N double bonds. The N double bonds may be at any position (cis or trans configuration), although two double bonds are not usually adjacent (i.e. bonded to the same carbon atom). Thus, C18:0 (or simply C18) covers only octadecanoic acid (stearic acid) and C18:1 includes all fatty acids having 18 carbons and one double bond, such as oleic acid ((Z)-octadec-9-enoic acid) and vaccenic acid ((E)-octadec-11-enoic acid).

Preferably, the one or more fatty acids or derivatives thereof are selected from unsaturated and saturated $C_{12-24}$ fatty acids and salts or esters thereof. The one or more fatty acids or derivatives thereof may be selected from unsaturated and saturated $C_{14-22}$ fatty acids, or unsaturated and saturated $C_{16-20}$ fatty acids, and salts or esters thereof.

Often, the one or more fatty acids or derivatives thereof comprises two or more fatty acids selected from C16:0 fatty acid, C16:1 fatty acids, C18:0 fatty acid, C18:1 fatty acids, C18:2 fatty acids, and C18:3 fatty acids, or salts thereof (for instance potassium or sodium salts).

For instance, the one or more fatty acids may comprise the following fatty acids in the following proportions:
C16 fatty acids from 1 to 10 wt %;
C16:1 fatty acids from 0 to 5 wt %;
C18:1 fatty acids from 60 to 94 wt %; and
C18:2 fatty acids from 5 to 20 wt %.

Often, the one or more fatty acids comprise the following fatty acids in the following proportions:
C16 fatty acids from 3 to 7 wt %;
C16:1 fatty acids from 0 to 4 wt %;
C18:1 fatty acids from 70 to 89 wt %; and
C18:2 fatty acids from 8 to 18 wt %.

Fatty acid amounts in wt % are relative to the total amount of fatty acids in the composition.

The one or more fatty acids or derivatives thereof may comprise:
sodium or potassium salts of C16 fatty acids in an amount of from 1 to 10 wt %;
sodium or potassium salts of C16:1 fatty acids in an amount of from 0 to 5 wt %;
sodium or potassium salts of C18:1 fatty acids in an amount of from 60 to 94 wt %;
and
sodium or potassium salts of C18:2 fatty acids in an amount of from 5 to 20 wt %.

In particular, the one or more fatty acids or derivatives thereof may comprise one or more of linoleic acid (C18:2), γ-linolenic acid (C18:3), palmitoleic acid (C16:1), vaccenic acid (C18:1), paullinic acid (C20:1), oleic acid (C18:1), elaidic acid (Ctrans-18:1) and derivatives thereof.

Preferably, the one or more fatty acids or derivatives thereof comprises oleic acid or a salt thereof. The one or more fatty acid or derivatives thereof typically comprise greater than or equal to 70 wt % of oleic acid or a salt thereof, for instance a potassium salt of oleic acid (potassium oleate)

The composition according to the invention typically comprises one or more metal salts of fatty acids, which one or more metal salts of fatty acids are obtainable by a process comprising:
(i) providing an organic oil;
(ii) hydrolysing triglycerides in the organic oil;
(iii) extracting fatty acids from the hydrolysed organic oil; and
(iv) forming the metal salts of the extracted fatty acids.

The organic oil is a an oil or fat derived from a plant or animal and may comprise triglycerides, lipids, and fatty acids. Examples of oils derived from plants include apple seed oil, argan oil, coconut oil, colza oil, canola oil, corn oil, cottonseed oil, grape seed oil, hazelnut oil, macadamia oil, mustard oil, niger seed oil, olive oil, palm kernel oil, peanut oil, poppyseed oil, pumpkin seed oil, ramtil oil, rice bran oil, safflower oil, soybean oil, sesame oil, sunflower oil, tamarind seed oil, tea seed oil and walnut oil. Examples of oils derived from animals include fats derived from animal rendering. Preferably, the organic oil is olive oil.

Hydrolysing triglycerides in the organic oil typically comprises treating the organic oil with an aqueous acid, for instance aqueous sulfuric acid. The treated organic oil may be heated.

Extracting fatty acids from the hydrolysed organic oil may be done by any suitable method as are well known to the skilled person, for instance evaporation, solvent extraction, liquid-liquid extraction or chromatography.

Forming the metal salts of the extracted fatty acids may be done by any suitable method which are well known to the skilled person. Typically, this comprises treating the fatty acids with a base comprising the metal, e.g. a metal hydroxide such as KOH or NaOH. The metal is often an alkali metal, e.g. Li, Na, K or Rb, or an alkali earth metal, e.g. Mg, Ca, Sr or Ba.

In some cases, the fatty acid derivatives may be formed starting simply from a composition comprising the fatty acids. Thus, the fatty acid component may be produced by providing one or more fatty acids and forming the metal salts of the extracted fatty acids.

Thus, typically the fatty acids or derivatives thereof are alkali metal salts of fatty acids, preferably potassium salts of fatty acids.

The use of fatty acids as active agents in the present invention can be advantageous because the fatty acids are generally biodegradable and well tolerated by non-target species.

In addition to components (a) and (b), the composition typically further comprises a solvent, which is usually water.

The total amount of the one or more fatty acids or derivatives thereof is often from 0.01 to 10 vol %, or from 0.1 to 5 vol %. For instance, the concentration of the fatty acid component may be from 0.5 to 30 ml/L or from 1 to 20 ml/L. Preferably, the concentration of the fatty acid component is from 3 to 15 ml/L, for instance from 5 to 10 ml/L.

If the fungal or oomycete component comprises spores, the concentration of spores is typically from $10^5$ to $10^9$ spores/ml. The spore concentration may be from $10^6$ to $10^8$ spores/ml. The spore concentration may be from $10^5$ to $10^7$ spores/ml. If the composition comprises mycelia, the concentration of the mycelia is typically from $10^6$ to $10^8$ ml$^{-1}$.

If the composition comprises a metabolite, the concentration of the metabolite is typically from $10^{-6}$ to $10^{-3}$ M. For instance, the concentration of the metabolite may be from $5.0 \times 10^{-6}$ M to $10^{-4}$ M.

At the concentrations given above, the composition is typically in a form suitable for application to plants. The composition may of course also be presented in a form suitable for storage or transport. In such cases, the concentration is typically much higher. For instance, the concentration of the fatty acid component may be greater than 100 ml/L or greater than 500 ml/L. The spore concentration may be from $10^9$ to $10^{11}$ ml$^{-1}$.

If the composition comprises a culture filtrate, this may be produced by the following method. A suspension of spores of the fungus or oomycete is inoculated in a suitable medium and incubated for from 24 to 92 hours, optionally with shaking. The spore biomass is then filtered out, washed and transferred into a salt medium without a carbon source. This culture is then incubated for from 1 to 10 days and the culture filtrate is separated by centrifugation.

For example, to obtain a culture filtrate, a *Trichoderma* spore suspension is inoculated in PDB (100 ml, 107 spore/ml in 500 ml sterile medium) and incubated at 25° C. for 48-72 h on an orbital shaker (150 rpm). *Trichoderma* biomass is filtered, washed with sterile water and transferred into salt medium without any carbon source (if not specified), amended with fungal pathogen biomass or lyophilised mushrooms. The culture is incubated for 4-7 days, then the culture filtrate was separated by centrifugation (400 rpm for 5 min).

The composition often comprises potassium salts of one or more fatty acids and harzianic acid. An example of the composition according to the invention comprises:
(a) potassium oleate at a concentration of from 5 to 10 ml/L; and
(b) harzianic acid at a concentration of from $10^{-6}$ M to $10^{-4}$ M.

Another example of a composition according to the invention comprises:
(a) one or more salts of fatty acids selected from unsaturated and saturated $C_{16-20}$ fatty acids at a concentration of from 2 to 12 ml/L; and
(b) spores of a fungus of a species of the genus *Trichoderma* at a concentration of from $10^5$ to $10^7$ spores/ml, preferably wherein the spores are spores of the strain of *T. harzianum* M10 or spores of the strain of *T. virens* GV41.

The composition of the invention may be made by any suitable method. This usually comprises mixing components (a) and (b) in the desired proportion.

The present invention provides an agrochemical product comprising: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens, wherein components (a) and (b) are formulated for simultaneous or separate treatment of a locus. The one or more fatty acids or derivatives thereof may be as defined herein. The strain, culture, culture filtrate, spores or mycelia of a species of a fungus or oomycete, or a metabolite produced by a species of a fungus or oomycete may be as defined herein.

Methods Using the Composition

The invention provides a method for controlling fungi or oomycetes at a locus, which method comprises treating the locus simultaneously or sequentially with: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

The invention also provides a method for protecting a plant against fungi or oomycetes, which method comprises treating part or all of the plant itself, the seed from which the plant grows, or the place at which the plant grows, simultaneously or separately with: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

The fungus or oomycete which may be treated or controlled is typically a species of genus *Botrytis, Alternaria, Rhizoctonia, Sclerotinia, Fusarium, Pythium, Uncinula, Leveillula, Sclerotium, Thielaviopsis, Verticillium, Magnaporthe, Ustilago, Phakospora, Puccinia, Colletotrichum, Phytophthora* and *Armillaria* and powdery mildew. Often the fungus or oomycete is one or more species of genus *Botrytis, Alternaria, Rhizoctonia, Sclerotinia, Fusarium, Pythium, Uncinula, Leveillula, Phytophthora* and *Sclerotium*. For instance, the fungus may be selected from *Botrytis cinerea, Rhizoctonia solani, Uncinula necator, Leveillula taurica, Pythium ultimum, Sclerotium rolfsii, Magnaporthe oryzae, Fusarium graminearum, Blumeria graminis, Mycosphaerella graminicola, Ustilago maydis, Melampsora lini, Phytophthora infestans, Fusarium oxysporum* and *Fusarium oxysporum lycopersici*.

The method of controlling fungi or oomycetes or protecting plant from a fungus or oomycete may further comprise identifying the presence of the fungus or oomycete on the plant or locus before treatment. This may be done by analysing a sample of the plant or by observing symptoms in the plant.

The invention also provides a method for promoting growth in a plant, which method comprises treating part or all of the plant itself, the seed from which the plant grows, or the place at which the plant grows, simultaneously or separately with: (a) one or more fatty acids or derivatives thereof; and (b) a strain, culture, culture filtrate, spores or mycelia of a species of a fungus or oomycete, or a metabolite produced by a species of a fungus or oomycetes, which strain, culture, culture filtrate, spores, mycelia or metabolite directly or indirectly (i) inhibits the growth or reproduction of plant pathogens or (ii) kills plant pathogens.

The invention also provides a method for controlling nematodes at a locus, which method comprises treating the locus simultaneously or sequentially with: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

The invention also provides a method for protecting a plant against nematodes, which method comprises treating part or all of the plant itself, the seed from which the plant grows, or the place at which the plant grows, simultaneously or separately with: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

The nematodes which are controlled or against which the plant is protected are typically nematode species of genus *Belonolaimus, Globodera, Longidorus, Xiphenema, Criconemoides, Trichodorus, Rotylenchulus, Helicotylenchus, Tylenchulus, Pratylenchus, Radopholus, Meloidogyne, Heterodera, Radopholus, Naccobus, Bursaphelenchus, Ditylenchus, Ditylenchus, Anguina* or *Aphelenchoides*. For instance, the nematode may be a cyst nematode such as *Globodera rostochiensis, Heterodera avenae, Radopholus similis, Pratylenchus pratensis, Helicotylenchus multicinctus, Belonolaimus gracilis, Tylenchulus semipenetrans, Rotylenchulus reniformis, Criconemoides similis, Rotylenchus robustus, Hemicycliophora gracilis* and *Trichodorus primitivus;* a root-knot nematode such as *Meloidogyne incognita* or *Meloidogyne hapla;* a dagger nematode such as *Xiphinema diversicaudatum, Longidorus elongates, Hoplolaimus coronatus, Aphelenchoides ritzema-bosi, Aphelenchoides besseyi;* or an eelworm such as *Ditylenchus dipsaci.*

In the methods of the invention, components (a) and (b) may be as further defined herein. The methods may further comprise treating the locus or plant with a known fungicide. For example, the plants of loci may also be treated, simultaneously or sequentially, with a known fungicide.

The composition applied to the plant or loci may further comprise a carrier, an emulsifier, a suspending agent, a dispersing agent, a penetrating agent, a moistening agent, a thickening agent, a surfactant or a stabilizer. The carrier may be a liquid or a solid carrier. The solid carrier may be selected from starch, sugar, cellulose powder, cyclodextrin, charcoal, soybean powder, wheat flour, chaff, wood flour, talc, kaolin, bentonite, calcium carbonate, calcium sulfate, sodium bicarbonate, zeolite, diatomaceous earth, white carbon, clay, alumina, silica and lignin. The liquid carrier may be selected from water, soybean oil, cotton oil, corn oil, colza oil, canola oil, sunflower oil, ethanol, ethylene glycol, acetone, methylethyl ketone, dioxane, THF, kerosene, lamp oil, liquid paraffin, xylene, cyclohexane, chloroform, chlorobenzene, dimethylformamide, ethyl acetate, and N-methylpyrrolidone.

The frequency of application may be any suitable frequency, as are well known to the skilled person. The treatment may occur only once. Typically, the locus, the part or all of the plant itself, the seed from which the plant grows, or the place at which the plant grows, is treated with a frequency of from once every 1 day to once every 30 days (for instance once every 3 days to once every 10 days), for a period of from 7 days to 100 days. The locus/plant may be treated once or twice a day in some cases.

Often, the locus, the part or all of the plant itself, the seed from which the plant grows, or the place at which the plant grows, is treated with a composition comprising both components (a) and (b), as defined herein.

The amount of composition required may vary from method to method. Typically the locus, the part or all of the plant itself, the seed from which the plant grows, or the place at which the plant grows, is treated with from 10 L/hectare to 10000 L/hectare of the composition. Often, 50 L/hectare to 2000 L/hectare of the composition is used. If the composition is used in a more concentrated form the volumes per hectare will be correspondingly less and vice versa.

The invention also provides the use of one or more fatty acids or derivatives thereof as defined herein in a method for controlling a fungus, wherein in said method the one or more fatty acids or derivatives thereof are used in combination with a strain, culture, culture filtrate, spores or mycelia of a species of a fungus or oomycete or a metabolite produced by a species of a fungus or oomycete as defined herein.

The invention also provides the use of a composition comprising a strain, culture, culture filtrate, spores or mycelia of a species of a fungus or oomycete or a metabolite produced by a species of a fungus or oomycete as defined herein in a method for controlling a fungus or oomycete, wherein in said method the strain, culture, culture filtrate, spores or metabolite is used in combination with one or more fatty acids or derivatives thereof as defined herein.

In the methods of the invention, the plant is typically a crop plant. Examples of crops include grain crops, pulse/legume crops, oil seeds crops, forage crops, fiber crops, roots crops, tuber crop, sugar crops, starch crops, dreg crops, spice crops, vegetable crops, green manure crops and medicinal crops. Examples of crop plants include rice, jowar, wheat, maize, barley, millets, bajara, green gram, black gram, soybean, pea, cowpea, groundnut, mustard, sunflower, sesamum, linseed, fickler, hay, silage, sorghum, elephant grass, guinea grass, berseem, cotton, steam, jute, mesta, sun hemp, flax, potato, sugar beet, carrot, turnip, elephant, yam, sugarcane, sugar beet, tapioca, sweet potato, tobacco, mint, pyrethrum, ginger, garlic, chili, cumin onion, coriander, cardamom, pepper, turmeric, palak, mentha, brinjal, tomato, okra and sun hemp.

The plants are often vegetable or fruit plants, for instance solonaceous vegetable plants or curcurbit vegetable plants. Examples of plants which can be treated by the method of the invention include those plants which produce broccoli, cauliflower, globe artichokes, capers, kale, collard greens, spinach, Eruca sativa, beet greens, bok Choy, chard, choi sum, turnip greens, endive, lettuce, mustard greens, watercress, garlic chives, leeks, brussels sprouts, kohlrabi, galangal, ginger, celery, rhubarb, cardoon, chinese celery, asparagus, bamboo shoots, potatoes, Jerusalem artichokes, sweet potatoes, taro, yams, soybean, mung beans, alfalfa, carrots, parsnips, beets, radishes, rutabagas, turnips, burdocks, onions, shallots, garlic, tomatoes, cucumbers, squash, zucchinis, pumpkins, peppers, eggplant, tomatillos, chayote, okra, breadfruit, avocado, corn, green beans, snow peas, apples, grapes, melons, peppers, zucchini and strawberries.

Often, the locus is a plant selected from tomato plants, grape plants, zucchini plants, pepper plants, bean plants, melon plants and strawberry plants.

The invention also provides a process for producing a crop product, which process comprises cultivating a plant, wherein part or all of the plant itself, the seed from which the plant grows, or the place at which the plant grows, is treated simultaneously or separately with: (a) one or more fatty acids or derivatives thereof; and (b) a strain, culture, culture filtrate, spores or mycelia of a species of a fungus or oomycete, or a metabolite produced by a species of a fungus or oomycete, which strain, culture, culture filtrate, spores, mycelia or metabolite directly or indirectly (i) inhibits the growth or reproduction of plant pathogens or (ii) kills plant pathogens.

In some aspects of the invention it is preferred to target particular pathogens in certain crops.

In one preferred embodiment the plant or locus to be treated is a small grain cereal and the pathogen is rust (fungi of the order Pucciniales), powdery mildew, *Septoria, Rhizoctonia, Pythium* or *Fusarium.*

In another preferred embodiment the plant or locus to be treated is a fruit and vegetable plant and the pathogen is powdery mildew, *Rhizoctonia, Pythium, Fusarium, Phytophthora, Alternaria,* downy mildew (e.g. *Peronospora* fungi), *Botrytis* or *Sclerotinia.*

In another preferred embodiment the plant or locus to be treated is a grape plant and the pathogen is powdery mildew, downy mildew (e.g. *Peronospora* fungi), *Botrytis* or *Sclerotinia.*

In another preferred embodiment the plant or locus to be treated is a pome fruit plant and the pathogen is powdery mildew or scab (e.g. *Venturia* fungus).

In another preferred embodiment the plant or locus to be treated is a potato plant and the pathogen is *Phytophthora* (late blight) or *Alternaria* (early blight).

In another preferred embodiment the plant or locus to be treated is a soybean plant and the pathogen is *Pythium, Fusarium, Phytophthora* or soybean rust (e.g. *Phakopsora* fungus).

In another preferred embodiment the plant or locus to be treated is a rice plant and the pathogen is *Rhizoctonia* or rice blast (e.g. *Magnaporthe* fungus).

The invention also provides use of (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in controlling fungi or oomycetes at a locus.

The invention also provides use of (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in protecting a plant against fungi or oomycetes.

The invention also provides use of (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in promoting growth in a plant.

The invention also provides use of (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in controlling nematodes at a locus.

The invention also provides use of (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in protecting a plant against nematodes.

The invention also provides use of (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in controlling fungi or oomycetes at a locus.

The invention also provides use of (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in protecting a plant against fungi or oomycetes.

The invention also provides use of (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in promoting growth in a plant.

The invention also provides use of (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in controlling nematodes at a locus.

The invention also provides use of (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in protecting a plant against nematodes.

The invention also provides a method of using (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in controlling fungi or oomycetes at a locus.

The invention also provides a method of using (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in protecting a plant against fungi or oomycetes.

The invention also provides a method of using (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in promoting growth in a plant.

The invention also provides a method of using (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in controlling nematodes at a locus.

The invention also provides a method of using (i) one or more fatty acids or derivatives thereof as defined herein to improve the effect of (ii) a strain, culture, culture filtrate, spores, mycelia of a species of a fungus or oomycete or a metabolite produced by a species of a fungus or oomycete as defined herein in protecting a plant against nematodes.

The invention also provides a method of using (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in controlling fungi or oomycetes at a locus.

The invention also provides a method of using (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in protecting a plant against fungi or oomycetes.

The invention also provides a method of using (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in promoting growth in a plant.

The invention also provides a method of using (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in controlling nematodes at a locus.

The invention also provides a method of using (ii) a strain, culture, culture filtrate, spores, mycelia of a species of a fungus or oomycete or a metabolite produced by a species of a fungus or oomycete as defined herein to improve the effect of (i) one or more fatty acids or derivatives thereof as defined herein in protecting a plant against nematodes.

Further embodiments of the invention are described in the following Examples.

EXAMPLES

Production of Fatty Acid Derivative

A salt derivative of fatty acids was prepared by the following method. This fatty acid salt derivative is referred to as ABP-510 herein. ABP-510 is obtained by mixing in a reactor a selection of fatty acids (C14-C18) derived from olive oil following oil hydrolysis whereby the glycerine is separated from the fatty acids and the fatty acids are subjected to fractional distillation in order to achieve the required specification. The fatty acids are made to react in a temperature controlled blending vessel with such quantity of potassium hydroxide and water for the production of the liquid fatty acid salt until solubilisation of the components occurs and a liquid is produced that will readily form a true solution when diluted in water at the recommended rates of application for use in the field.

Example 1

Control of Fungus

Example 1.1

In Vivo Biocontrol Assays to Assess Fungicidal Activity of ABP-510

Material and Methods

Tests were conducted on tomato and grape plants. Seeds of tomato cv. San Marzano were sown in 14 cm diameter pots containing sterile soil. Cuttings of grape plant (cv. Sangiovese) were planted in 14 cm diameter pots containing sterile soil. All the tests were carried out in greenhouse. The product ABP-510 was used as a spray solution at four different concentrations (10, 20, 30 and 40 ml/L) and its effectiveness was compared with Folicur (a chemical fungicide widely used against powdery mildew). ABP-510 and Folicur (used as a positive control) were sprayed on 10 plants, negative control was obtained by spraying only water on 10 plants (Table 1).

TABLE 1

Experimental design for each plant species

| | |
|---|---|
| Number of plants for treatment | 10 |
| Number of treatments | 6 |
| Total number of plants for experiment | 60 |

The treatments (Tab. 2) with ABP-510 and Folicur started at the appearance of the first powdery mildew symptoms and were repeated at intervals of 7 days, for a total of 5 applications.

TABLE 2

List of the treatments done for tomato and grape plants

| Treatment | Concentration | Treatment Method | Frequency of Application |
|---|---|---|---|
| Negative control | H2O (100-200 ml/10 plants) | sprayed on the leaves of plants | every 7 days |
| FOLICUR | 3 ml/L (100-200 ml/10 plants) | sprayed on the leaves of plants | every 7 days |
| ABP-510 | 10 ml/L (100-200 ml/10 plants) | sprayed on the leaves of plants | every 7 days |
| ABP-510 | 20 ml/L (100-200 ml/10 plants) | sprayed on the leaves of plants | every 7 days |
| ABP-510 | 30 ml/L 100-200 ml/10 plants) | sprayed on the leaves of plants | every 7 days |
| ABP-510 | 40 ml/L 100-200 ml/10 plants) | sprayed on the leaves of plants | every 7 days |

Disease development was monitored every 7 days recording the number of infected leaves. The intensity of the attack (severity of infection) was also evaluated on tomato plant according to a visual evaluation scale (Table 3).

TABLE 3

Scale of intensity powdery mildew
development on the plant (Severity of infection)

1. healthy (leaves without symptoms of infection)
2. very light infection (<15% of leaf area infected with 1-2 attachment points on the leaf surface)
3. light infection (15-30% of leaf area infected with 3-4 attachment points on the leaf surface)
4. moderate infection (30-50% of leaf area infected and developed with many attachment points on the leaves);
5. severe infection (>50% leaf area infected with attack points extended to cover the entire surface of the leaf).

Results

Very favourable environmental condition permitted a strong diffusion of powdery mildew on both the tomato and the grape. ABP-510 controlled the disease well both at an early and late stage. On tomato plants (FIG. 1), ABP-510 used at 40, 30 or 20 ml/L controlled powdery mildew development even better than the chemical fungicide FOLICUR.

Figure 2:
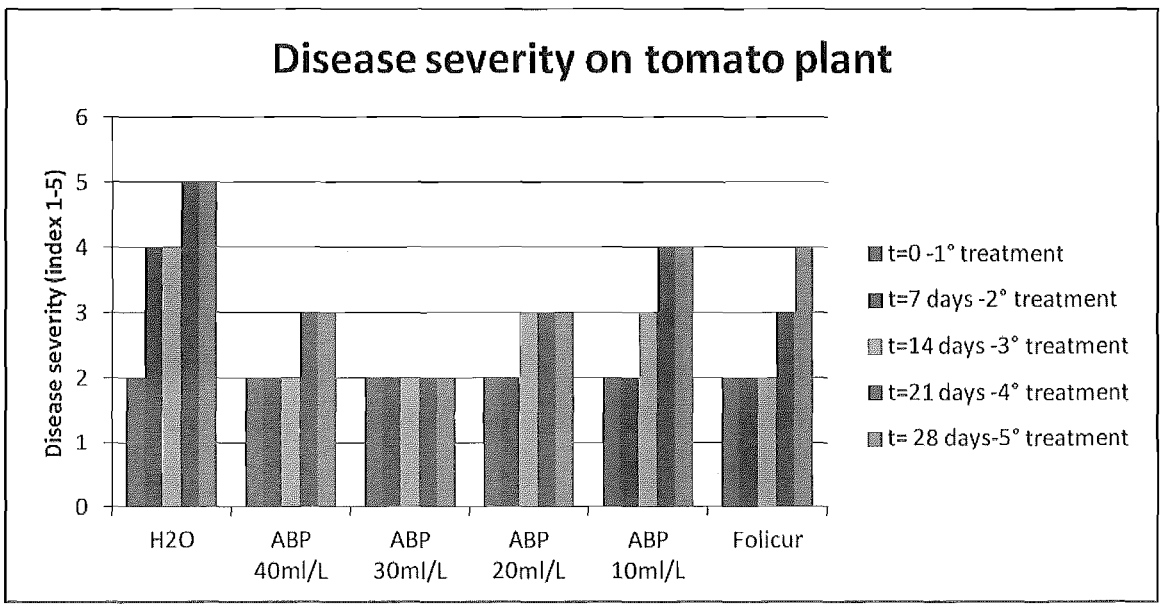
FIG. 2 shows the severity of infection caused by powdery mildew on tomato plants after treatment with ABP-510.

The assay of severity of infection (FIG. 2) demonstrates that ABP-510 used at 40, 30 or 20 ml/L strongly reduced disease virulence and development with an efficacy higher that FOLICUR, while ABP-510 used at 10 ml/L had an efficacy similar to FOLICUR.

No phytotoxic effect has been found for any of ABP-510 tested concentration.

Figure 3:
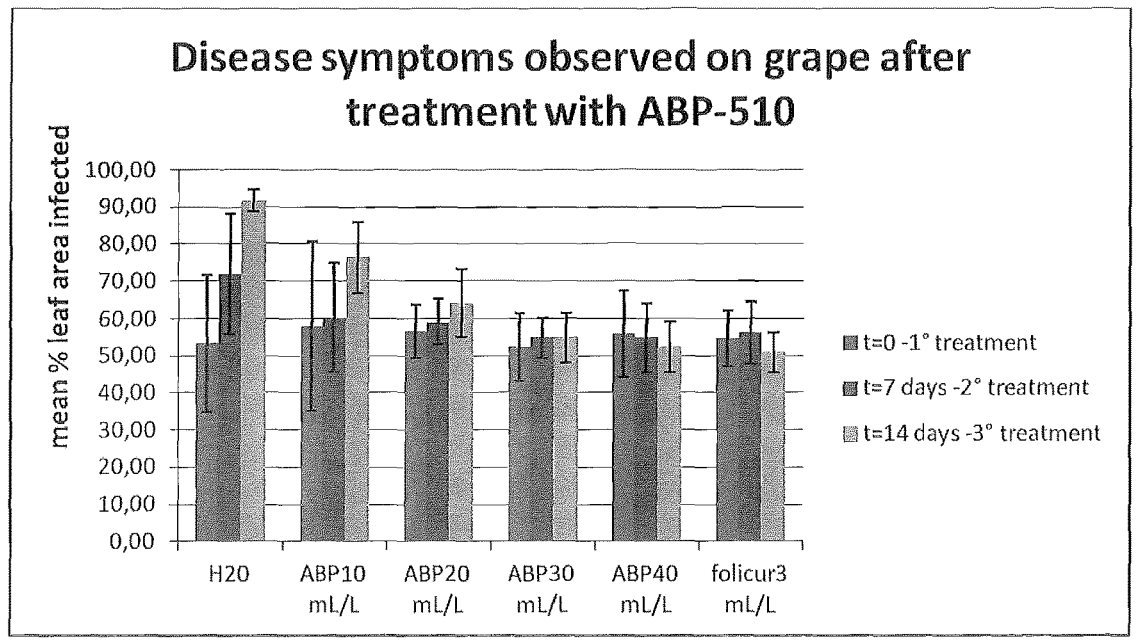
FIG. 3 shows the percentage of grape leaf area affected by powdery mildew after treatment with ABP-510.

Generally, the experiments conducted on grape plants indicated a level of disease control similar to what has been obtained for tomato plants. Very favourable environmental condition meant powdery mildew disease development was fast (i.e. in 15 days the entire surface of control leaves was colonized). Regardless, ABP-510 treatments (40, 30 or 20 ml/L) gave an efficacy comparable with that of FOLICUR, while ABP-510 10 ml/L was slightly less effective than FOLICUR but even so was active in controlling powdery mildew development when compared with untreated control (FIG. 3).

Interestingly, a less phytotoxic effect has been noted for ABP-510 (40-30-20 ml/L) and no phytotoxic effect has been obtained when ABP-510 was applied 10 ml/L.

Example 1.2

In Vivo Assays to Assess the Effects of Combined Applications of the ABP-510 and *Trichoderma* on Powdery Mildew A combination of ABP-510 and *Trichoderma* spp. has been tested against powdery mildew on tomato plants.

Materials and Methods

Tests were conducted on tomato plants. Seeds of tomato cv. San Marzano were sown in 14 cm diameter pots containing sterile soil. All the tests were carried out in greenhouse. The product ABP-510 was used at three different concentrations (10, 5 and 3 ml/L), and the combined solution was obtained by diluting in the ABP-510 product a suspension of spores of *Trichoderma harzianum* to a final concentration of $10^7$ spores $ml^{-1}$. The combined solution was sprayed on 10 plants. Each control was also sprayed on 10 plants. The control were: a) only *Trichoderma harzianum* to a final concentration of $10^7$ spores $ml^{-1}$; b) only ABP-510 at the three different concentrations (10, 5 and 3 ml/L); c) only water (Tables 4 and 5).

Disease development was monitored every 7 days recording the number of infected leaves. The intensity of the attack (severity of infection) was also evaluated according to a visual evaluation scale (Table 3).

TABLE 4

Experimental design

| | |
|---|---|
| Number of plants for treatment | 10 |
| Number of treatments | 8 |
| Total number of plants for experiment | 80 |

TABLE 5

Treatment list

| Treatment | Concentration | Treatment Method | Frequency of Application |
|---|---|---|---|
| Negative control | H2O (100-200 ml/10 plants) | sprayed on the leaves of plants | every 7 days |
| ABP-510 + Trichoderma | 10 ml/L + Tricho $10^7$ spores $ml^{-1}$ (100-200 ml/10 plants) | sprayed on the leaves of plants | every 7 days |
| ABP-510 + Trichoderma | 5 ml/L + Tricho $10^7$ spores $ml^{-1}$ (100-200 ml/10 plants) | sprayed on the leaves of plants | every 7 days |
| ABP-510 + Trichoderma | 3 ml/L + Tricho $10^7$ spores $ml^{-1}$ (100-200 ml/10 plants) | sprayed on the leaves of plants | every 7 days |
| control ABP-510 | 10 ml/L (100-200 ml/10 plants) | sprayed on the leaves of plants | every 7 days |
| control ABP-510 | 5 ml/L (100-200 ml/10 plants) | sprayed on the leaves of plants | every 7 days |
| control ABP-510 | 3 ml/L (100-200 ml/10 plants) | sprayed on the leaves of plants | every 7 days |
| control Trichoderma | Tricho $10^7$ spores $ml^{-1}$ (100-200 ml/10 plants) | sprayed on the leaves of plants | every 7 days |

Results

Figure 4:
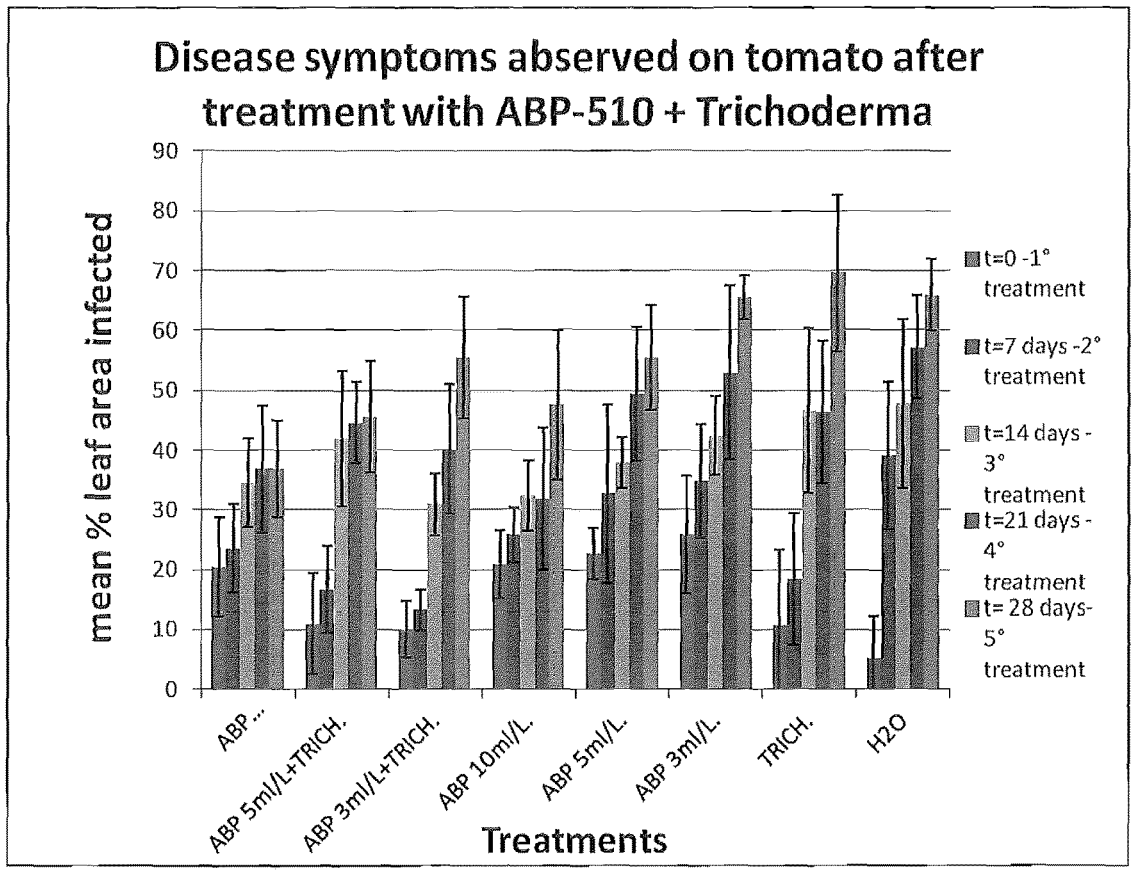
FIG. 4 shows the percentage of tomato leaf area affected by powdery mildew after treatment with ABP-510 and *Trichoderma* spores.

Treatments using ABP-510 (10 or 5 ml/L) alone and in combination with *Trichoderma harzianum* ($10^7$ spores $ml^{-1}$) gave a good control of disease development. Treatments with the combination (ABP-510+*Trichoderma*) was particularly effective at controlling disease development particularly on the late stage (FIG. 4).

Figure 5:
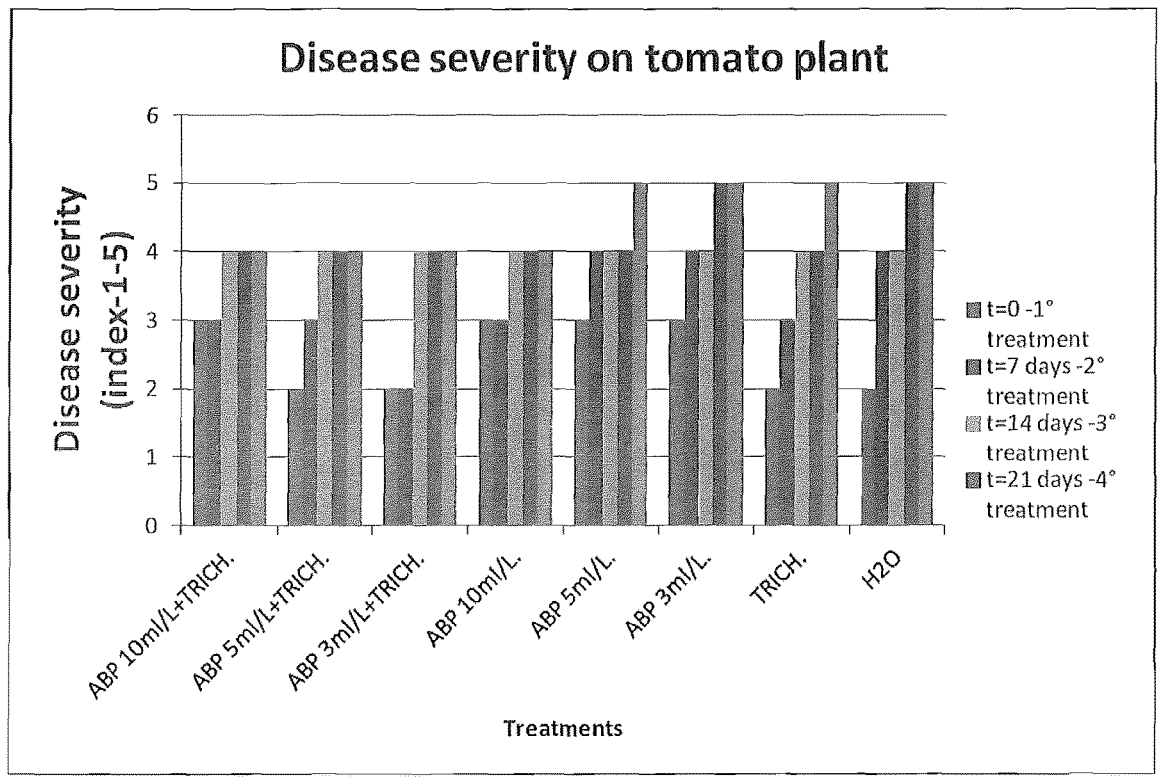
FIG. 5 shows the severity of infection caused by powdery mildew on tomato plants after treatment with ABP-510 and *Trichoderma* spores.

Assay of severity of infection demonstrates that treatments by using ABP-510 at 5 or 3 ml/L in combination with *Trichoderma harzianum* ($10^7$ spores $ml^{-1}$) and treatment by using ABP-510 at 10 ml/L alone or in combination with *Trichoderma harzianum* gave a good control of disease development, strongly reduce disease virulence and development (FIG. 5—see the disease severity results at t=0-1° treatment; t=7 days—2° treatment; t=14 days—3° treatment; t=21 days—4° treatment; and t=28 days—5° treatment).

Example 1.3

In Vivo Assays to Assess the Effects of Single and Combined Applications of the ABP-510 with *Trichoderma* Against *Sclerotium Rolfsii*

Biocontrol Assay with the Soilborne Pathogen *Sclerotium Rolfsii*

In order to assess the fungicidal activity of the product against soilborne phytopathogenic fungi the effect of single applications of the product and of applications combined with *Trichoderma harzianum* on the development of disease caused by the soilborne pathogen *Sclerotium rolfsii* on pepper plants was evaluated.

Materials and Methods

Two week old pepper plants were transplanted into 14 cm diameter pots containing soil infested with *Sclerotium rolfsii*. The fungal pathogen *Sclerotium rolfsii* was grown for about 15 days. The mycelial biomass was vacuum harvested in a Buchner tunnel lined with Miracloth. All liquid substrate was removed, and the semi-dry fungal biomass was weighed. The weighed fungal biomass was added to water and homogenized in a Waring blender until a homogeneous fungal suspension was obtained. Soil was mixed with fungal suspension to a concentration of 5 g of biomass per kg of sterile soil.

Two days after transplanting in infested soil, plants were watered with 50 ml of single and combined solutions (*Trichoderma*+ABP-510). Three successive applications were performed weekly.

Negative control was obtained by drenching soil with water only. Each set of treatments consisted of 16 plants (Table 6). All the tests were carried out in greenhouse under controlled temperature.

ABP-510 was used at three different concentrations: 10, 5 and 3 ml/L. The combined solution was obtained by diluting in the product a suspension of spores of *Trichoderma harzianum* obtaining a final concentration of $10^7$ spores $ml^{-1}$ (Tables 6 and 7).

Disease development was monitored every 7 days recording the number of wilted plants with obvious dark-brown lesions on the stem at or just beneath the soil level, or death as a result of an extensive lower stem rot.

TABLE 6

| Experimental design | |
|---|---|
| Number of plants for treatment | 16 |
| Number of treatments | 8 |
| Total number of plants for experiment | 128 |

TABLE 7

| Treatment list | | | |
|---|---|---|---|
| Treatment | Concentration | Treatment Method | Frequency of Application |
| ABP-510 + Trichoderma | 10 ml/L + Tricho $10^7$ spores $ml^{-1}$ (30 ml/plant) | drenching | every 7 days |
| ABP-510 + Trichoderma | 5 ml/L + Tricho $10^7$ spores $ml^{-1}$ (30 ml/plant) | drenching | every 7 days |
| ABP-510 + Trichoderma | 3 ml/L + Tricho $10^7$ spores $ml^{-1}$ (30 ml/plant) | drenching | every 7 days |
| Trichoderma | $10^7$ spores $ml^{-1}$ (30 ml/plant) | drenching | every 7 days |
| ABP-510 | 10 $ml/L^{-1}$ (30 ml/plant) | drenching | every 7 days |
| ABP-510 | 5 ml/L (30 ml/plant) | drenching | every 7 days |
| ABP-510 | 3 ml/L + Tricho (30 ml/plant) | drenching | every 7 days |
| Negative control | H2O (30 ml/plants) | drenching | every 7 days |

Results

Figure 6:
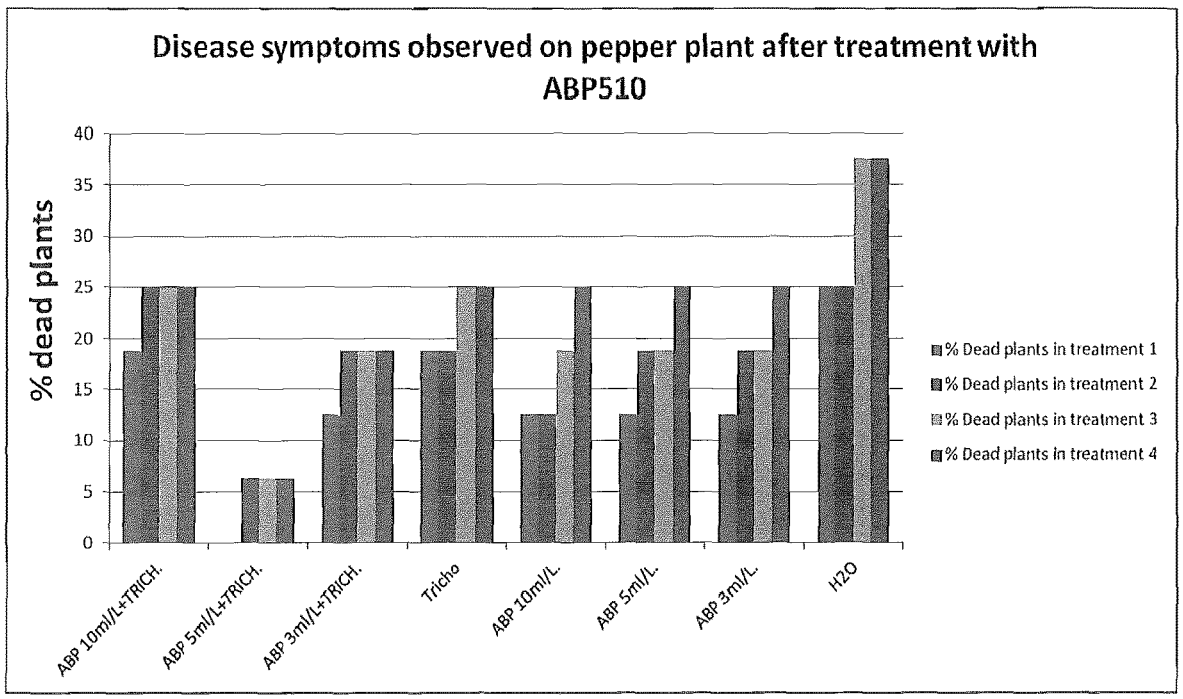
FIG. 6 shows percentage of pepper plants that dies after being affected with *S. rolfii* and treated with ABP-510 and *Trichoderma* spores.

Preliminary results (FIG. 6) indicated that development of *S. rolfsii* infections was reduced by treatment with the fungicide ABP-510 at the three tested concentrations.

Regarding the evaluation of the interaction of the product ABP-510 with *Trichoderma harzianum,* the combined treatment 5 ml/L ABP-510+*Trichoderma* appears to be clearly synergistic. In this case, as shown in the FIG. 6, the disease is completely blocked.

The results also show that the fungicide ABP-510, at three concentrations tested did not inhibit the biocontrol activity of *Trichoderma*.

Example 1.4

In Vitro Biocontrol Assays to Assess Fungicidal Activity of ABP-510

The fungicidal activity of ABP-510 was evaluated against the plant pathogenic fungi *Botrytis cinerea, Alternaria* sp. *Rhizoctonia solani, Sclerotinia* sp., *Fusarium* sp. *Phytium* sp. Some of the most common fungicides commonly used in the field were used as a positive control: Ortiva (Singenta, Azoxystrobin) (Folicur (Bayer, Tetuconazole); Fungiclor (Bayer, Dicloran); Enovit (Sipcam, Tiofanate methyl).

Materials and Methods

The assays were conducted by including in the solid PDA the ABP-510 at concentrations varying from 2.5 ml/L up to 40 ml/L. Ortiva, Folicur, Fungiclor and Enovit were added to the PDA solid media considering the application doses reported into respective data sheet. Discs of agar of 0.5 cm in diameter of the different pathogens were positioned in the center of the PDA plate. As a negative control we considered the pathogen growing on non-treated PDA plates. Each treatment consists of three replicates. The plates were incubated at 25° C. and the radial growth of the phytopathogenic fungi was recorded every day for seven days.

Results

Figure 7:
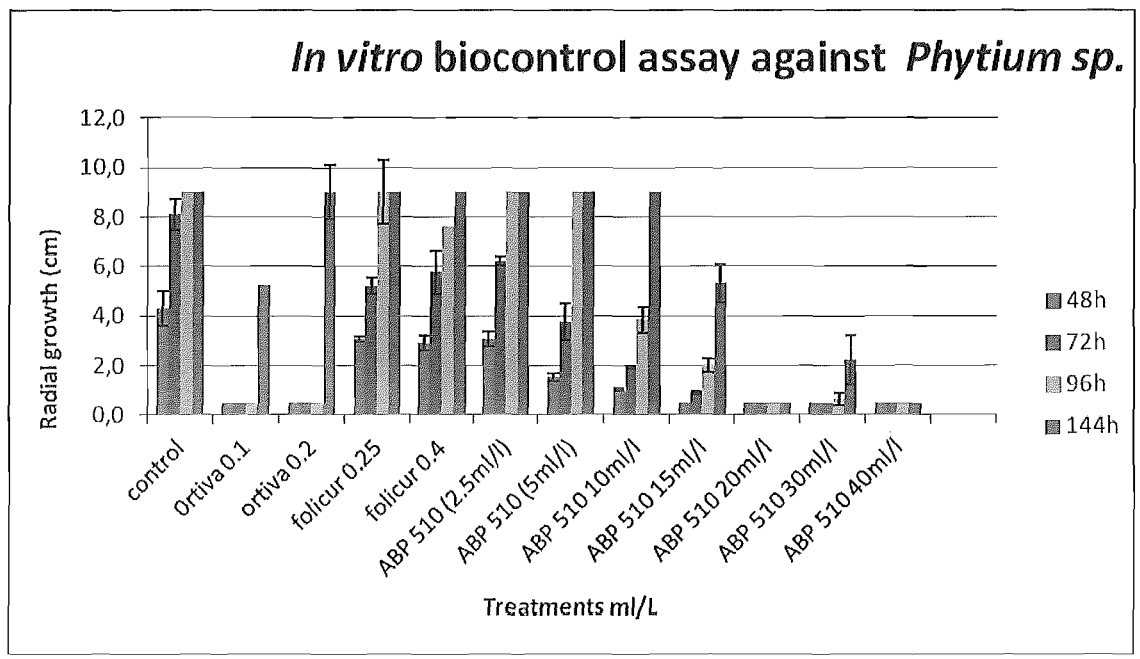
FIG. 7 shows the effect of ABF-510 on the radial growth of the plant pathogen *Pythium* sp.

The results demonstrated the ability of the ABP-510 to significantly reduce the growth of the tested phytopathogenic fungi when it was applied from 2.5 up to 5-10 ml/L. ABP-510 (30-40 ml/L) completely inhibits all pathogens growth. In particular, the growths of *Phytium* sp. and *Rhizoctonia solani* were completely inhibited when ABP-510 was applied at 20 ml/L. *Alternaria* sp, was significantly reduced starting from the dose of 2.5 ml/L. The only pathogen that was not completely inhibited at a concentration of 40 ml/L was *Fusarium* sp. The effect of ABP-510 on the radial growth of the plant pathogen *Phytium* sp is shown in FIG. 7.

Example 1.5

In Vivo Biocontrol Assays to Assess Fungicidal Activity of ABP-510

The ability of ABP-510 to control the development and diffusion of a natural infection of *Uncimula necator* and *Leveillula taurica*, the causal agents of powdery mildew of grapes and tomatoes, was tested in vivo.

Materials and Methods

Tests were conducted on tomato and grape plants. Seeds of tomato cv. San Marzano were sown in 14 cm diameter pots containing sterile soil. Cuttings of grape plant (cv. Sangiovese) were planted in 14 cm diameter pots containing sterile soil. All the tests were carried out in greenhouse. The product ABP-510 was used as a spray solution at three different concentrations; 20, 30 and 40 ml/L, and its effectiveness was compared with Folicur a chemical fungicide widely used against powdery mildew. ABP-510 and Folicur (used as a positive control) were sprayed on 10 plants, negative control was obtained by spraying only water on 10 plants (Table 8).

TABLE 8

Experimental design for each plant species

| | |
|---|---|
| Number of plants for treatment | 10 |
| Number of treatments | 5 |
| Total number of plants for experiment | 50 |

The treatments (Table 9) with ABP-510 and Folicur started at the appearance of the first powdery mildew symptoms and were repeated at intervals of 7 days, for a total of 5 applications.

TABLE 9

List of the treatments done for tomato and grape plants

| Treatment | Concentration | Treatment Method | Frequency of Application |
|---|---|---|---|
| Negative control | H₂O (100-200 ml/10 plants) | sprayed on the leaves of plants | every 7 days |
| FOLICUR | 3 ml/L (100-200 ml/10 plants) | sprayed on the leaves of plants | every 7 days |
| ABP-510 | 20 ml/L (100-200 ml/10 plants) | sprayed on the leaves of plants | every 7 days |
| ABP-510 | 30 ml/L 100-200 ml/10 plants) | sprayed on the leaves of plants | every 7 days |
| ABP-510 | 40 ml/L 100-200 ml/10 plants) | sprayed on the leaves of plants | every 7 days |

Disease development was monitored every 7 days recording the number of infected leaves. The intensity of the attack (severity of infection) was also evaluated according to a visual evaluation scale (Table 11).

TABLE 11

Scale of intensity powdery mildew development on the plant.

| Severity of infection | |
|---|---|
| 1 | healthy (leaves without symptoms of infection) |
| 2 | very light infection (<15% of leaf area infected with 1-2 attachment points on the leaf surface) |
| 3 | very light infection (<15% of leaf area infected with 1-2 attachment points on the leaf surface) |
| 4 | moderate infection (30-50% of leaf area infected and developed with many attachment points on the leaves); |
| 5 | severe infection (>50% leaf area infected with attack points extended to cover the entire surface of the leaf). |

Results

Figure 8:
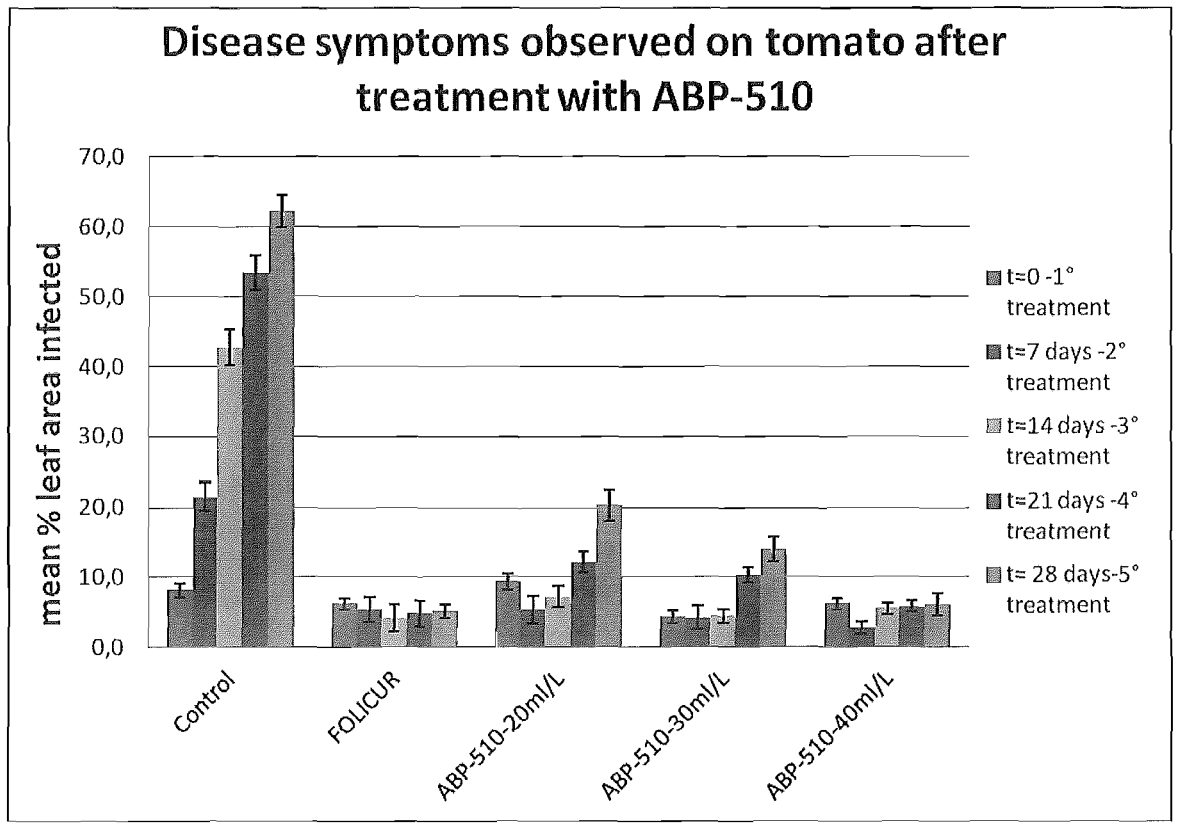
FIG. 8 shows the percentage of tomato leaf area affected by powdery mildew after treatment with ABP-510.

The environmental conditions were favorable to natural occurring powdery mildew development. The data analysis showed that the product ABP-510 at the three tested concentrations produced an effective control of powdery mildew both on tomato and grapes. In general the fungicide ABP-510 showed an excellent efficacy in blocking the very early stages of the disease and preventing its further development. In particular, in the case of tomato, the obtained results, showed that the treatment at the concentration of 40 and 30 ml/L controlled the development of the disease as well as the Folicur, FIG. 8 shows the percentage of tomato leaf area affected by powdery mildew after each of the treatments.

Example 1.6

Improvement of Fungicidal Activity of ABP-510 Product by the Addition of Secondary Metabolites of *Trichoderina* Spp.

*Trichoderma* secondary metabolites have been studied in relation to their ability to directly control fungal plant pathogens. In general, the direct use of anti-microbial compounds produced by fungal biocontrol species, instead of the whole "live" organism, is not only advantageous in industrial and agricultural applications, but it may also be more compliant to public opinion because these biological products do not reproduce and spread. Here we report a synthetic description of the "state of the art" referred to these molecules, followed by the analysis of the major effects observed on the interaction with plant/fungal pathogen.

Harzianic Acid

Harzianic acid is a tetramic acid derivative produced by a *T. harzianum* strain isolated in Australia. This compound showed antibiotic activity in vitro against *Pythium irregulare*, *Sclerotinia sclerotiorum*, and *Rhizoctonia solani*. A plant growth promotion effect was also observed at low concentrations on canola seedlings. Moreover, this compound binds essential metals, such as $Fe^+$.

6-n-pentyl-6H-pyran-2-one (6PP)

6PP is one of the most studied *Trichoderma* antibiotic compound, produced by several species in large quantities (*T. atroviride* strain P101 produces up to 72 mg of 6PP per liter of liquid culture). It is a volatile compound that showed direct effect on plant pathogens both in vitro and in vivo.

Hydrofobin (HYTRA1)

A type 2 hydrophobin has been purified from the culture filtrate of *T. harzianum*. It acts as elicitor of defence responses in plants and plays an important role during the interaction of the antagonistic fungus with plants.

Example 1.7

In Vitro Biocontrol Assays

Materials and Methods

The secondary metabolites were added individually to the substrate at the concentrations $1\times10^{-5}$ M and $1\times10^{-6}$ M for HA and 6PP; $1\times10^{-6}$ M and $1\times10^{-7}$ M for HYTRA1, while the ABP-510 was used at concentrations of 7.5 ml/L. In vitro tests were conducted against the phytopathogenic fungi *Botrytis cinerea*, *Fusarium* sp and *Pythium ultimum*.

Results

Figure 9:
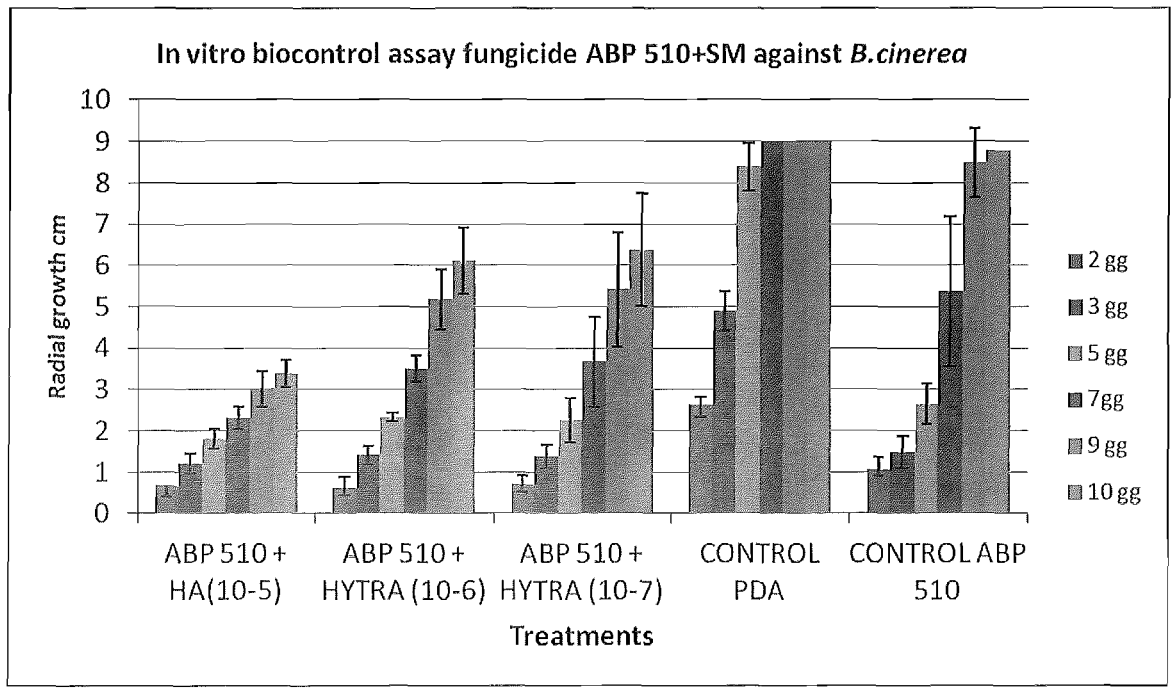
FIG. 9 shows the effect of the treatments on the radial growth of the plant pathogen *B. cinerea* after treatment with ABP-510 and secondary metabolites of *Trichoderma*.
Figure 10:
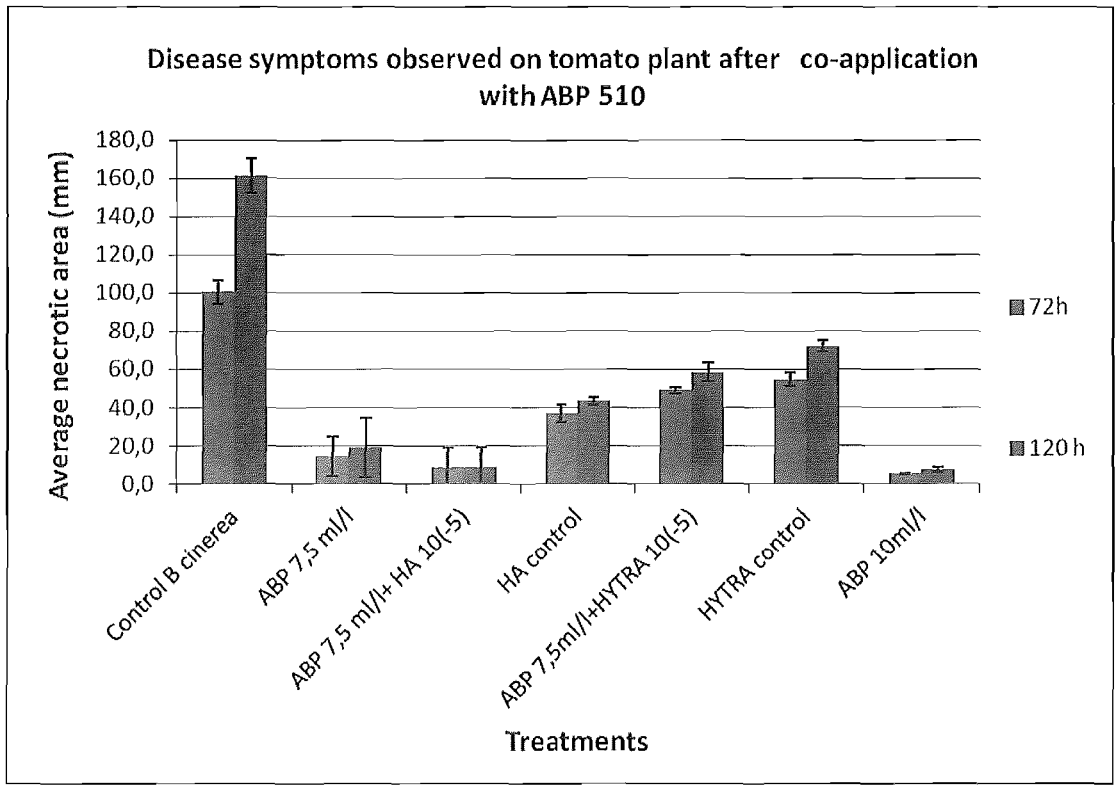
FIG. 10 shows evaluation of the size of the necrotic areas caused by *B. cinerea* on tomato leaves treated with the fungicide ABP-510 and secondary metabolites of *Trichoderma*.
Figure 11:
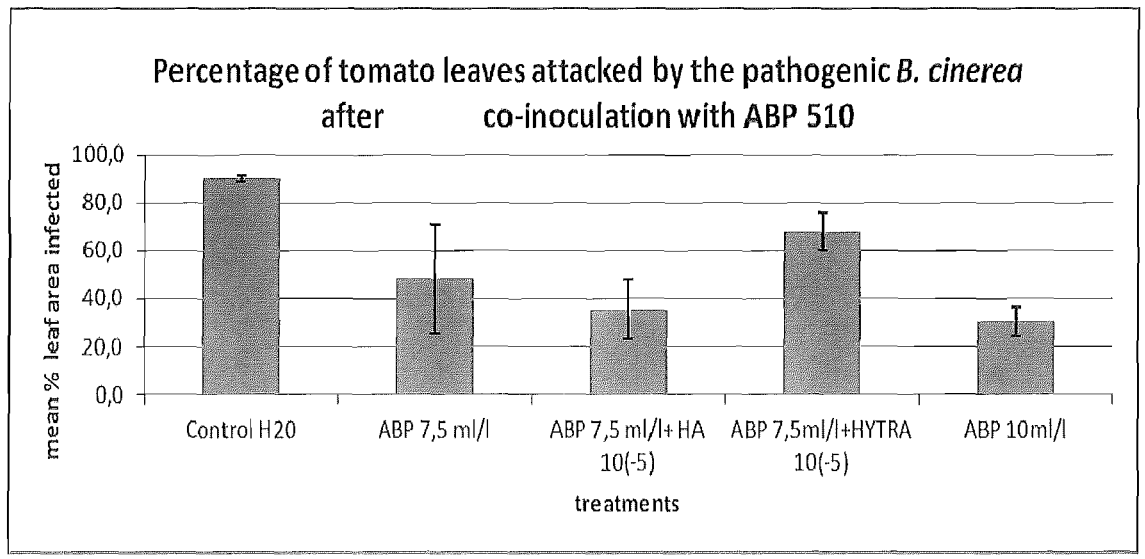
FIG. 11 shows percentage of tomato leaves attacked by *B. cinerea* after co-application with the fungicide ABP-510 and secondary metabolites of *Trichoderma* (co-application). HA is harzianic acid.
Figure 12:
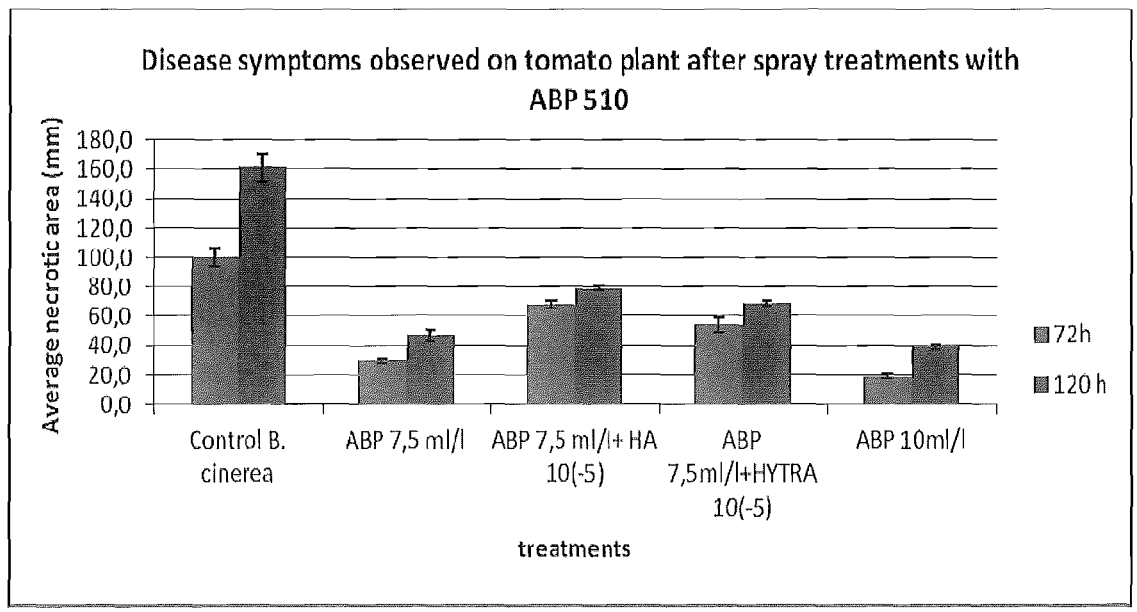
FIG. 12 shows the evaluation of the size of the necrotic areas caused by *B. cinerea* on tomato leaves treated with the fungicide ABP-510 and secondary metabolites of *Trichoderma* (spray application).
Figure 13:
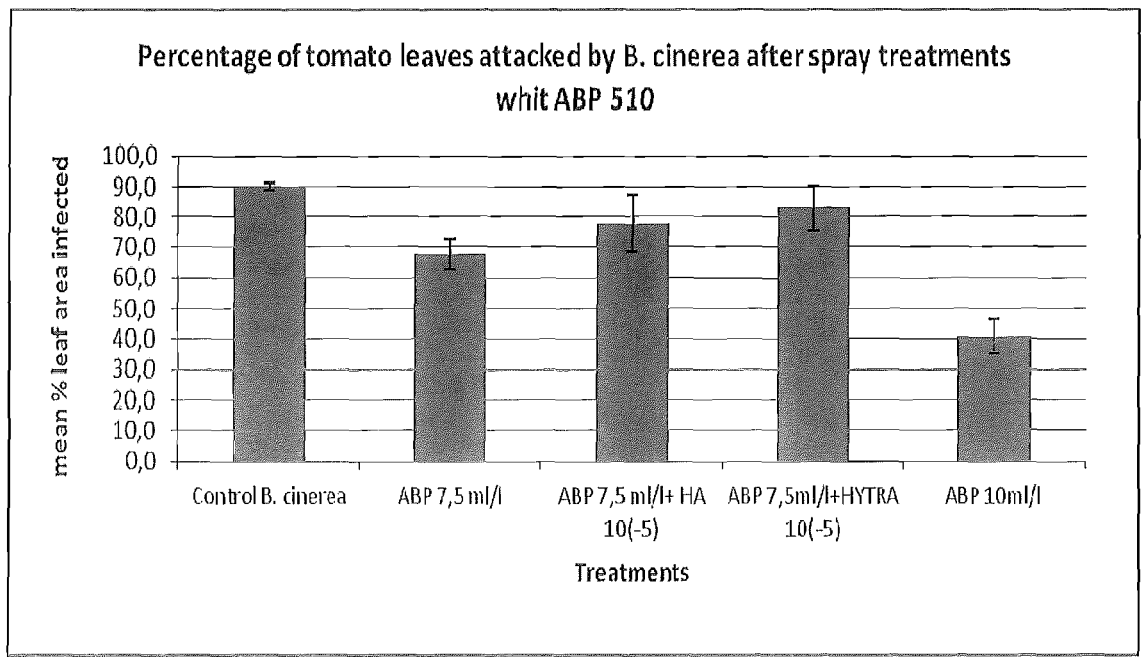
FIG. 13 shows the percentage of tomato leaves attacked by *B. cinerea* after spray-application with the fungicide ABP-510 and secondary metabolites of *Trichoderma*.

The results showed that the addition of the metabolite HA and HYTRA1 resulted in a significant improvement of control activity of the ABP-510 against the pathogen *Botrytis cinerea*. The effect of the treatments on the radial growth of the plant pathogen *B. cinerea* is shown in FIG. 9.

TABLE 12

Effect of the treatments on the radial growth of the plant pathogen *B. cinerea*

| *Botrytis cinerea* | Radial growth | | | | | |
|---|---|---|---|---|---|---|
|  | 2 d | 3 d | 5 d | 7 d | 9 d | 10 d |
| ABP + HA ($10^{-5}$) | 0.7 | 1.2 | 1.8 | 2.3 | 3.0 | 3.4 |
| ABP + HYTRA1 ($10^{-6}$) | 0.6 | 1.4 | 2.3 | 3.5 | 5.2 | 6.1 |
| CONTROL PDA | 2.7 | 4.9 | 8.4 | 9.0 | 9.0 | 9.0 |
| CONTROL ABP | 1.1 | 1.5 | 2.7 | 5.4 | 8.5 | 8.8 |

Example 1.8

In Vivo Biocontrol Assays to Assess the Improvement of ABP-510 Activity by the Addiction of *Trichoderma Metabolites*

In vivo tests against the foliar pathogen *B. cinerea*, were performed to evaluate the improvement of the fungicidal activity of the product ABP-510 by the addition of specific secondary metabolites produced by *Trichoderma* spp.: Harzianic acid (HA) and Hydrofobin1 (HYTRA1).

Materials and Methods

Tests were conducted on tomato and zucchini plants. Seeds of tomato (cv. San Marzano) and zucchini were sown in 14 cm diameter pots containing sterile soil.

Plants were incubated in a greenhouse at 18/15° C. (day/night), 70% RH. With a photoperiod of 12 h day/light, and 12 night/dark. After inoculation with *B. cinerea*, the cultivation temperature was decreased to 15/10° C. and RH was increased 90-100% to establish the optimum conditions for pathogen development.

In vivo tests on tomato plants (Table 13), involved two different treatments: (i) application of the product ABP-510 added with each metabolite and inoculation of the pathogen on the leaves at the same time (co-application); (ii) spraying of the product added with metabolites on leaves 5 hours before the inoculation of the pathogen.

The product ABP-510 was used at two different concentrations (10 ml/L and 7.5 ml/L). To 7.5 ml/L ABP concentration was added the secondary metabolites. In the co-application treatment, the fungicide was applied to each leaf composed of five leaflets in 10 µl drops. In the spray treatment, 10 ml of fungicide were sprayed on leaves of each plant.

TABLE 13

List of the treatments done for tomato plants

| Treatment | Concentration | Treatment Method |
|---|---|---|
| Control-ABP-510 + *B. cinerea* | 10 ml/L + $10^6$ sp/ml. | co-application (10 µl-drops/leave)-sprayed on the leaves of plants(10 ml/plant) |
| Control-ABP-510 + *B. cinerea* | 7.5 ml/L + $10^6$ sp/ml. | co-application(10 µl-drops/leave)-sprayed on the leaves of plants(10 ml/plant) |
| ABP-510 + HA + *B. cinerea* | 7.5 ml/L + HA $10^{-5}$M + $10^6$ sp/ml. | co-application (10 µl-drops/leave)-sprayed on the leaves of plants(10 ml/plant) |
| ABP-510 + HYTRA | 7.5 ml/L + HYTRA $10^{-5}$M + $10^6$ sp/ml. | co-application (10 µl-drops/leave)-sprayed on the leaves of plants(10 ml/plant) |
| Negative-Control *Botrytis cinerea* alone. | $10^6$ sp/ml. | 10-µl-drops ($10^6$ spores ml$^{-1}$) on leaf |
| Control HA + *B. cinerea* | HA $10^{-5}$M + $10^6$ sp/ml. | co-application (10 µl-drops/leave) |
| Control HYTRA + *B. cinerea* | HYTRA $10^{-5}$M + $10^6$ sp/ml. | co-application (10 µl-drops/leave) |

On zucchini plants (Table 14), the fungicide ABP-510+ secondary metabolite was used at the concentrations of 7.5 ml/L and was performed only as a co-application treatment. In the negative-control treatments, leaves were treated with sterile demineralized water. B. cinerea spore suspension ($10^6$ spores $ml^{-1}$) was applied to each leaf at 10-µl/drops. The infected plants were incubated in a greenhouse at 10-15° C. under 90-100% humidity until first necrosis appeared on the negative-control plants.

The effect of the fungicide application was monitored starting from 72 h after the fungal application, when obvious spots of necrotic tissue were observed on infected leaves of plants used as controls. The infection development was monitored for 7 more days, recording the number of infected leaves and the size of the necrotic area.

TABLE 14

List of the treatments done for zucchini plants

| Treatment | Concentration | Treatment Method |
|---|---|---|
| ABP-510 + B. cinerea | 7.5 ml/L + $10^6$ sp/ml. | co-inoculation (10 µl-drops/leave) |
| ABP-510 + HA + B. cinerea | 7.5 ml/L + HA $10^{-5}$M + $10^6$ sp/ml. | co-inoculation (10 µl-drops/leave) |
| ABP-510 + HYTRA + B. cinerea | 7.5 ml/L + HYTRA $10^{-5}$M + $10^6$ sp/ml. | co-inoculation (10 µl-drops/leave) |
| Negative-Control Botrytis cinere alone. | $10^6$ sp/ml. | inoculation(10 µl-drops/leave) |

Results

Results indicated that the addition of the metabolite harzianic acid in co-application treatments on tomato and zucchini plants resulted in a significant improvement of fungicidal activity of ABP-510 product against the foliar pathogen Botrytis cinerea both on tomato and zucchini plants.

In general, the results showed that the treatment with the fungicide ABP-510 applied at 7.5 ml/L produced an important reduction of necrotic areas and reduced the number of leaves showing symptoms in comparison with negative-control (Botrytis alone). In the case of tomato (FIGS. 10 to 13), the co-application treatment with the ABP-510 fungicide at the concentration of 7.5 ml/l with harzianic acid caused pathogen growth to be significantly reduced in comparison with fungicide alone treatment. In particular the ABP-510 (7.5 ml/L)+harzianic treatment was able to block the infection at the initial stage as well as when the fungicide was applied alone at 10 ml/L.

Spray treatment was less effective in controlling the pathogen B. cinerea as compared with the co-application treatment and no improvement of fungicidal activity of ABP-510 product was recorded after the addition of secondary metabolites of Trichoderma.

Figure 14:
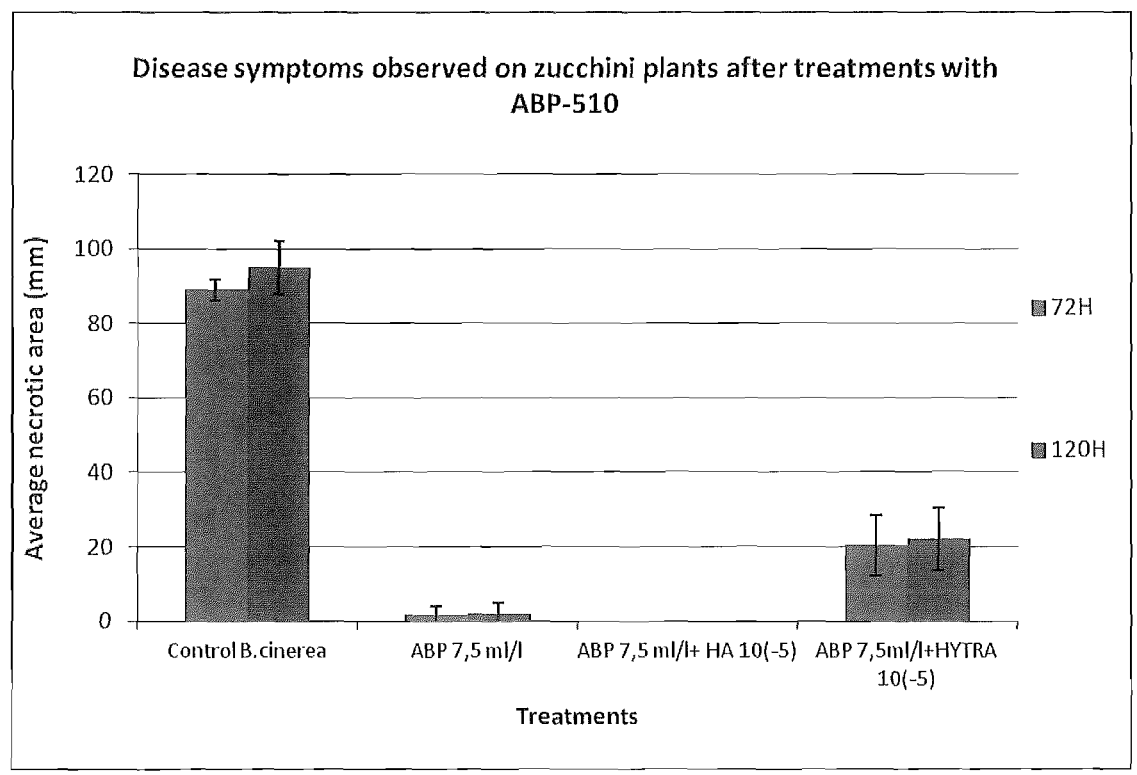
FIG. 14 shows the evaluation of the size of the necrotic areas caused by *B. cinerea* on zucchini leaves treated with the fungicide ABP-510 and secondary metabolites of *Trichoderma* (co-application).
Figure 15:
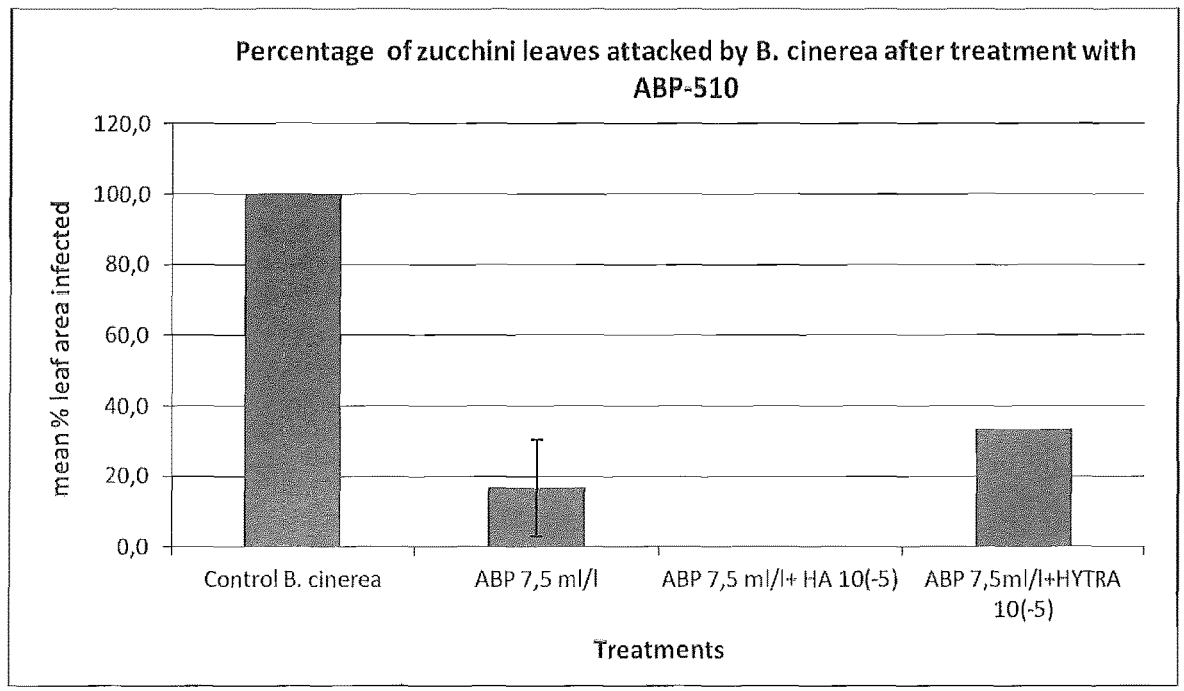
FIG. 15 shows the percentage of zucchini leaves attacked by *B. cinerea* after co-application treatments with the fungicide ABP-510 and secondary metabolites of *Trichoderma*.

On zucchini plants (FIGS. 14 and 15) the obtained results showed that the treatment at the concentration ABP-510 (7.5 ml/L)+harzianic acid completely inhibits the development of disease symptoms.

Example 1.9

New In Vitro Test to Assess the Potential Synergistic Effect of a Simultaneous Application of Trichoderma Spp. and ABP-510

Materials and Methods

These competition assays were conducted by including ABP-510 at concentrations of 5 and 7 ml/L in the solid PDA. Discs of agar of 0.5 cm in diameter of two different pathogens (B. cinerea and Fusarium) and of Trichoderma spp. were positioned at the two opposite ends of the PDA plate. As a negative control we considered the pathogen growing on non-treated PDA plates and on treated PDA plates without Trichoderma spp. Each treatment consists of three replicates. The plates were incubated at 25° C. and the radial growth of the phytopathogenic fungi was recorded every day for seven days.

Results

Figure 16:
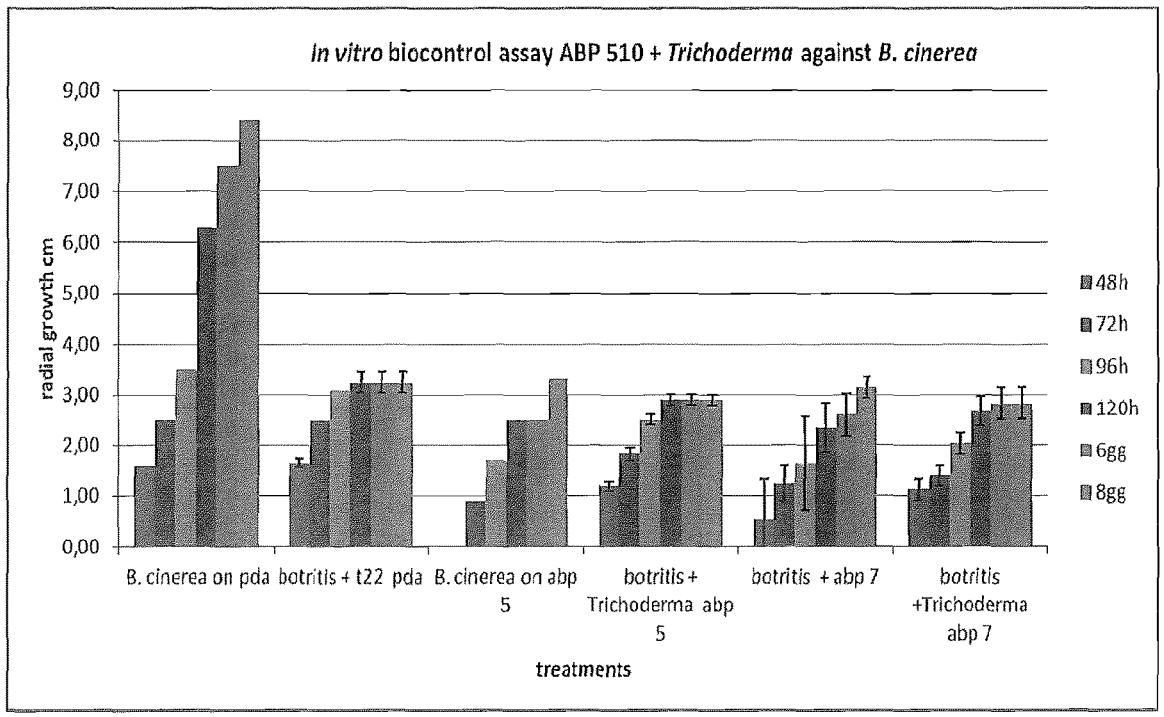
FIG. 16 shows the effect of the treatments with ABP-510 and *Trichoderma* on the radial growth of the plant pathogen *B. cinerea*.
Figure 17:
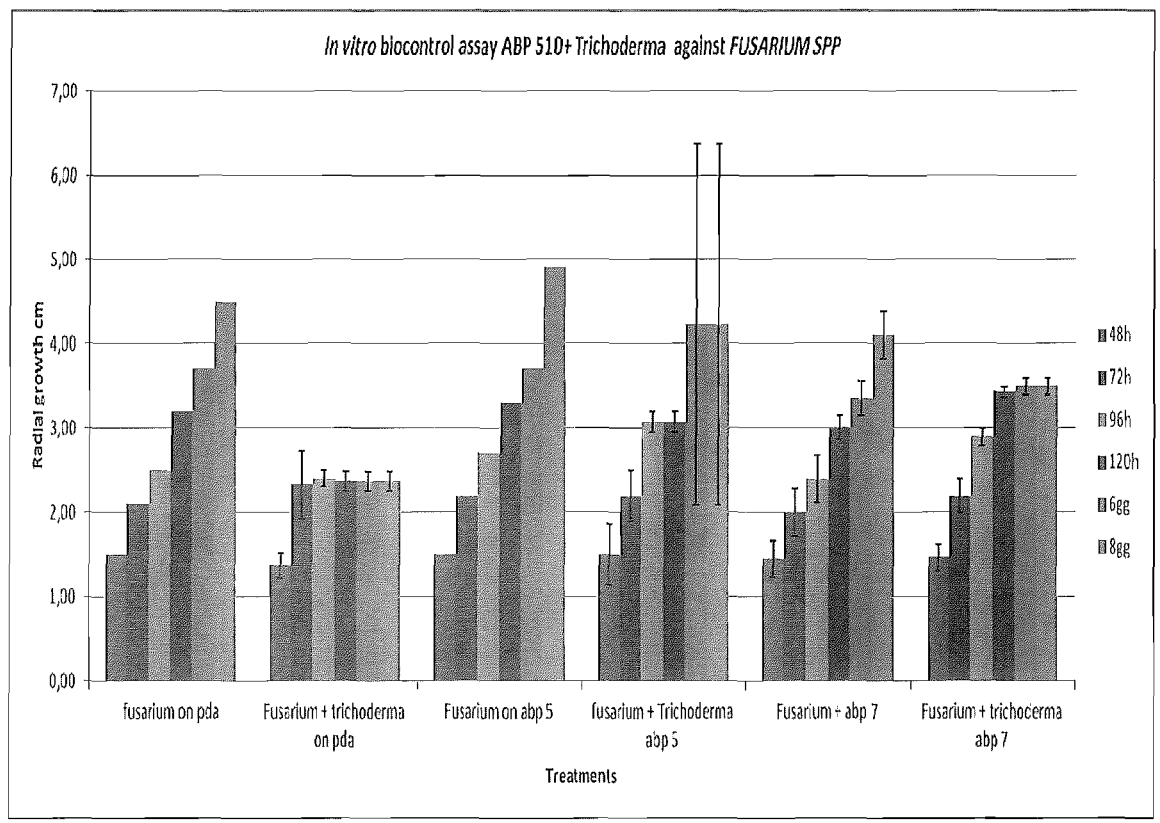
FIG. 17 shows the effect of the treatments with ABP-510 and *Trichoderma* on the radial growth of the plant pathogen *Fusarium* spp.
Figure 18:
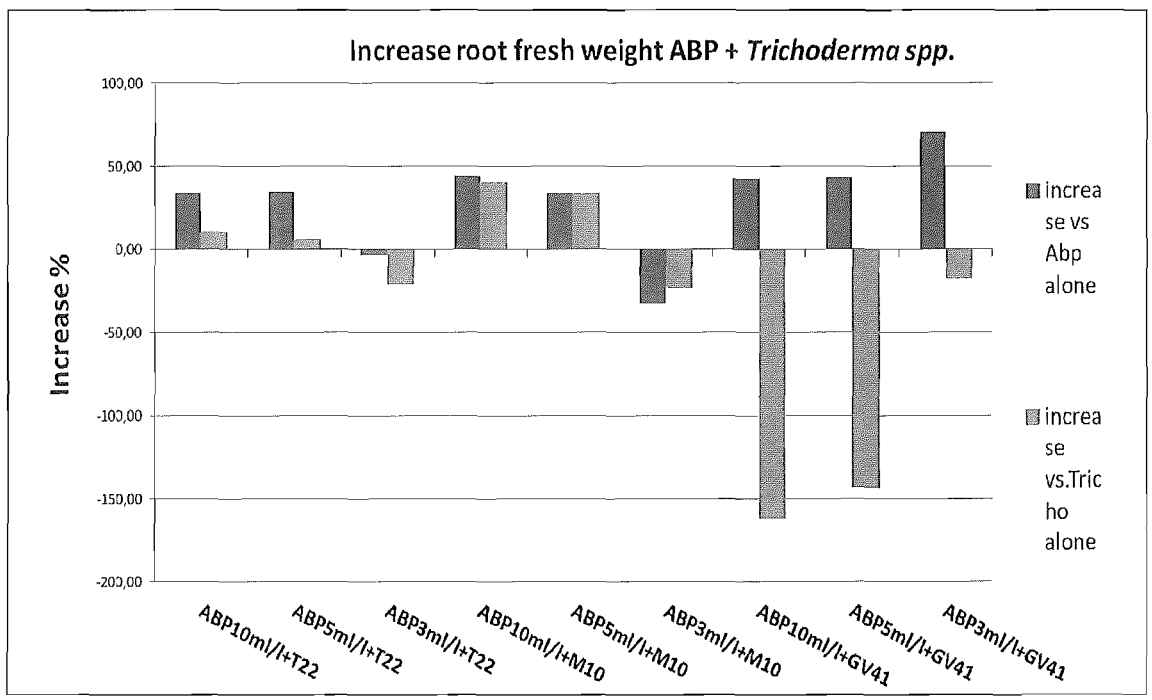
FIG. 18 shows the increase in fresh root weight of tomato plants treated with *Trichoderma* spp in combination with the product ABP-510 at different concentrations v ABP alone and *Trichoderma* spp alone.
Figure 19:
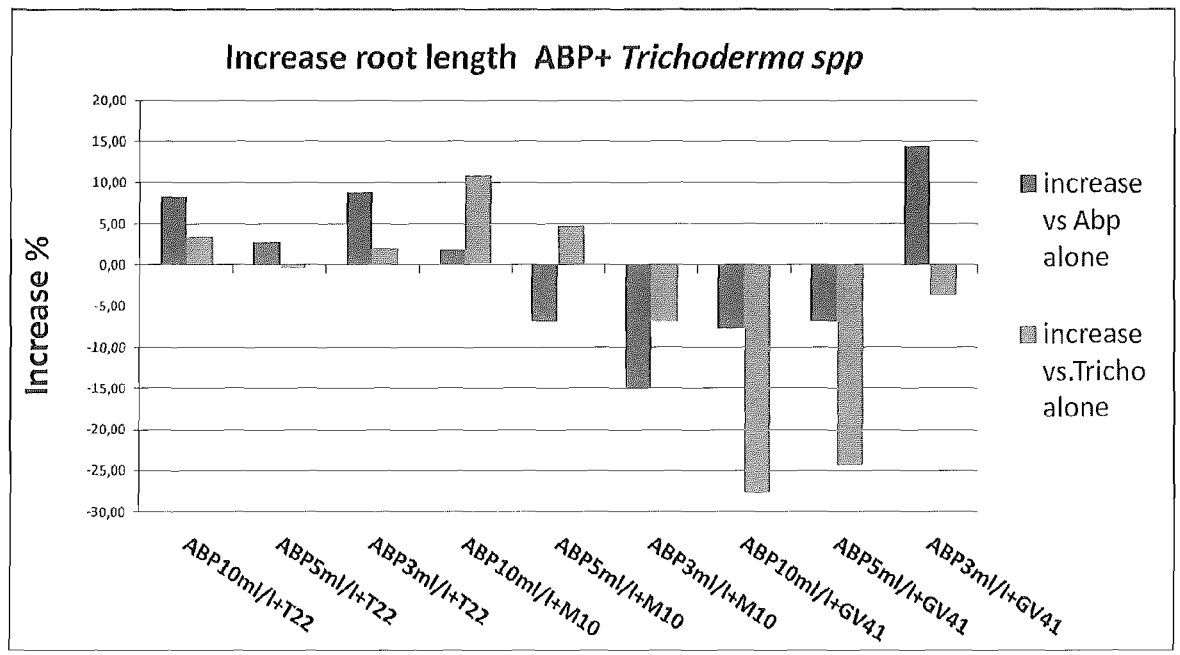
FIG. 19 shows the increase in root length of tomato plants treated with *Trichoderma* spp in combination with the product ABP-510 at different concentrations v ABP alone and *Trichoderma* spp. alone.
Figure 20:
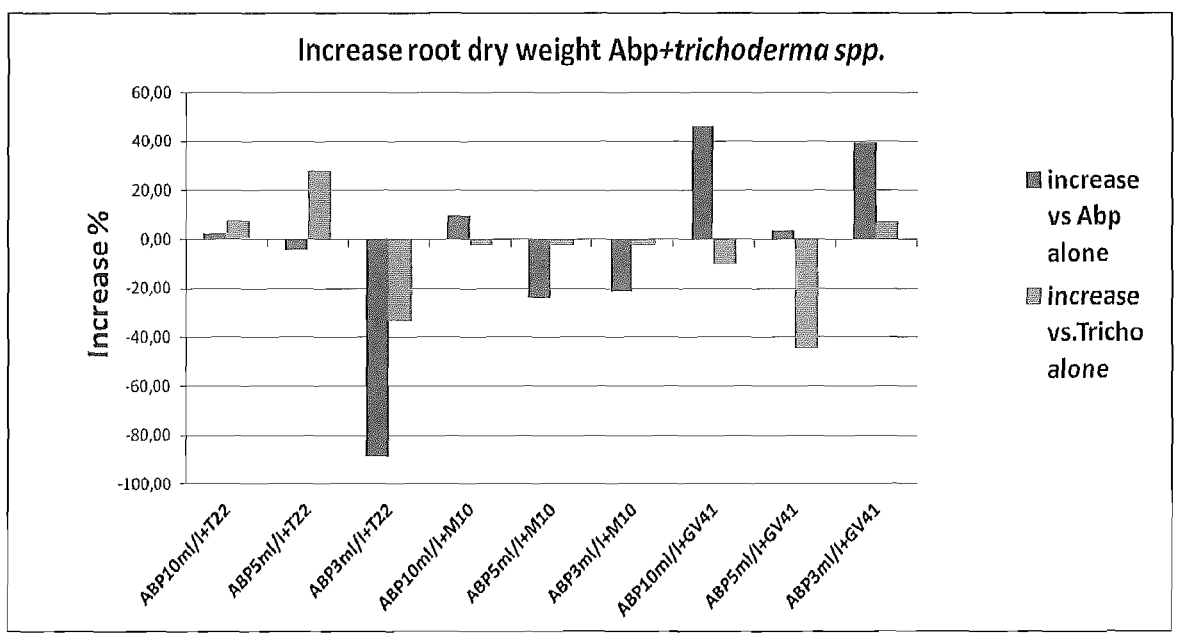
FIG. 20 shows the increase in dry root weight of tomato plants treated with *Trichoderma* spp in combination with the product ABP-510 at different concentrations v ABP alone and *Trichoderma* spp alone.
Figure 21:
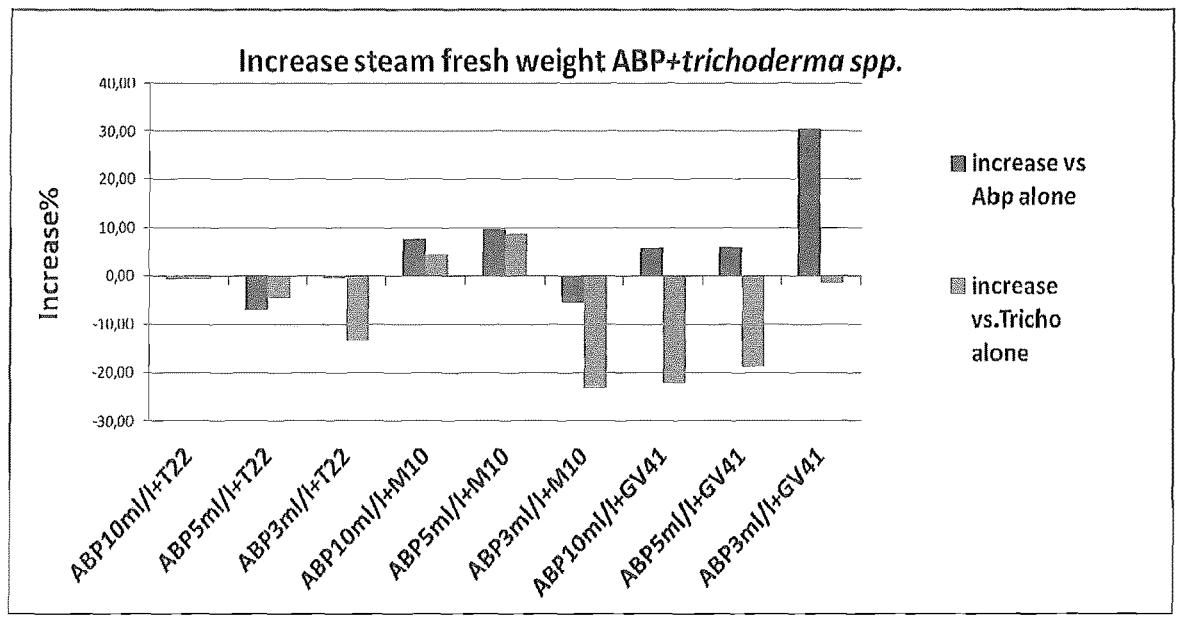
FIG. 21 shows the increase in fresh weight of the stems of tomato plants treated with *Trichoderma* spp in combination with the product ABP-510 at different concentrations v ABP alone and *Trichoderma* spp alone.
Figure 22:
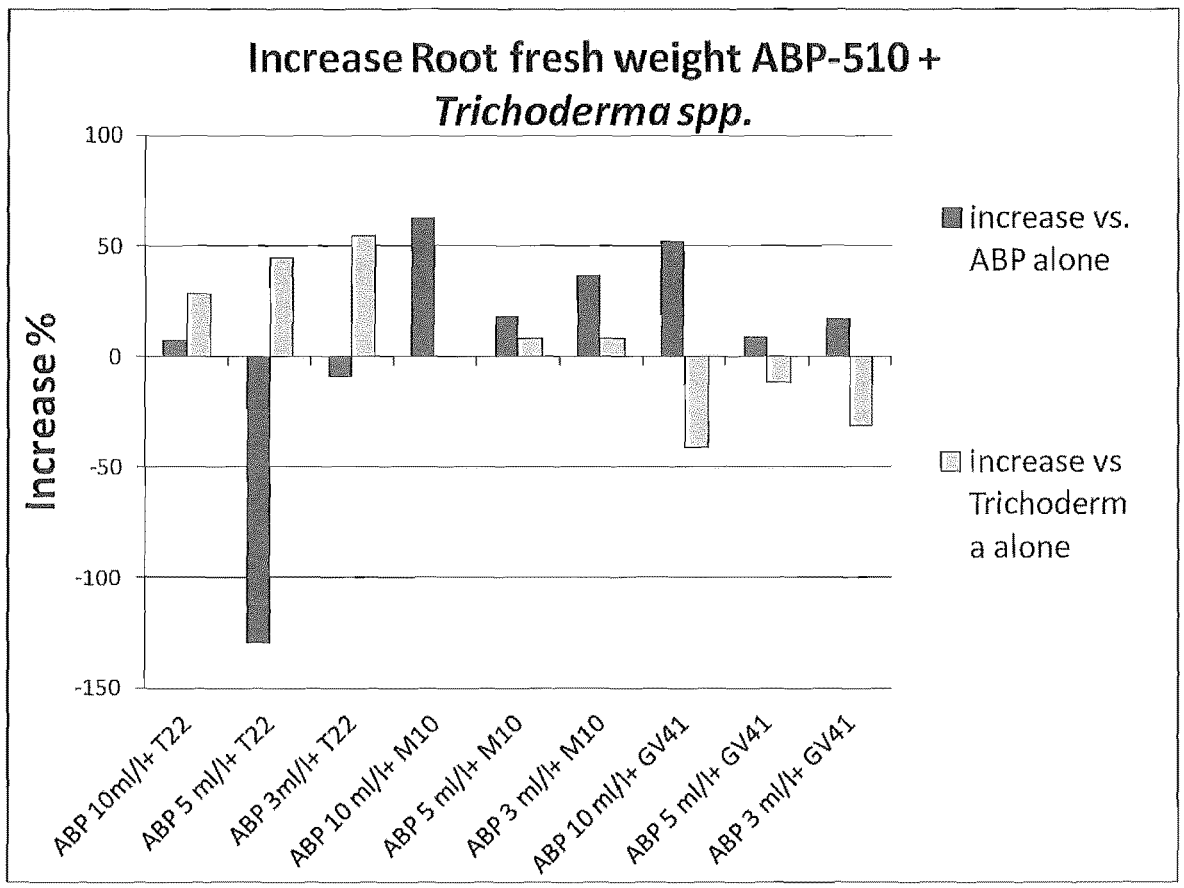
FIG. 22 shows the change in fresh root weight for tomato plants treated with ABP-510 and *Trichoderma*.
Figure 23:
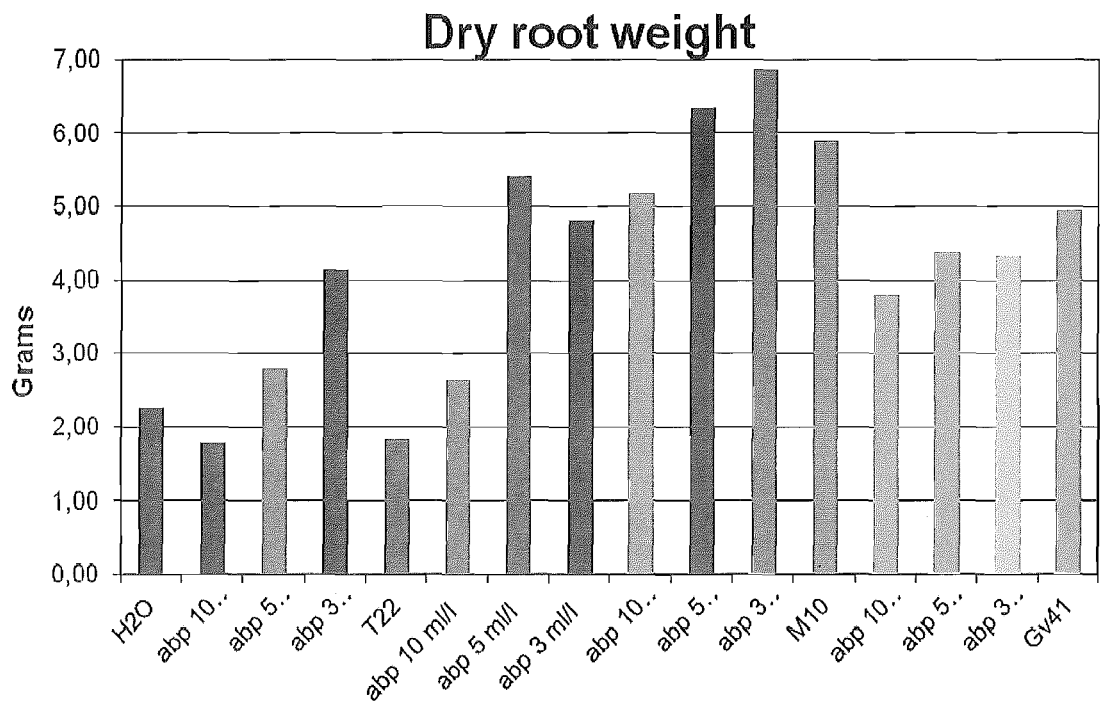
FIG. 23 shows the dry root weight for tomato plants treated with ABP-510 and *Trichoderma*.
Figure 24:
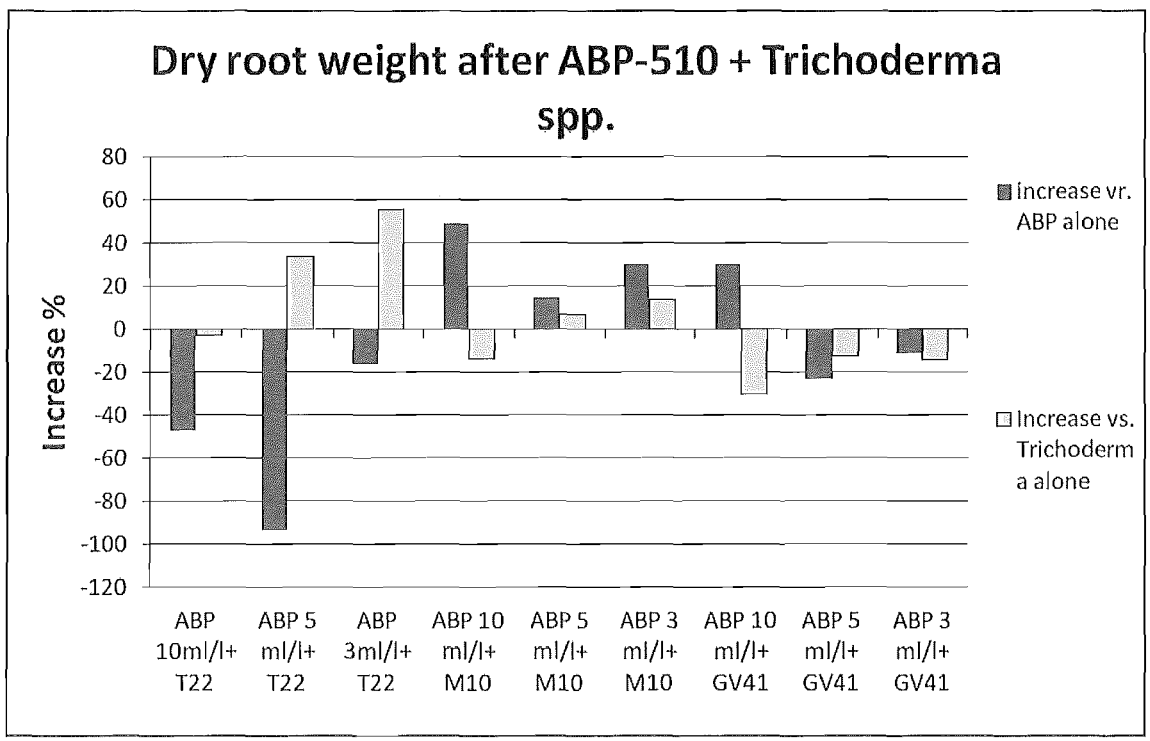
FIG. 24 shows the change in dry root weight for tomato plants treated with ABP-510 and *Trichoderma*.
Figure 25:
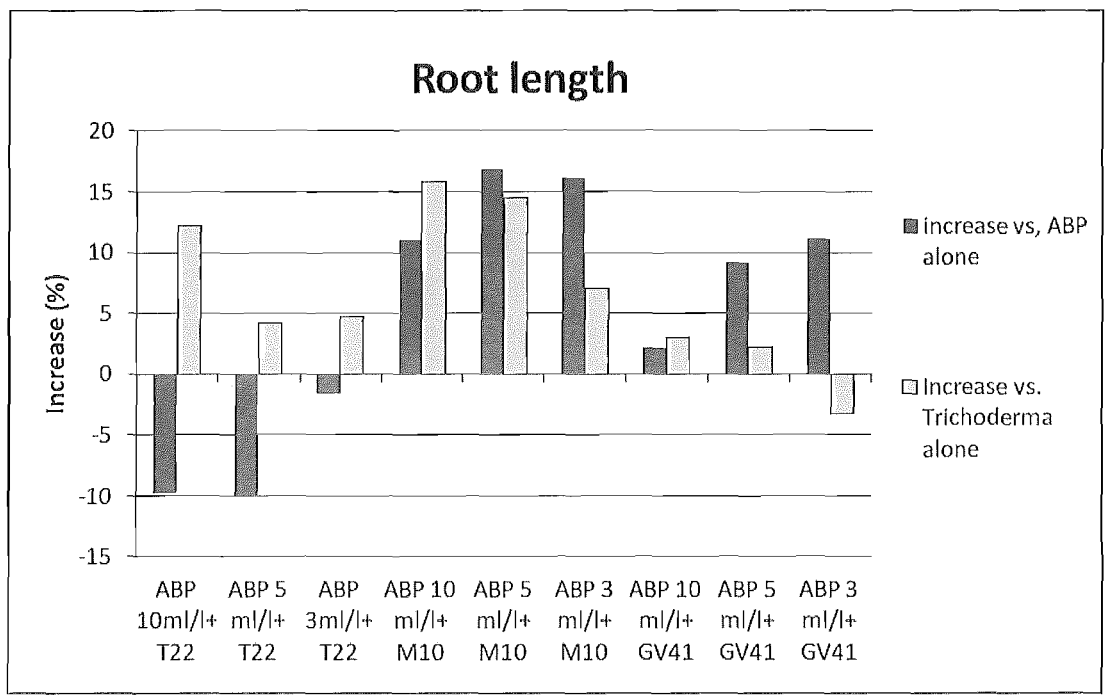
FIG. 25 shows the change in root length for tomato plants treated with ABP-510 and *Trichoderma*.
Figure 26:
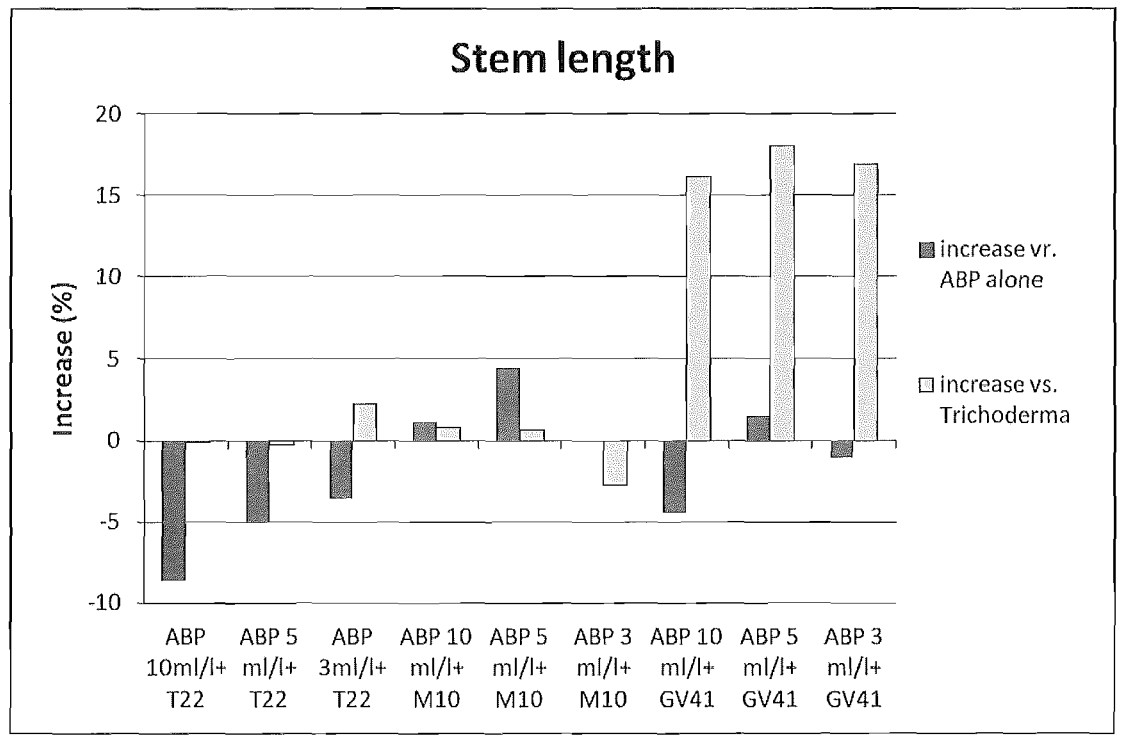
FIG. 26 shows the change in stem length for tomato plants treated with ABP-510 and *Trichoderma*.
Figure 27:
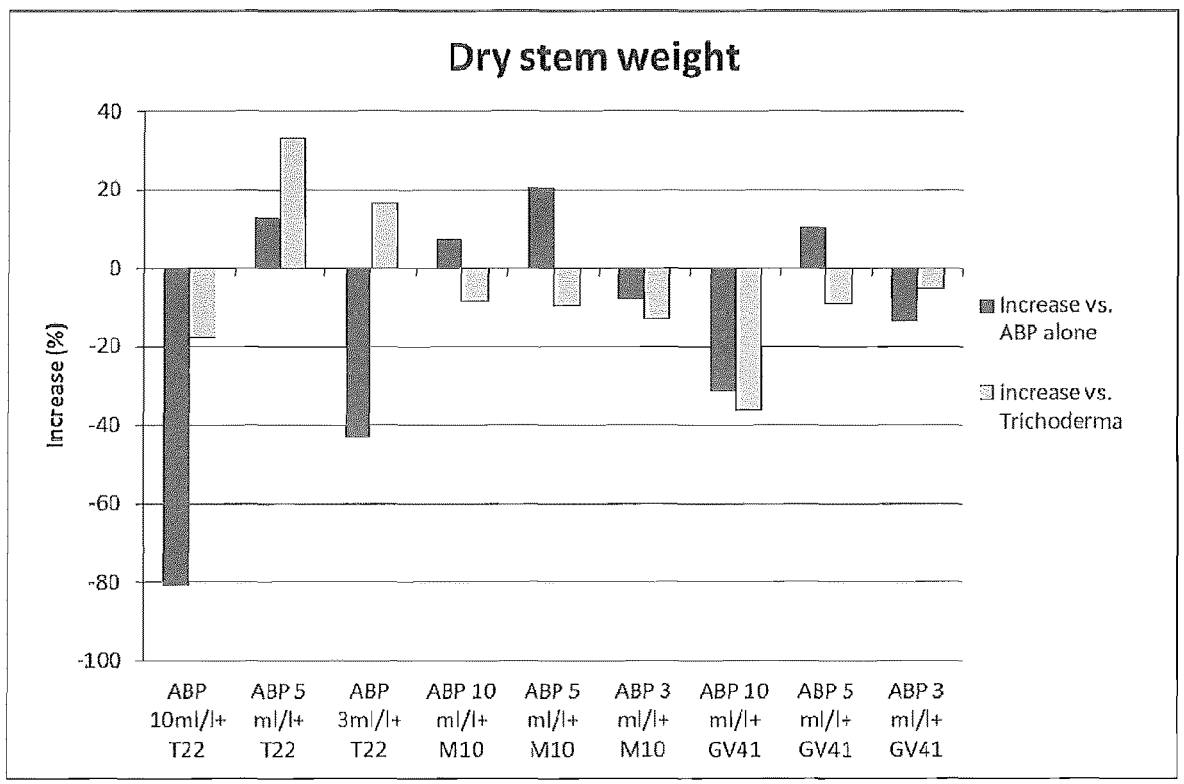
FIG. 27 shows the change in dry stem weight for tomato plants treated with ABP-510 and *Trichoderma*.

The results showed (FIGS. 16 and 17) that the addition of Trichoderma spp. can improve of the control of ABP-510 against the pathogens tested.

Example 1.10

Determination of Effect of ABP-510 Alone or in Combination with Trichoderma on Development of Disease Caused by Rhizoctonia Solani on Lettuce Plants Objective: Determine the effect of applications of ABP-510 alone or in combination with two strains of Trichoderma that belong to two different species (T. virens GV41 and T. harzianum M10.) on the development of disease caused by the soilborne pathogen Rhizoctonia solani on lettuce plants.

The treatments applied to the plants are set out in Table 14a below.

TABLE 14a

| Treatment | Concentration | Treatment Method | Frequency of Application |
|---|---|---|---|
| ABP-510 + T.Gv41 + T. M10 | 10 ml/L + Tricho $10^6$ spores $ml^{-1}$ (10 ml/plant) | soil drenching | every 7 days |
| ABP-510 + T.Gv41 + T. M10 | 5 ml/L + Tricho $10^6$ spores $ml^{-1}$ (10 ml/plant) | soil drenching | every 7 days |
| ABP-510 + T.Gv41 + T. M10 | 3 ml/L + Tricho $10^6$ spores $ml^{-1}$ ((10 ml/plant) | soil drenching | every 7 days |
| Trichoderma Gv41 + M10 | Tricho $10^6$ spores $ml^{-1}$ ((10 ml/plant) | soil drenching | every 7 days |
| ABP-510 | 10 ml/$L^{-1}$ (10 ml/plant) | soil drenching | every 7 days |
| ABP-510 | 5 ml/L (10 ml/plant) | soil drenching | every 7 days |

TABLE 14a-continued

| Treatment | Concentration | Treatment Method | Frequency of Application |
|---|---|---|---|
| ABP-510 | 3 ml/L (10 ml/plant) | soil drenching | every 7 days |
| Negative control | H2O ((10 ml/plant) | soil drenching | every 7 days |
| ABP-510 + M10 | 10 ml/L + Tricho $10^6$ spores $ml^{-1}$ (10 ml/plant) | soil drenching | every 7 days |
| ABP-510 + M10 | 5 ml/L + Tricho $10^6$ spores $ml^{-1}$ (10 ml/plant) | soil drenching | every 7 days |
| ABP-510 + M10 | 3 ml/L + Tricho $10^6$ spores $ml^{-1}$ (10 ml/plant) | soil drenching | every 7 days |
| M10 | M10 $10^6$ spores $ml^{-1}$ ((10 ml/plant)) | soil drenching | every 7 days |
| ABP-510 + GV41 | 10 ml/L + Tricho $10^6$ spores $ml^{-1}$ (10 ml/plant) | soil drenching | every 7 days |
| ABP-510 + GV41 | 5 ml/L + Tricho $10^6$ spores $ml^{-1}$ (10 ml/plant) | soil drenching | every 7 days |
| ABP-510 + GV41 | 3 ml/L + Tricho $10^6$ spores $ml^{-1}$ (10 ml/plant) | soil drenching | every 7 days |
| GV41 | GV41 $10^6$ spores $ml^{-1}$ (10 ml/plant) | soil drenching | every 7 days |

Experimental Design and description: All plants were positioned together on the same bench. There were 16 different treatments and 8 plants per treatment giving a total number of 128 plants. Dosages are indicated in Table 14a.

Potting Media: Synthetic commercial bagged soil "Green Habitat", Valcofort s.r.l., Florence, Italy. Soil was autoclaved for one hr at 120° C.

Treatments: lettuce plants, 2 week old, were transplanted into 10 cm diameter pots containing infested soil with *Rhizoctonia solani*.

Two days after transplanting in infested soil, plants were watered with 10 ml of single and combined solutions (M10+Gv41+ABP510; M10+ABP 510; GV41+ABP510). Three successive applications were performed weekly.

Negative control was obtained by watering soil with water only. Each set of treatments consisted of 8 plants. All the tests were carried out in greenhouse under controlled temperature. No additional chemicals were applied.

Duration of the test: 4 weeks after treatment.

Inoculation technique: Two-week-old plants of lettuce were used for this experiment. Plants were incubated in a greenhouse under natural temperature and light conditions to establish optimum conditions for pathogen development.

Fungicide ABP-510 was used at three different concentrations; 10, 5 and 3 ml/L, and the combined solution was obtained by diluting in the product a suspension of spores of *Trichoderma* spp. obtaining a final concentration of $10^6$ spores $ml^{-1}$. Lettuce plants, two days after transplanting in infested soil, were washed with 50 ml of single and combined solutions (*Trichoderma*+ABP510). Three successive applications were performed weekly. Negative control was obtained by drenching the soil with water only.

The fungal pathogen *Rhizoctonia solani* was grown in PDB for about 15 days. The mycelial biomass was vacuum harvested in a Buchner tunnel lined with Miracloth. All liquid substrate was removed, and the semi-dry fungal biomass was weighed. The weighed fungal biomass was added to water and homogenized in a Waring blender until a homogeneous fungal suspension was obtained. Soil was mixed with fungal suspension to a concentration of 5 g of biomass per kg of sterile soil.

Data Collection and Evaluation

Disease efficacy: Disease development was monitored every 7 days recording the number of wilted plants with obvious dark-brown lesions on the stem at or just beneath the soil level, or death as a result of an extensive lower stem rot.

Summary of Results

Figure 31:
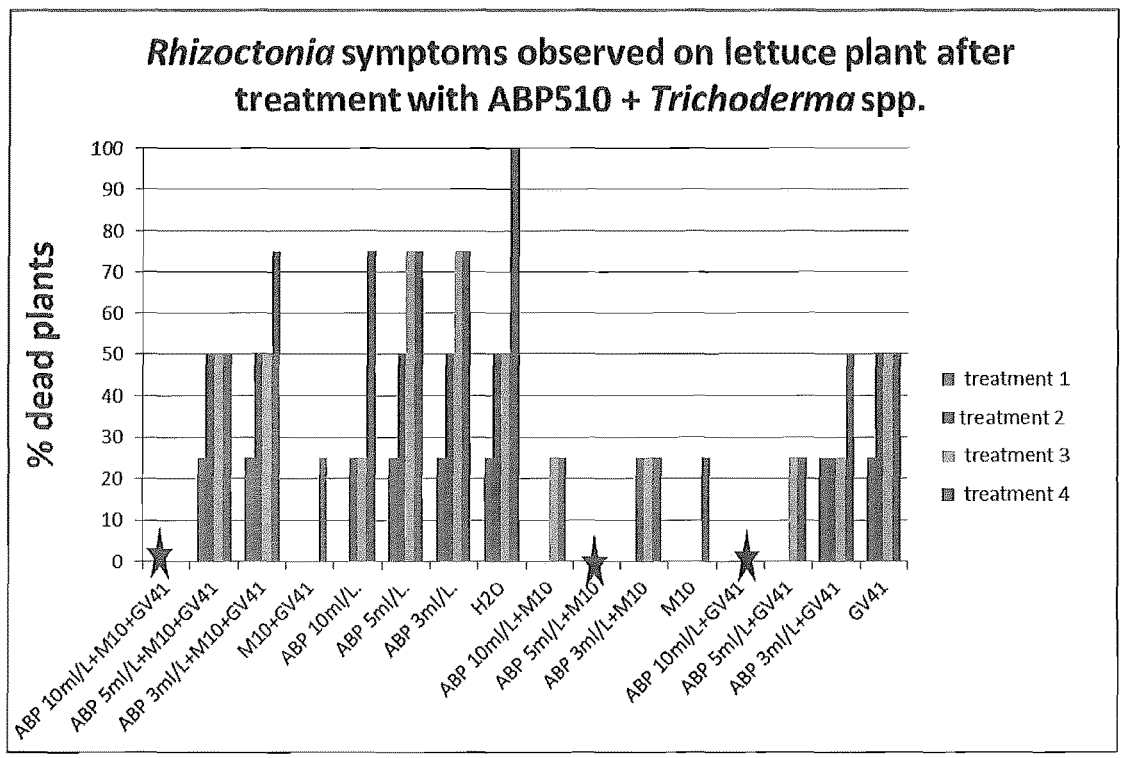
FIG. 31 shows the percentage of dead lettuce plants affected by *R. solani* following different treatments.

Preliminary results (FIG. 31, treatment 1 to treatment 4 from left to right for each test) indicated that development of *Rhizoctonia* infections was slightly reduced by treatment with the fungicide ABP 510 at the three tested concentrations. In particular the percentage of dead plants was reduced by 25% compared to water control.

Regarding the evaluation of the synergistic interaction of the product ABP-510 with *Trichoderma* spp., preliminary results showed that the application of ABP-510 with both strains of *Trichoderma*, alone or in mixture, always had a synergistic interaction in comparison with single application of the product. In general, application of the product ABP-510 in combination whit the single strain M10 or GV41 were better compared with mix of two strains. In addition, the combination with M10 was better, probably because due to the greater ability of the strain to control *Rhizoctonia* compared to the strain GV41

Combination between ABP-510 and *T. harzianum* M10 seems to be more effective in terms dose-effect; in fact, 5 ml/l+M10 protects the plants from the attack of *Rhizoctonia* like the same treatments 10 ml/l+M10+GV41 and 10 ml/l+GV41 (these differences may be given by the different sensibility of the strain to the fungicide.

Example 1.11

Determination of effect of ABP-510 Alone or in Combination with *Trichoderma* on Development of Disease Caused by *Sclerotinia Sclerothiorum* on Lettuce Plants Objective: Determine the effect of applications of the product fungicide ABP-510 alone or in combination with three strains of *Trichoderma* that belong to two different species (*T. harzianum* T22, *T. harzianum* M10, *T. virens* GV41) on the development of disease caused by the soil-borne pathogen *Sclerotinia sclerothiorum* on lettuce plants.

The treatments applied to the plants are shown in table 14b below.

TABLE 14b

| Treatment | Concentration | Treatment Method | Frequency of Application |
|---|---|---|---|
| ABP-510 + T.22 | 10 ml/L + Tricho $10^6$ spores $ml^{-1}$ (50 ml/plant) | soil drenching | every 7 days |
| ABP-510 + T.22 | 5 ml/L + Tricho $10^6$ spores $ml^{-1}$ (50 ml/plant) | soil drenching | every 7 days |
| ABP-510 + T.22 | 3 ml/L + Tricho $10^6$ spores $ml^{-1}$ (50 ml/plant) | soil drenching | every 7 days |
| Trichoderma harzianum T22 | Tricho $10^6$ spores $ml^{-1}$ (50 ml/plant) | soil drenching | every 7 days |
| ABP-510 | 10 ml/$L^{-1}$ (50 ml/plant) | soil drenching | every 7 days in |
| ABP-510 | 5 ml/L (50 ml/plant) | soil drenching | every 7 days |
| ABP-510 | 3 ml/L (50 ml/plant) | soil drenching | every 7 days |
| Negative control | H2O (50 ml/plant) | soil drenching | every 7 days |
| ABP-510 + M10 | 10 ml/L + Tricho $10^6$ spores $ml^{-1}$ (50 ml/plant) | soil drenching | every 7 days |
| ABP-510 + M10 | 5 ml/L + Tricho $10^6$ spores $ml^{-1}$ (50 ml/plant) | soil drenching | every 7 days |
| ABP-510 + M10 | 3 ml/L + Tricho $10^6$ spores $ml^{-1}$ (50 ml/plant) | soil drenching | every 7 days |
| M10 | M10 $10^6$ spores $ml^{-1}$ (50 ml/plant) | soil drenching | every 7 days |
| ABP-510 + GV41 | 10 ml/L + Tricho $10^6$ spores $ml^{-1}$ (50 ml/plant) | soil drenching | every 7 days |
| ABP-510 + GV41 | 5 ml/L + Tricho $10^6$ spores $ml^{-1}$ ((50 ml/plant) | soil drenching | every 7 days |
| ABP-510 + GV41 | 3 ml/L + Tricho $10^6$ spores $ml^{-1}$ (50 ml/plant) | soil drenching | every 7 days |
| GV41 | GV41 $10^6$ spores $ml^{-1}$ (50 ml/plant) | soil drenching | every 7 days |

Experimental Design and description: All plants were positioned together on the same bench. There were 16 different treatments and 8 plants per treatment giving a total number of 128 plants. Dosages are indicated in Table 14b. No additional chemicals were applied.

Potting Media: Synthetic commercial bagged soil (universal peat moss) "Green Habitat", Valcofort s.r.l., Florence, Italy. Soil was autoclaved for one hr at 120° C.

Treatments: lettuce plants, 2 week old, were transplanted into 10 cm diameter pots containing infested soil with Sclerotinia spp.

Two days after transplanting in infested soil, plants were watered with 10 ml of single and combined solutions (M10+Gv41+ABP510; M10+ABP 510; GV41+ABP510). Three successive applications were performed weekly.

Negative control was obtained by watering soil with water only. Each set of treatments consisted of 8 plants. All the tests were carried out in greenhouse under controlled temperature.

Duration of the test: 4 weeks after treatment.

Inoculation technique: Two-week-old plants of lettuce were used for this experiment. Plants were incubated in a greenhouse under natural temperature and light conditions to establish optimum conditions for pathogen development.

Fungicide ABP-510 was used at three different concentrations; 10, 5 and 3 ml/L, and the combined solution was obtained by diluting in the product a suspension of spores of Trichoderma spp. obtaining a final concentration of $10^6$ spores $ml^{-1}$. Lettuce plants, two days after transplanting in infested soil, were washed with 50 ml of single and combined solutions (Trichoderma+ABP510). Three successive applications were performed weekly. Negative control was obtained by drenching soil with water only.

The fungal pathogen Sclerotinia was grown in PDB for about 15 days. The mycelial biomass was vacuum harvested in a Buchner tunnel lined with Miracloth. All liquid substrate was removed, and the semi-dry fungal biomass was weighed. The weighed fungal biomass was added to water and homogenized in a Waring blender until a homogeneous fungal suspension was obtained. Soil was mixed with fungal suspension to a concentration of 5 g of biomass per kg of sterile soil.

Data Collection and Evaluation

Figure 32:
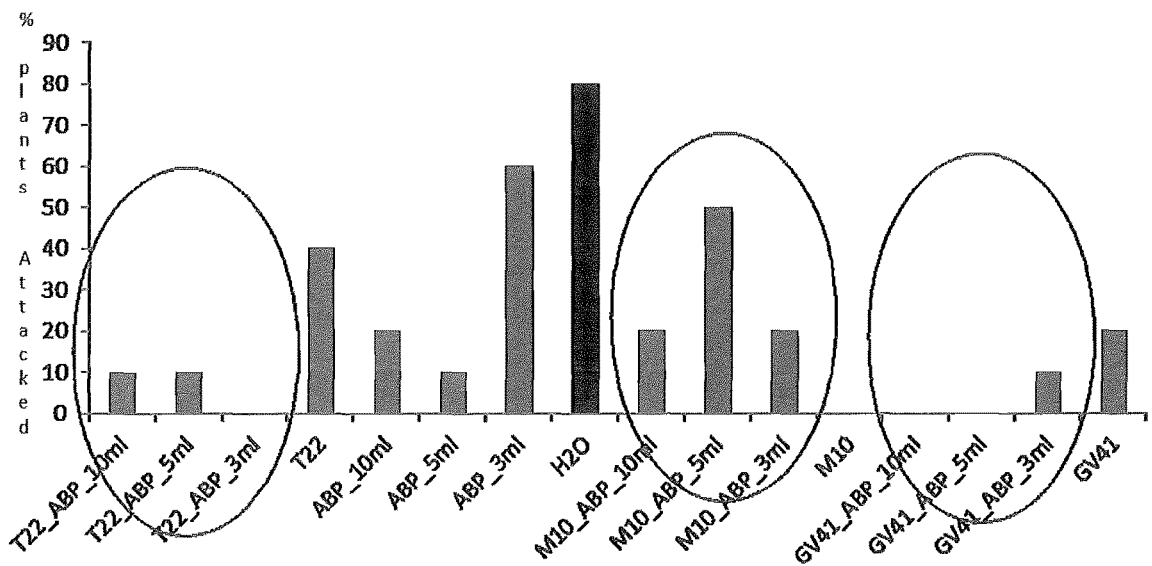
FIG. 32 shows the percentage of dead lettuce plants affected by *Sclerotinia* following different treatments.

Disease efficacy: Disease development was monitored every 7 days recording the number of plants attacked Summary of Results Preliminary results (FIG. 32) indicated that development of Sclerotinia spp. infections was slightly reduced by treatment with the fungicide ABP 510 at the three tested concentrations. In particular for the treatment ABP 5 ml/l, the percentage of dead plants was reduced significantly compared to water control Regarding the evaluation of the synergistic interaction of the product with Trichoderma spp., preliminary results showed that the application with Trichoderma viride Gv41 and Trichoderma harzianum T22 always had a synergistic interaction in comparison with single application. In addition, the combination with M10 was less efficient.

Combination between ABP-510 and T. harzianum T22 seems to be more effective in terms dose-effect; in fact, 3ml/l+T22 protects the plants from the attack of Sclerotinia better compared to all other treatments (these differences may be given by the different sensibility of the strain to the fungicide).

Example 1.12

Determination of Effect of ABP-510 Alone or in Combination with *Trichoderma* on Development of Disease Caused by Naturally Occurring *Sclerotinia* on Lettuce Plants Objective: Determine the effect of applications of the product fungicide ABP-510 alone or in combination with two strains of *Trichoderma* that belong to two different species (*T. virens* GV41 and *T. harzianum* M10) on the development of naturally occurring *Sclerotinia* disease on lettuce plant in field.

The treatments applied to the plants are set out in Table 14c below.

320 plants. Dosages are indicated in Table 14c. No additional chemicals were applied to the plants.

Potting Media: Synthetic commercial bagged soil (universal peat moss) "Green Habitat", Valcofort s.r.l., Florence, Italy. Soil was autoclaved for one hr at 120° C.

Treatments: Three weeks after sowing in polystyrene boxes, lettuce seedlings were washed with 5 ml of single and combined solutions (M10+Gv41+ABP510; M10+ABP 510; GV41+ABP510). A subsequent application was made after seven days. Subsequently the plants were transplanted in soil under plastic tunnels and were washed with 50 ml of single and combined solutions. Negative control was obtained by drenching the soil with water only. The treatments were repeated every 15 days, for two months, by drenching the soil with 50 ml of single and combined solution.

Duration of the test: 8 weeks after transplant in soil under plastic tunnels.

TABLE 14c

| Treatment | Concentration | Treatment Method | Frequency of Application |
|---|---|---|---|
| ABP-510 + T.Gv41 + T. M10 | 10 ml/L + Tricho $10^6$ spores ml$^{-1}$ (5 ml/plant in polystyrene box; 50 ml/plant in field) | soil drenching | every 7 days in polystyrene box/15 days in field |
| ABP-510 + T.Gv41 + T. M10 | 5 ml/L + Tricho $10^6$ spores ml$^{-1}$ (5 ml/plant in polystyrene box; 50 ml/plant in field) | soil drenching | every 7 days in polystyrene box/15 days in field |
| ABP-510 + T.Gv41 + T. M10 | 3 ml/L + Tricho $10^6$ spores ml$^{-1}$ (5 ml/plant in polystyrene box; 50 ml/plant in field) | soil drenching | every 7 days in polystyrene box/15 days in field |
| *Trichoderma* Gv41 + M10 | Tricho $10^6$ spores ml$^{-1}$ (5 ml/plant in polystyrene box; 50 ml/plant in field) | soil drenching | every 7 days in polystyrene box/15 days in field |
| ABP-510 | 10 ml/L$^{-1}$ (5 ml/plant in polystyrene box; 50 ml/plant in field) | soil drenching | every 7 days in polystyrene box/15 days in field |
| ABP-510 | 5 ml/L (5 ml/plant in polystyrene box; 50 ml/plant in field) | soil drenching | every 7 days in polystyrene box/15 days in field |
| ABP-510 | 3 ml/L (5 ml/plant in polystyrene box; 50 ml/plant in field) | soil drenching | every 7 days in polystyrene box/15 days in field |
| Negative control | H2O (5 ml/plant in polystyrene box; 50 ml/plant in field) | soil drenching | every 7 days in polystyrene box/15 days in field |
| ABP-510 + M10 | 10 ml/L + Tricho $10^6$ spores ml$^{-1}$ (5 ml/plant in polystyrene box; 50 ml/plant in field) | soil drenching | every 7 days in polystyrene box/15 days in field |
| ABP-510 + M10 | 5 ml/L + Tricho $10^6$ spores ml$^{-1}$ (5 ml/plant in polystyrene box; 50 ml/plant in field) | soil drenching | every 7 days in polystyrene box/15 days in field |
| ABP-510 + M10 | 3 ml/L + Tricho $10^6$ spores ml$^{-1}$ (5 ml/plant in polystyrene box; 50 ml/plant in field) | soil drenching | every 7 days in polystyrene box/15 days in field |
| M10 | M10 $10^6$ spores ml$^{-1}$ (5 ml/plant in polystyrene box; 50 ml/plant in field) | soil drenching | every 7 days in polystyrene box/15 days in field |
| ABP-510 + GV41 | 10 ml/L + Tricho $10^6$ spores ml$^{-1}$ 5 ml/plant in polystyrene box; 50 ml/plant in field) | soil drenching | every 7 days in polystyrene box/15 days in field |
| ABP-510 + GV41 | 5 ml/L + Tricho $10^6$ spores ml$^{-1}$ (5 ml/plant in polystyrene box; 50 ml/plant in field) | soil drenching | every 7 days in polystyrene box/15 days in field |
| ABP-510 + GV41 | 3 ml/L + Tricho $10^6$ spores ml$^{-1}$ (5 ml/plant in polystyrene box; 50 ml/plant in field) | soil drenching | every 7 days in polystyrene box/15 days in field |
| GV41 | GV41 $10^6$ spores ml$^{-1}$ (5 ml/plant in polystyrene box; 50 ml/plant in field) | soil drenching | every 7 days in polystyrene box/15 days in field |

Experimental design and description: Each of the 16 treatments was applied to 20 plants, giving a total number of Inoculation technique: Four week-old plants of lettuce were transplanted in field under plastic tunnel.

Fungicide ABP-510 was used at three different concentrations; 10, 5 and 3 ml/L, and the combined solution was obtained by diluting in the product a suspension of spores of Trichoderma spp. obtaining a final concentration of 106 spores ml-1. Lettuce plants, after transplanting in field, were washed with 50 ml of single and combined solutions (ABP510+Trichoderma). Four successive applications were performed every 15 days for two months. Negative control was obtained by drenching the soil with water only.

The pathogenic infections arose due to natural infection of the lettuce plants in a field by the pathogens Sclerotinia spp. and Botrytis cinerea.

Data Collection and Evaluation

Disease efficacy: Disease development was monitored, every 15 days for two months after transplanting (transplanting 14-10; 28/10; 11/11; 25/11; 10/12; harvest 17/12), by recording the number of plants attacked.

Summary of Results

Sclerotinia disease was first seen 4 weeks after transplant in field, with a large increase in disease incidence 5-6 weeks after transplant.

Figure 33:
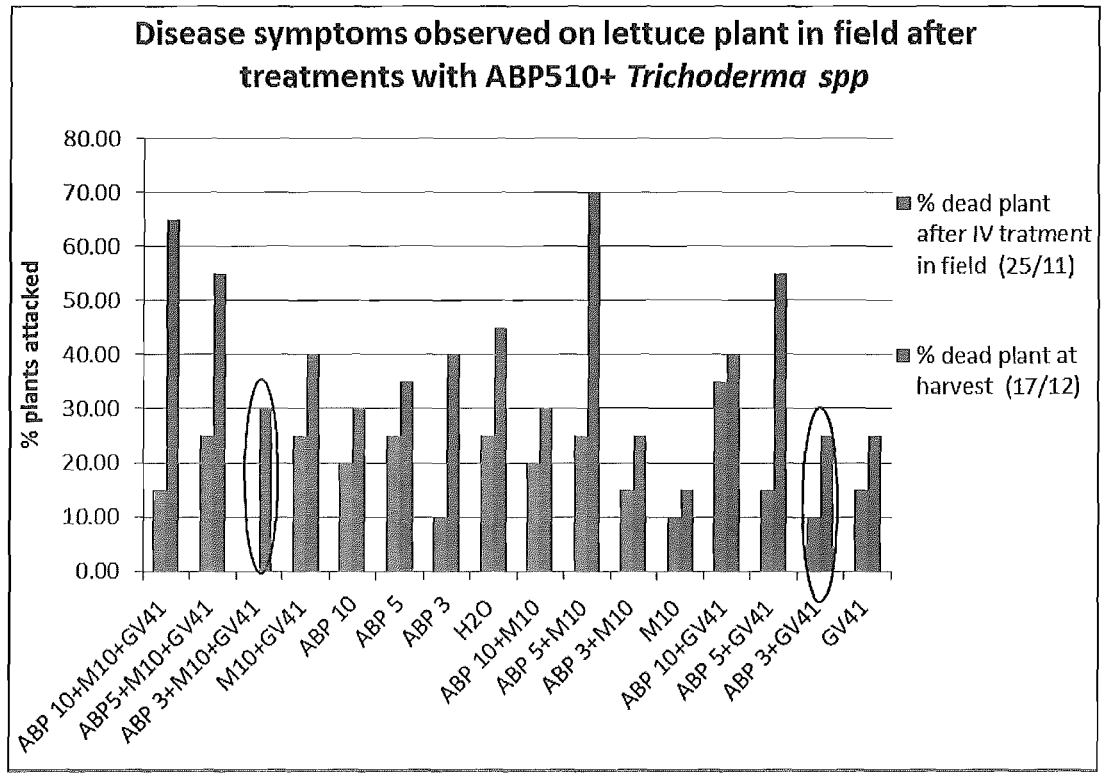
FIG. 33 shows the percentage of lettuce plants affected by naturally occurring *Sclerotinia* following different treatments.
Figure 34:
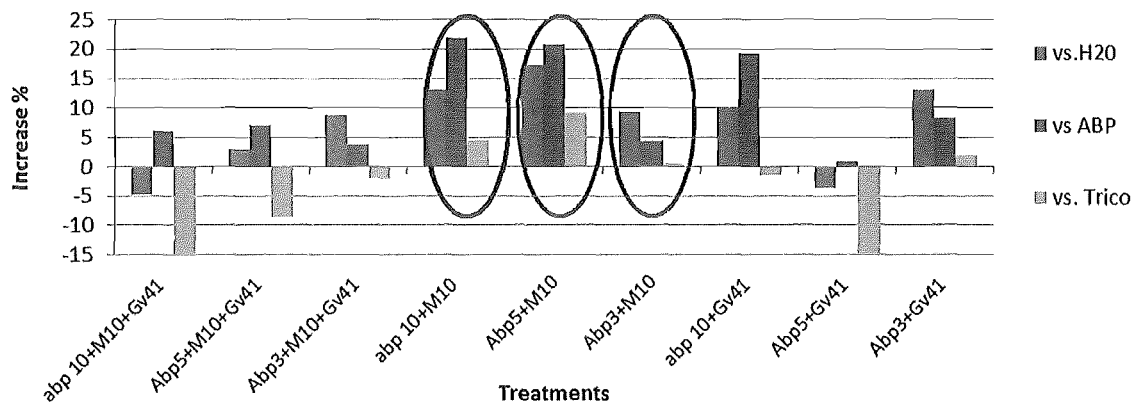
FIG. 34 shows increase of the circumferences of turnip cabbage plants treated with *Trichoderma* spp. in combination with the product ABP 510 at different concentrations vs. water control, ABP alone and *Trichoderma* spp. alone.
Figure 35:
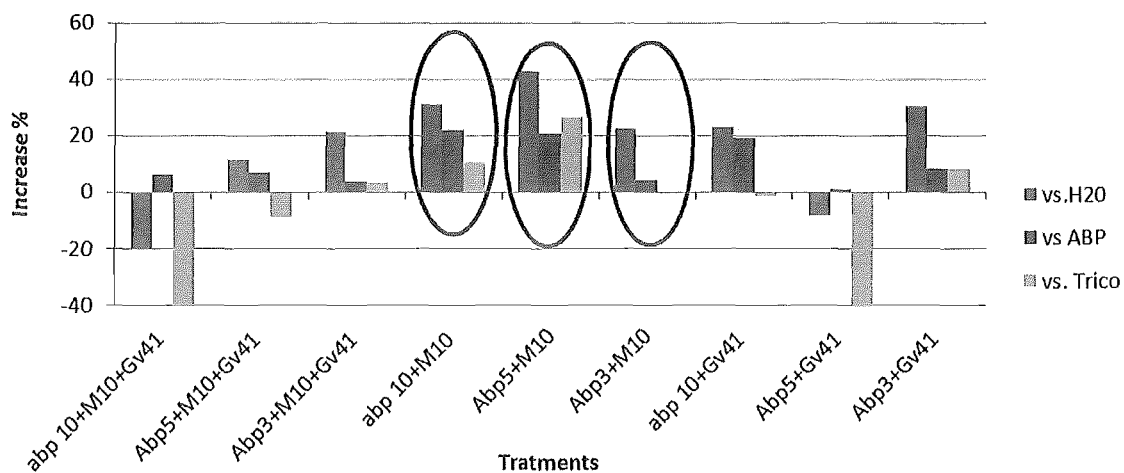
FIG. 35 shows increase of the fresh weight of turnip cabbage plants treated with *Trichoderma* spp. in combination with the product ABP-510 at different concentrations vs. water control, ABP alone and *Trichoderma* spp. alone.
Figure 36:
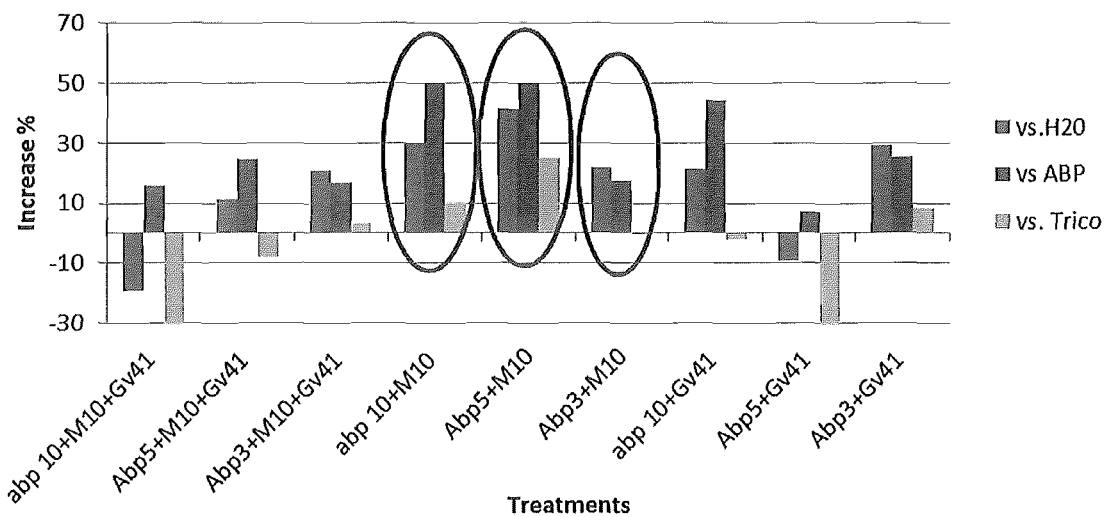
FIG. 36 shows increase of the Fresh weight of turnip cabbage-whole plants treated with *Trichoderma* spp. in combination with the product ABP-510 at different concentrations vs. water control, ABP-510 alone and *Trichoderma* spp. alone.
Figure 37:
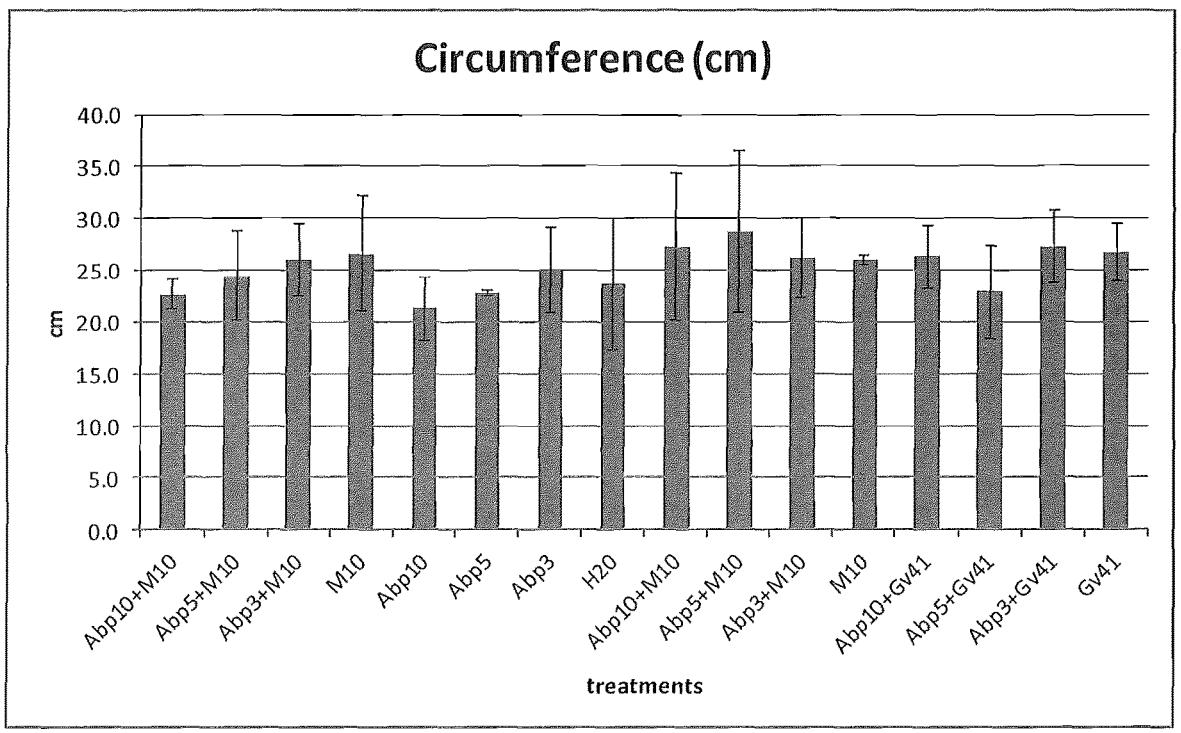
FIG. 37 shows circumferences of turnip cabbage plants treated with *Trichoderma* spp. in combination with the product ABP-510 at different concentrations.
Figure 38:
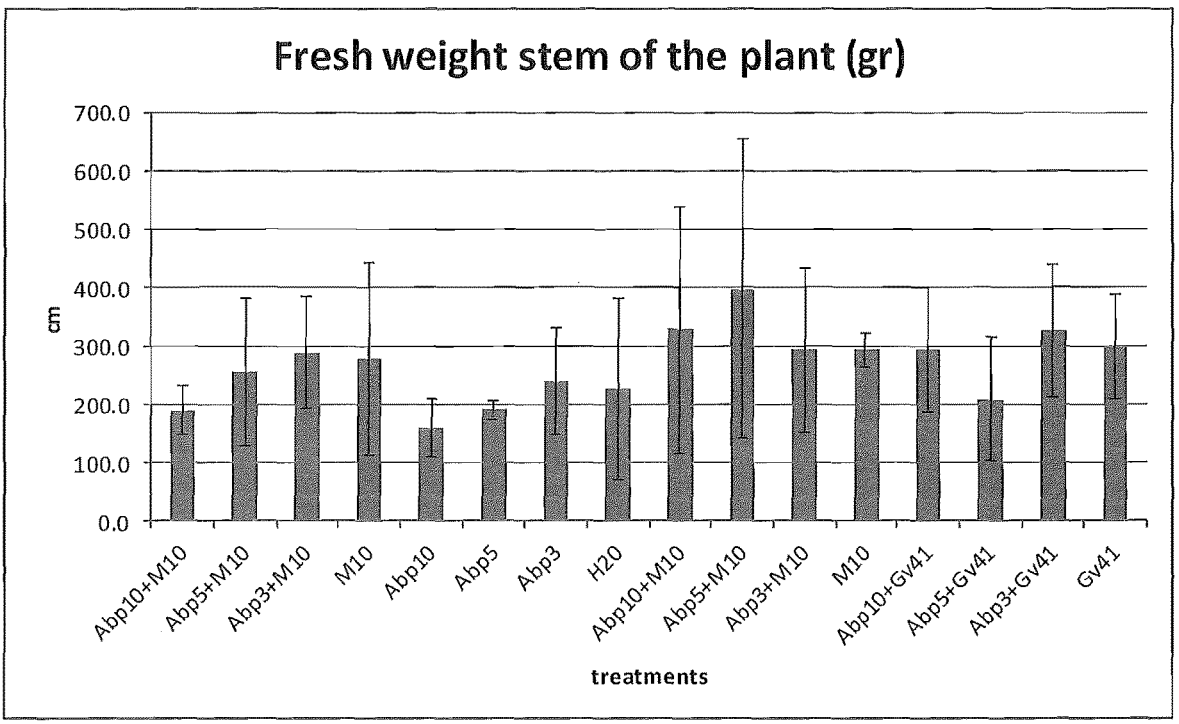
FIG. 38 shows fresh weight of stem of turnip cabbage plants treated with *Trichoderma* spp. in combination with the product ABP-510 at different concentrations.
Figure 39:
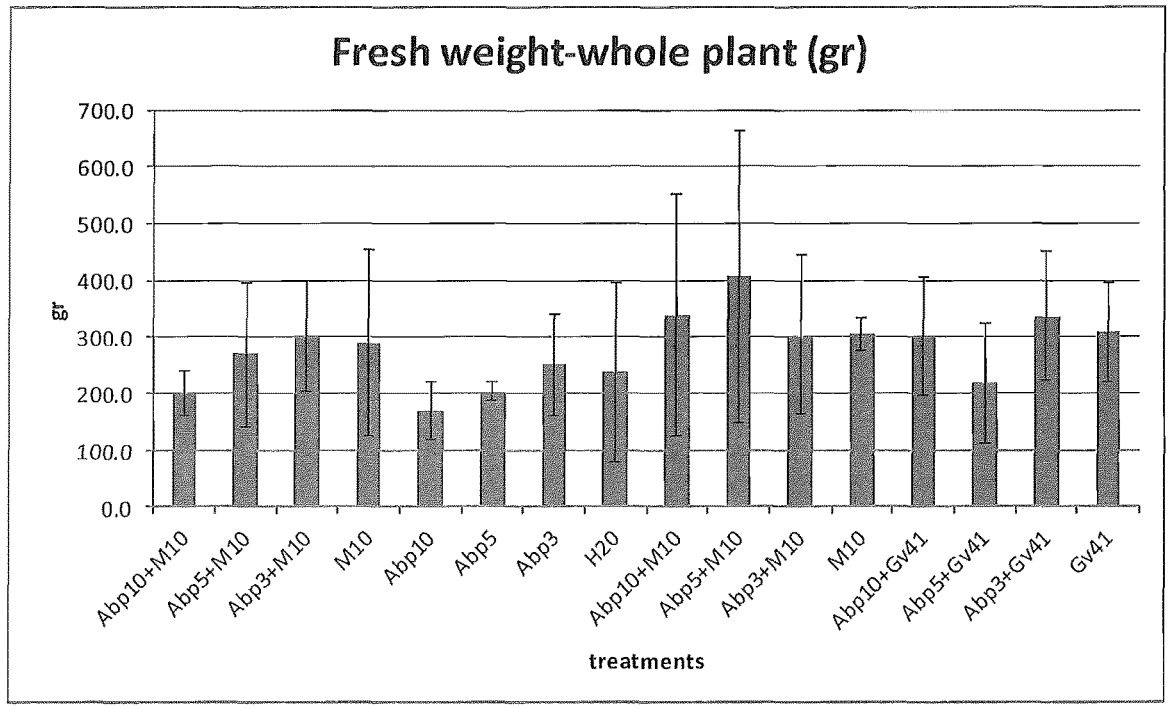
FIG. 39 shows fresh weight turnip cabbage whole plants treated with *Trichoderma* spp. in combination with the product ABP-510 at different concentrations.
Figure 40:
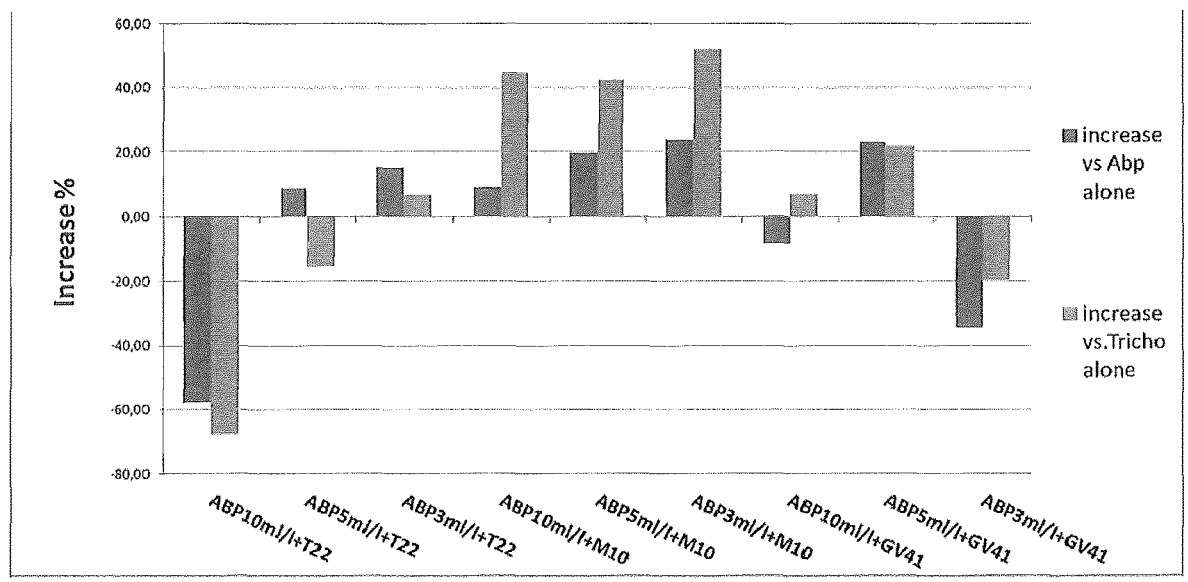
FIG. 40 shows the increase in root fresh weight of tomato plants treated with *Trichoderma* spp. in combination with the product ABP-510 at different concentrations vs. ABP alone and *Trichoderma* spp. alone.
Figure 41:
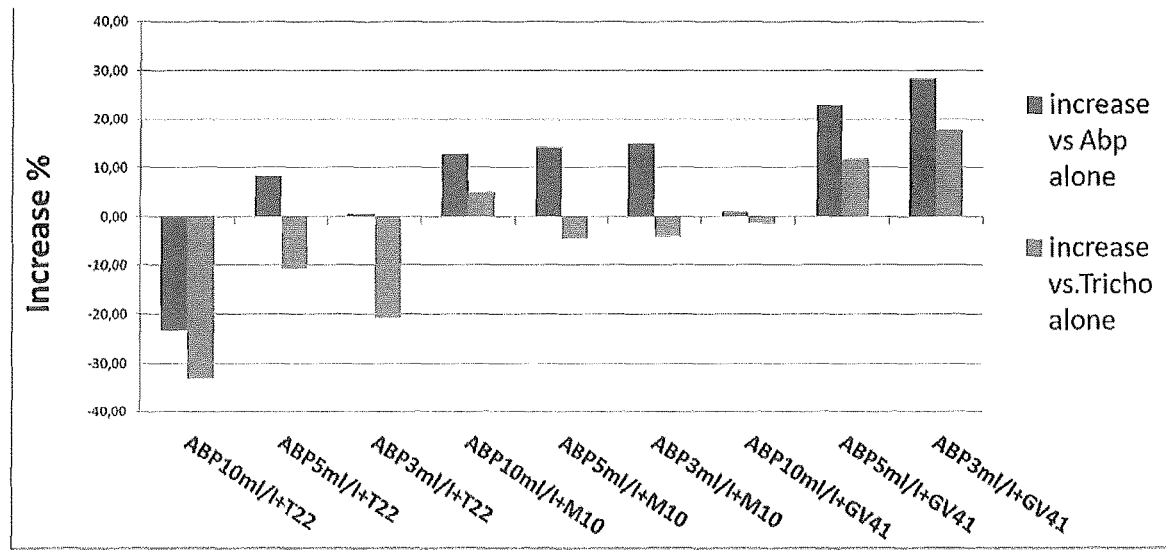
FIG. 41 shows increase in root length of tomato plants treated with *Trichoderma* spp. in combination with the product ABP 510 at different concentrations vs. ABP alone and *Trichoderma* spp. alone.
Figure 42:
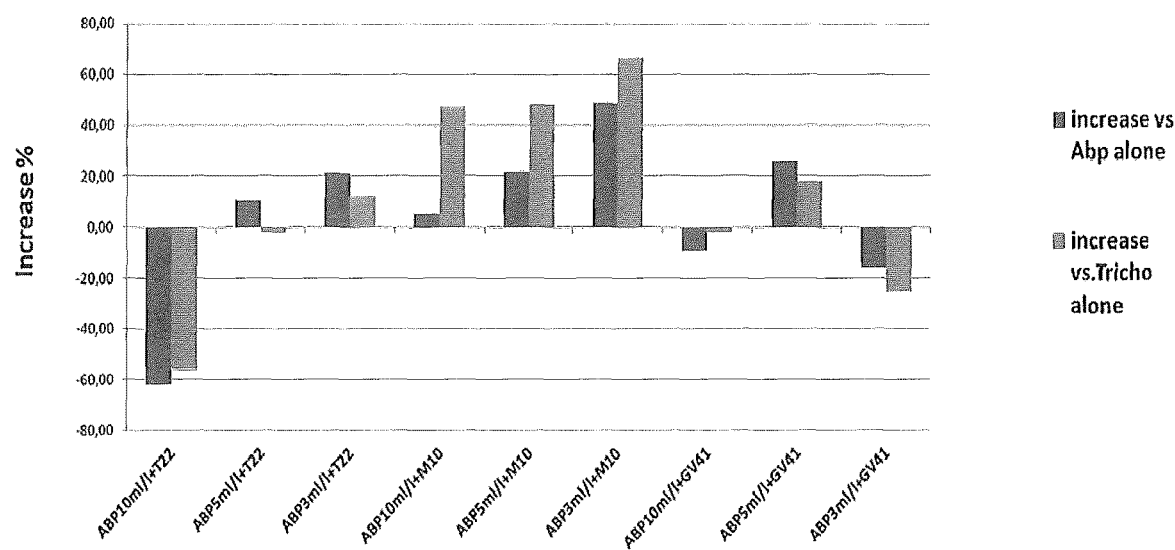
FIG. 42 shows the increase in root dry weight of tomato plants treated with *Trichoderma* spp. in combination with the product ABP 510 at different concentrations yr. ABP alone and *Trichoderma* spp. alone
Figure 43:
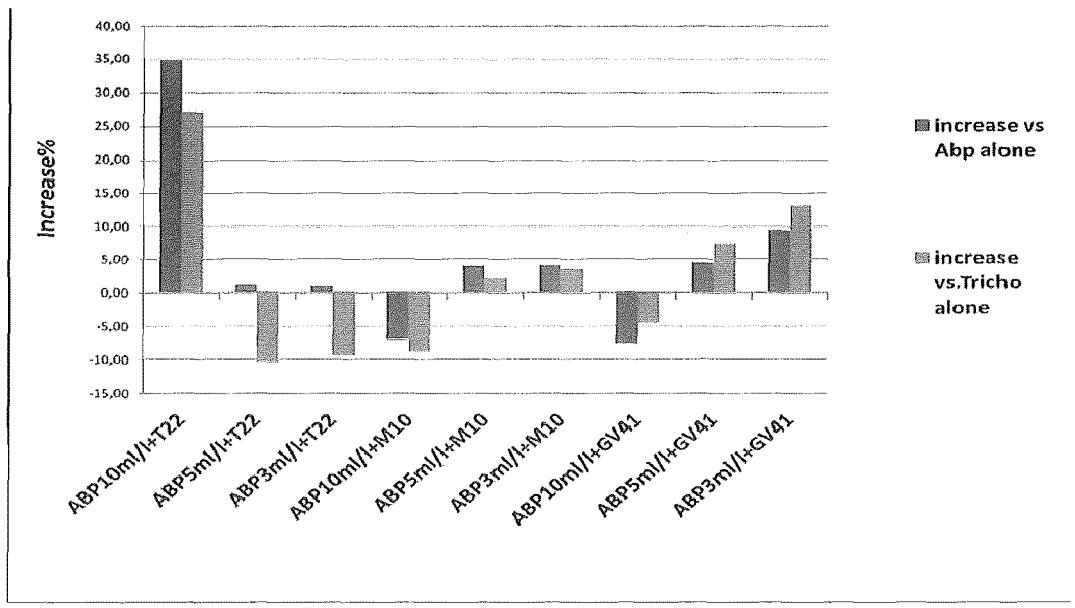
FIG. 43 shows the increase in stem fresh weight of tomato plants treated with *Trichoderma* spp. in combination with the product ABP 510 at different concentrations yr. ABP alone and *Trichoderma* spp. alone.
Figure 44:
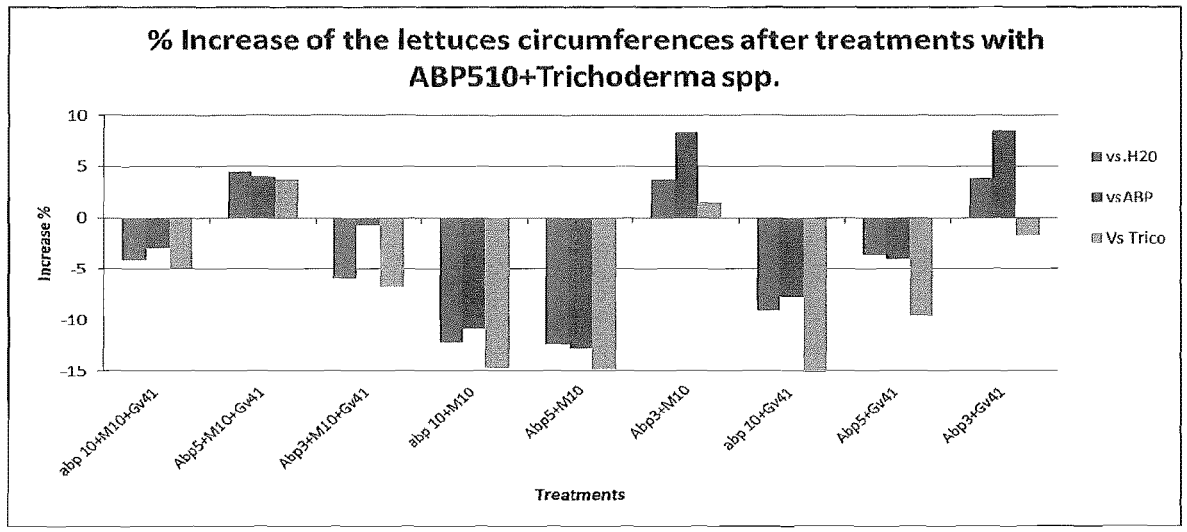
FIG. 44 shows the increase of the circumferences of green part of lettuce plants treated with *Trichoderma* spp. in combination with the product ABP-510 at different concentrations vs. water control, ABP-510 alone and *Trichoderma* spp. alone.
Figure 45:
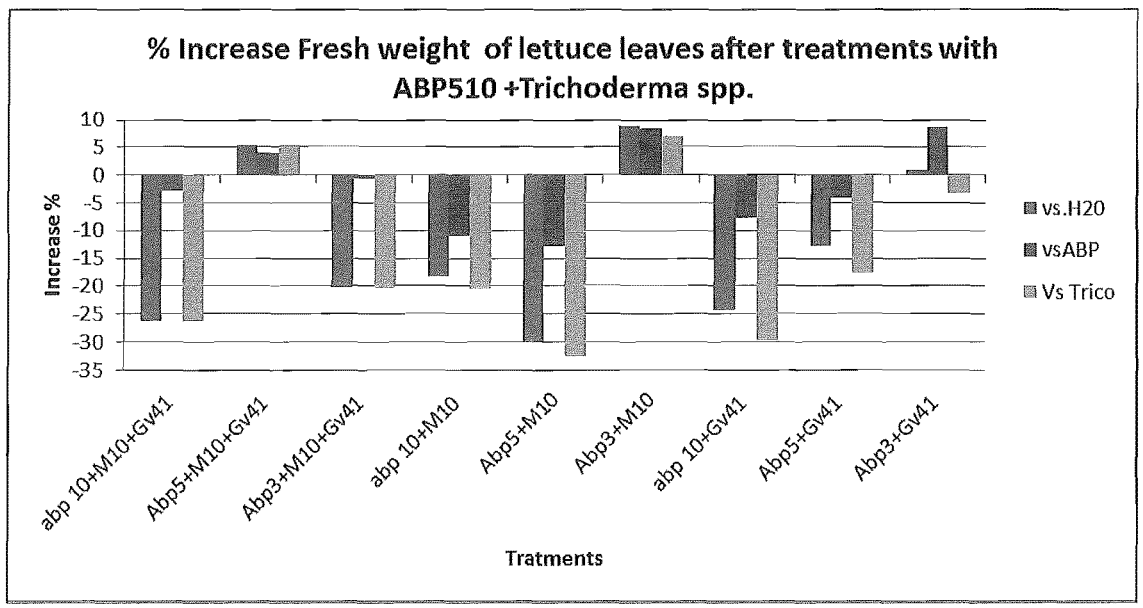
FIG. 45 shows the increase of the fresh weight of lettuce leaves treated with *Trichoderma* spp. in combination with the product ABP-510 at different concentrations vs. water control, ABP-510 alone and *Trichoderma* spp. alone.
Figure 46:
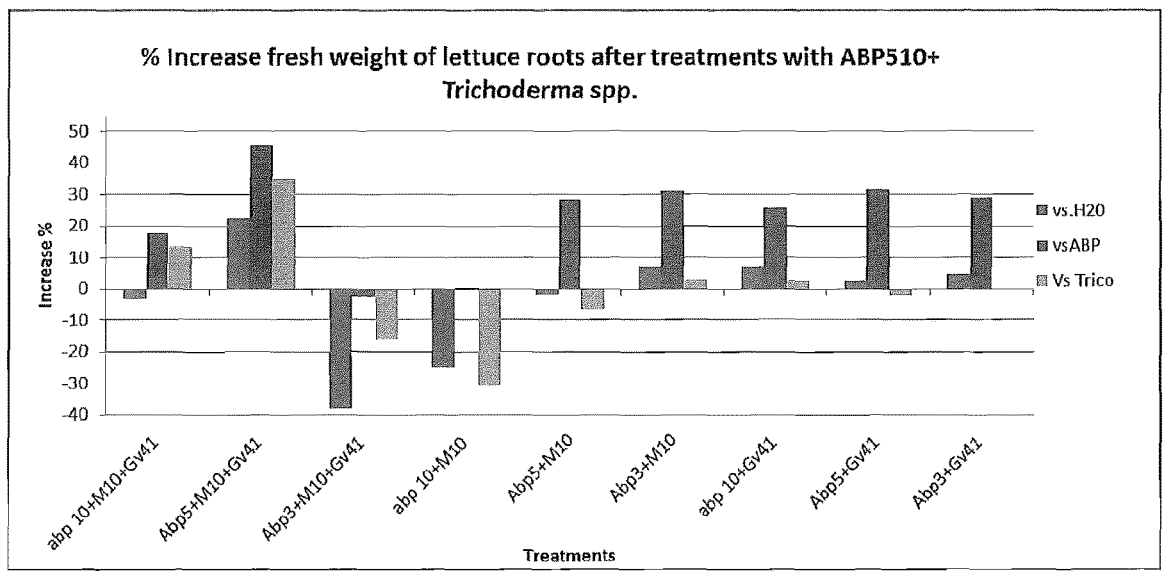
FIG. 46 shows the increase of the fresh weight of lettuce roots treated with *Trichoderma* spp. in combination with the product ABP-510 at different concentrations vs. water control, ABP-510 alone and *Trichoderma* spp. alone.
Figure 47:
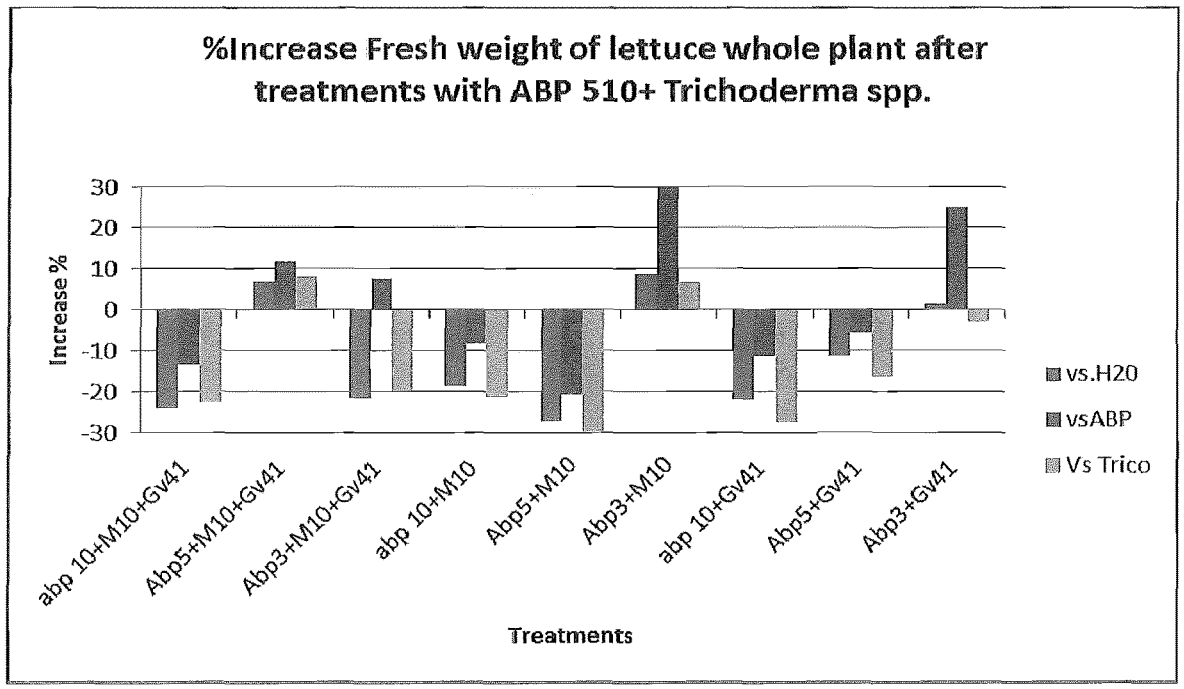
FIG. 47 shows the increase of the fresh weight of whole lettuce plants treated with *Trichoderma* spp. in combination with the product ABP-510 at different concentrations vs. water control, ABP-510 alone and *Trichoderma* spp. alone.
Figure 48:
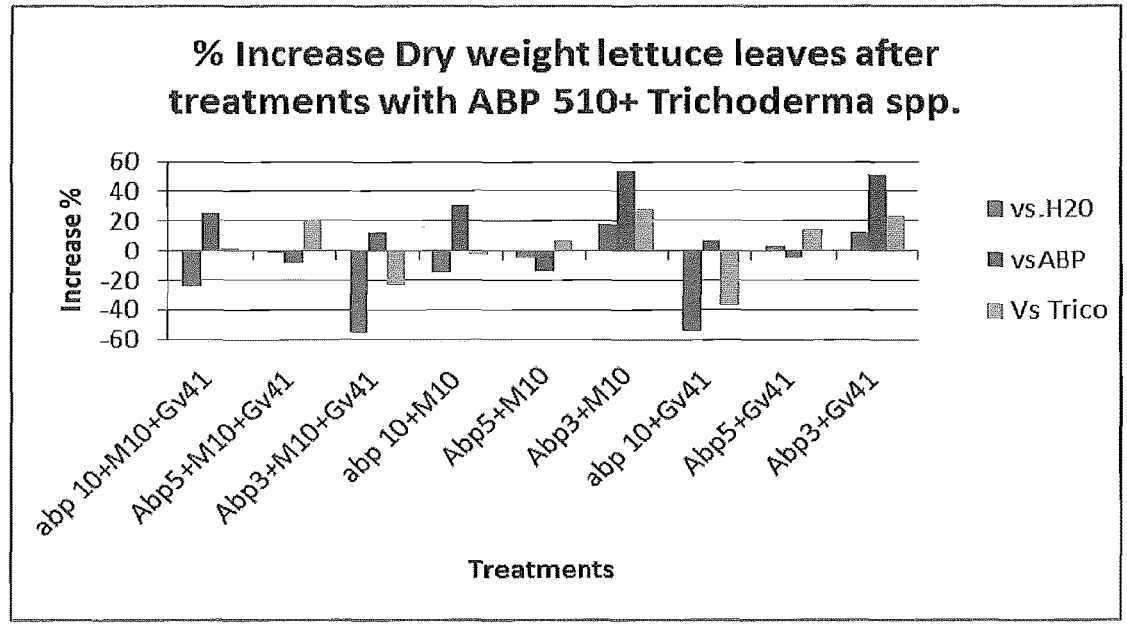
FIG. 48 shows the increase of the dry weight of lettuce leaves treated with *Trichoderma* spp. in combination with the product ABP-510 at different concentrations vs. water control, ABP-510 alone and *Trichoderma* spp. alone.
Figure 49:
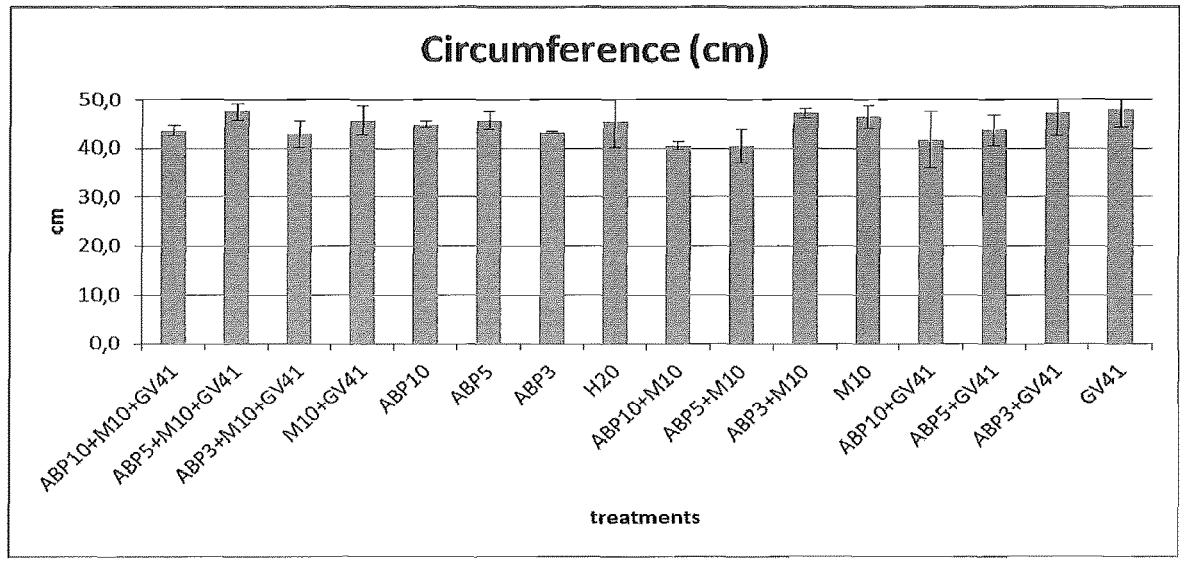
FIG. 49 shows circumferences of the green parts of lettuce plants treated with *Trichoderma* spp. in combination with the product ABP-510 at different concentrations.
Figure 50:
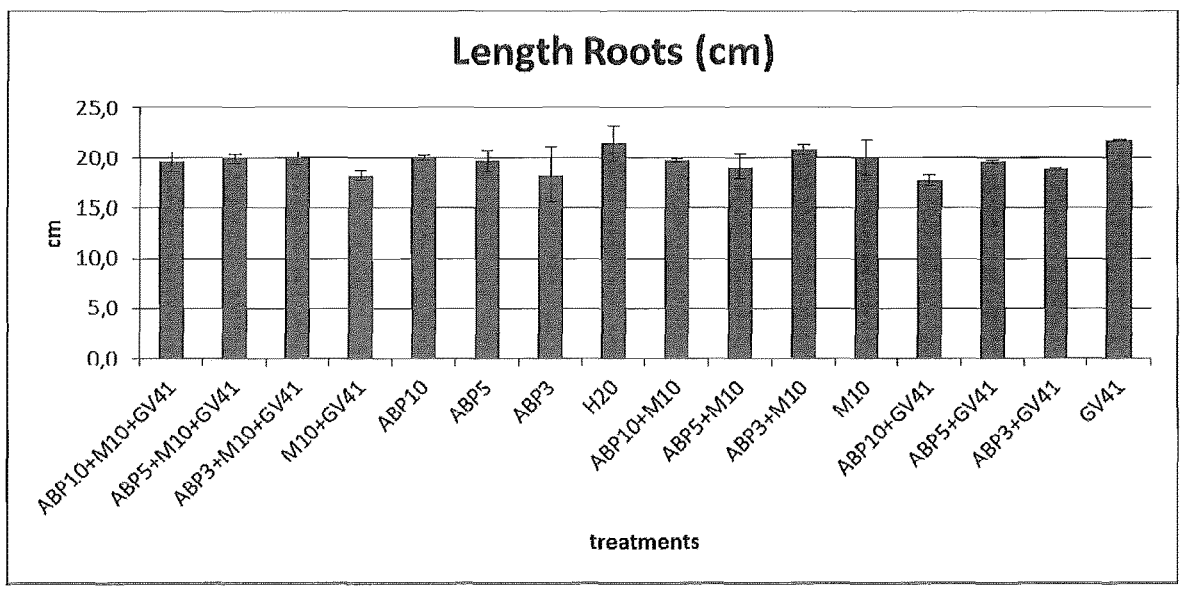
FIG. 50 shows the length of roots of lettuce plants treated with *Trichoderma* spp. in combination with the product ABP-510 at different concentrations.
Figure 51:
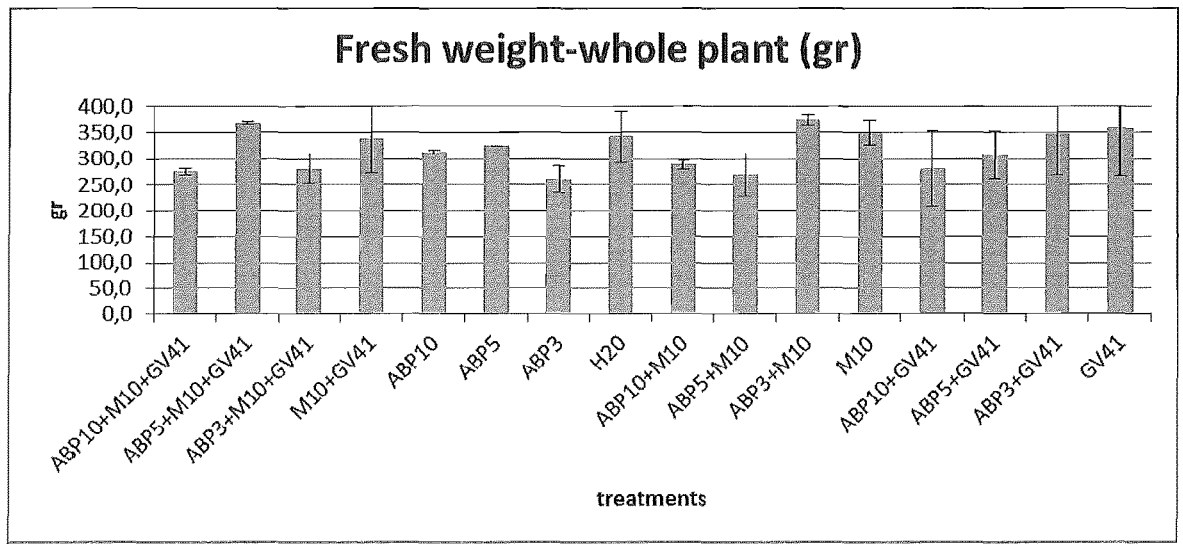
FIG. 51 shows the fresh weight of whole lettuce plants treated with *Trichoderma* spp. in combination with the product ABP-510 at different concentrations.
Figure 52:
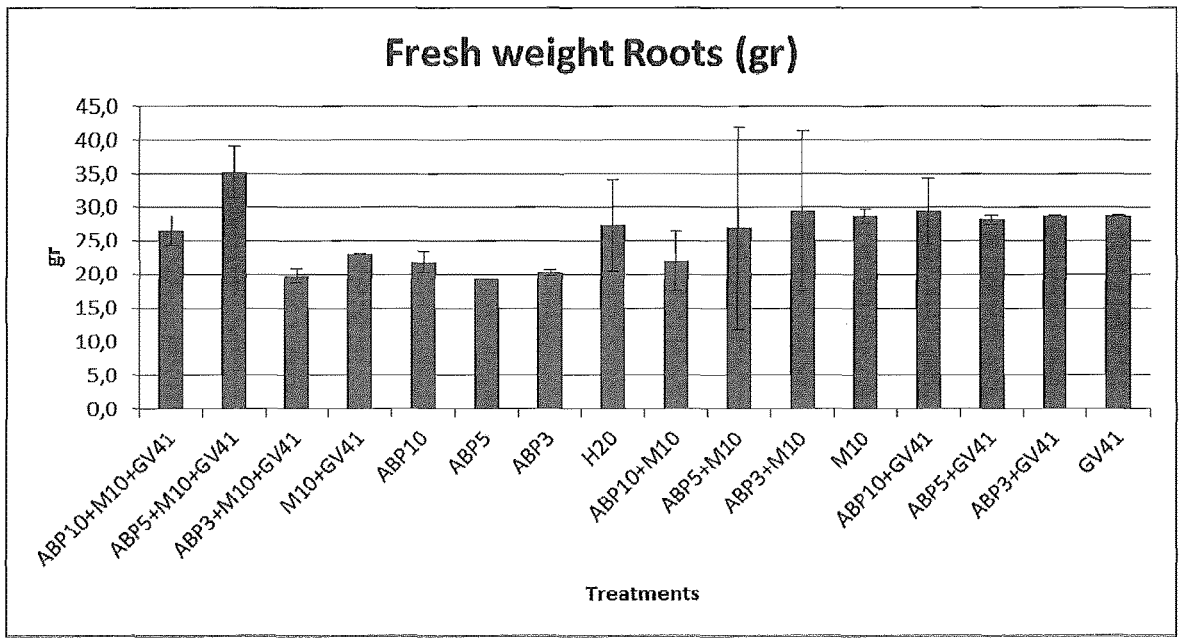
FIG. 52 shows the fresh weight of roots of lettuce plants treated with *Trichoderma* spp. in combination with the product ABP-510 at different concentrations.
Figure 53:
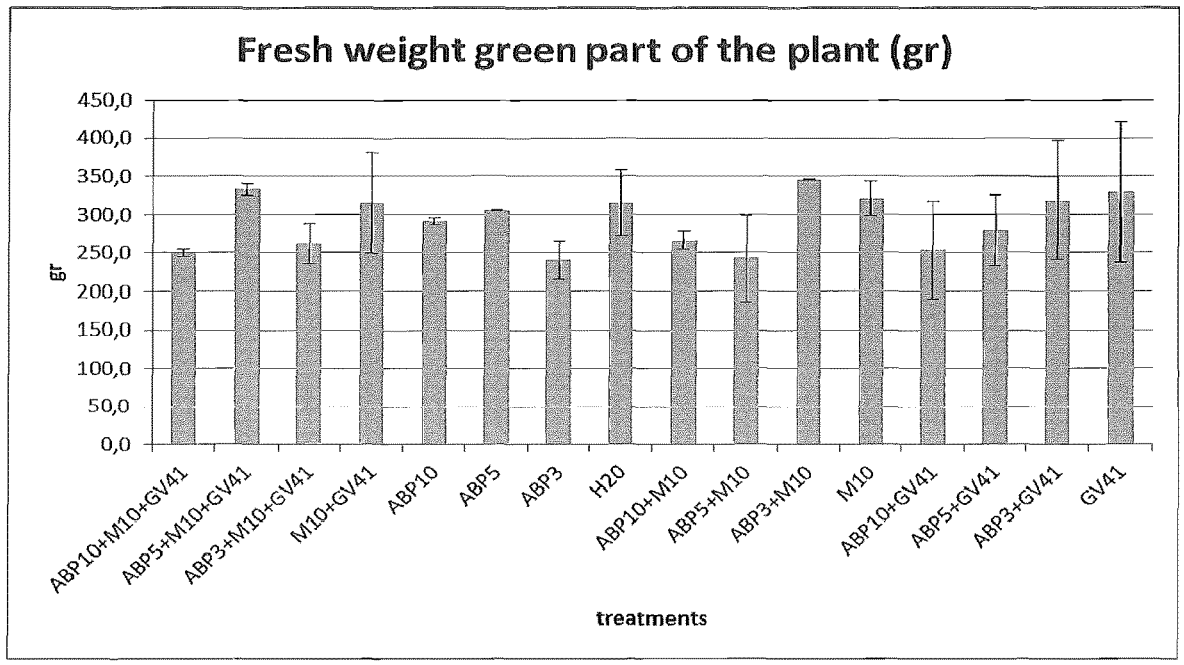
FIG. 53 shows the fresh weight of the green parts of lettuce plants treated with *Trichoderma* spp. in combination with the product ABP-510 at different concentrations
Figure 54:
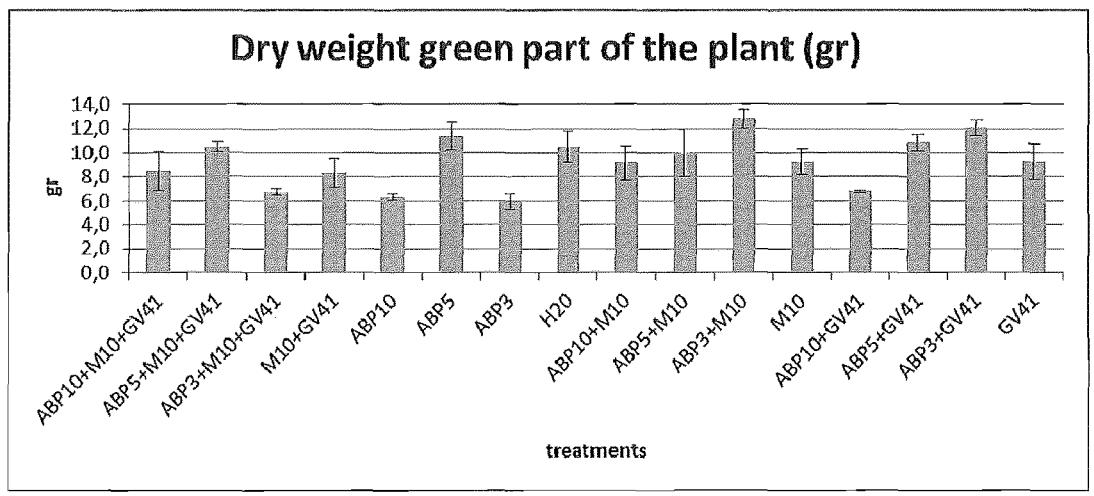
FIG. 54 shows the dry weight of the green part of lettuce plants treated with *Trichoderma* spp. in combination with the product ABP-510 at different concentrations.

The obtained results are shown in FIG. 33 and show that the treatment at the concentration of 10 ml/L controlled the development of the disease compared with water control. ABP-510 treatments used at 5 and 3 ml/L were slightly less effective in controlling the infection compared to 10 ml/L treatments.

Regarding the evaluation of the synergistic interaction of the product with Trichoderma spp., results showed that the treatments 3 ml ABP with both strains of Trichoderma always had a synergistic interaction in comparison with single application of the product at the three concentrations tested. In general, application of the product in combination whit the single strain M10 or GV41 were better compared with mix of two strains.

Example 2

Growth Promotion

Example 2.1

In Vivo Assays To Assess the Plant Growth Promotion Effects of Combined Applications of the Product ABP-510 and Trichoderma Sp.

The growth promotion effects (increased stem or root length, fresh weight/dry) of combined applications of the product ABP-510 with three strains of Trichoderma that belong to two different species: T. virens GV41; and T. harzianum T22 and M10; were tested.

Materials and Methods

Tests were conducted on tomato plants. Tomato plants, 2 week old, were transplanted into 14 cm diameter pots containing sterilised soil and washed with 30 ml of combined solutions (T22 +ABP-510; M10+ABP-510; or GV41+ABP-510). Four further applications were performed weekly by drenching the soil with the mixture.

A negative control was obtained by drenching soil with water only. Each set of treatments consisted of 10 plants (Tables 15 and 16). All the tests were carried out in a greenhouse under controlled temperature. Results were collected 30 days after transplanting.

ABP-510 was used at three different concentrations: 10, 5 and 3 ml/L. The combined solution was obtained by diluting a suspension of spores of Trichoderma in the ABP-510 product, thus obtaining a final concentration of $10^7$ spores $ml^{-1}$.

TABLE 15

| Experimental design | |
| --- | --- |
| Number of plants for treatment | 10 |
| Number of treatments | 16 |
| Total number of plants for experiment | 160 |

TABLE 16

Treatment list

| Treatment | Concentration | Treatment Method | Frequency of Application |
| --- | --- | --- | --- |
| ABP-510 + T22 | 10 ml/L + Tricho $10^7$ spores $ml^{-1}$ (30 ml/plant) | drenching | every 7 days |
| ABP-510 + T22 | 5 ml/L + Tricho $10^7$ spores $ml^{-1}$ (30 ml/plant) | drenching | every 7 days |
| ABP-510 + T22 | 3 ml/L + Tricho $10^7$ spores $ml^{-1}$ (30 ml/plant) | drenching | every 7 days |
| Trichoderma T22 | T.22 $10^7$ spores $ml^{-1}$ (30 ml/plant) | drenching | every 7 days |
| ABP-510 | 10 $ml/L^{-1}$ (30 ml/plant) | drenching | every 7 days |
| ABP-510 | 5 ml/L (30 ml/plant) | drenching | every 7 days |
| ABP-510 | 3 ml/L + Tricho (30 ml/plant) | drenching | every 7 days |
| Negative control | H2O (30 ml/plants) | drenching | every 7 days |
| ABP-510 + M10 | 10 ml/L + Tricho $10^7$ spores $ml^{-1}$ (30 ml/plant) | drenching | every 7 days |
| ABP-510 + M10 | 5 ml/L + Tricho $10^7$ spores $ml^{-1}$ (30 ml/plant) | drenching | every 7 days |
| ABP-510 + M10 | 3 ml/L + Tricho $10^7$ spores $ml^{-1}$ (30 ml/plant) | drenching | every 7 days |
| Trichoderma M10 | M10 $10^7$ spores $ml^{-1}$ (30 ml/plant) | drenching | every 7 days |
| ABP-510 + GV41 | 10 ml/L + Tricho $10^7$ spores $ml^{-1}$ (30 ml/plant) | drenching | every 7 days |
| ABP-510 + GV41 | 5 ml/L + Tricho $10^7$ spores $ml^{-1}$ (30 ml/plant) | drenching | every 7 days |
| ABP-510 + GV41 | 3 ml/L + Tricho $10^7$ spores $ml^{-1}$ (30 ml/plant) | drenching | every 7 days |
| Trichoderma GV41 | GV41 $10^7$ spores $ml^{-1}$ (30 ml/plant) | drenching | every 7 days |

Results

Preliminary results (FIGS. 18 to 21) indicated that plant growth promotion of Trichoderma harzianum T22 was not inhibited by ABP-510.

The combination of ABP-510 and T. harzianum M10 is effective. In fact, 10 ml/L+M10 enhanced the plant root promotion effect of Trichoderma by about 40%.

The performance of the ABP-510 product in terms of promoting growth are generally improved after the addition of the fungus.

Example 2.2

In Vivo Assays to Assess the Plant Growth Promotion Effects of Combined Applications of the Product ABP 510 and *Trichoderma* Sp.

The growth promotion effects (increased stem or root length, fresh weight/dry) of combined applications of the product ABP-510 with three strains of *Trichoderma* that belong to two different species; *T. virens* GV41 and *T. harzianum* T22 and M10; were tested.

Materials and Methods

Tests were conducted on tomato plants. Tomato plants, 2 week old, were transplanted into 14 cm diameter pots containing sterilised soil and washed with 30 ml of combined solutions (T22+ABP-510; M10+ABP-510; GV41+ABP-510). Four more applications were performed weekly by drenching the soil with the mixture.

A negative control was obtained by drenching soil with water only. Each set of treatments consisted of 10 plants (Tables 17 and 18). All the tests were carried out in greenhouse under controlled temperature. Results were collected 30 days after transplanting.

ABP-510 was used at three different concentrations: 10, 5 and 3 ml/L, and the combined solution was obtained by diluting in the product a suspension of spores of *Trichoderma*, thus obtaining a final concentration of $10^7$ spores $ml^{-1}$.

TABLE 17

| Experimental design | |
|---|---|
| Number of plants for treatment | 10 |
| Number of treatments | 16 |
| Total number of plants for experiment | 160 |

TABLE 18

Treatment list

| Treatment | Concentration | Treatment Method | Frequency of Application |
|---|---|---|---|
| ABP-510 + T22 | 10 ml/L + Tricho $10^7$ spores $ml^{-1}$ (30 ml/plant) | drenching | every 7 days |
| ABP-510 + T22 | 5 ml/L + Tricho $10^7$ spores $ml^{-1}$ (30 ml/plant) | drenching | every 7 days |
| ABP-510 + T22 | 3 ml/L + Tricho $10^7$ spores $ml^{-1}$ (30 ml/plant) | drenching | every 7 days |

TABLE 18-continued

Treatment list

| Treatment | Concentration | Treatment Method | Frequency of Application |
|---|---|---|---|
| *Trichoderma* T22 | T.22 $10^7$ spores $ml^{-1}$ (30 ml/plant) | drenching | every 7 days |
| ABP-510 | 10 ml/$L^{-1}$ (30 ml/plant) | drenching | every 7 days |
| ABP-510 | 5 ml/L (30 ml/plant) | drenching | every 7 days |
| ABP-510 | 3 ml/L + Tricho (30 ml/plant) | drenching | every 7 days |
| Negative control | H2O (30 ml/plants) | drenching | every 7 days |
| ABP-510 + M10 | 10 ml/L + Tricho $10^7$ spores $ml^{-1}$ (30 ml/plant) | drenching | every 7 days |
| ABP-510 + M10 | 5 ml/L + Tricho $10^7$ spores $ml^{-1}$ (30 ml/plant) | drenching | every 7 days |
| ABP-510 + M10 | 3 ml/L + Tricho $10^7$ spores $ml^{-1}$ (30 ml/plant) | drenching | every 7 days |
| M10 | M10 $10^7$ spores $ml^{-1}$ (30 ml/plant) | drenching | every 7 days |
| ABP-510 + GV41 | 10 ml/L + Tricho $10^7$ spores $ml^{-1}$ (30 ml/plant) | drenching | every 7 days |
| ABP-510 + GV41 | 5 ml/L + Tricho $10^7$ spores $ml^{-1}$ (30 ml/plant) | drenching | every 7 days |
| ABP-510 + GV41 | 3 ml/L + Tricho $10^7$ spores $ml^{-1}$ (30 ml/plant) | drenching | every 7 days |
| GV41 | GV41 $10^7$ spores $ml^{-1}$ (30 ml/plant) | drenching | every 7 days |

Results

The results of the tests are shown in FIGS. 22 to 27. The combination of ABP-510 and *T. harzianum* M10 is particularly effective: 10 ml/L+M10 enhanced the plant root promotion effect of *Trichoderma* by about 40%. The addition of the fungus *Trichoderma* GV41 enhanced the plant root promotion.

Example 2.3

Plant Growth Promotion Effects of Combined Applications of the Product ABP 510 and *Trichoderma* Sp on Turnip Cabbage Plants Objective: Determine the effects on turnip cabbage plants (cv Volturno), in terms of improvement of plant productivity and quality crop, of a simultaneous application of the product ABP-510 with a combination of two strains that belong to two different species of *Trichoderma*; *T. virens* GV41 and *T. harzianum* M10.

The treatments applied to the plants are set out in Table 18a below.

TABLE 18a

| Treatment | Concentration | Treatment Method | Frequency of Application |
|---|---|---|---|
| ABP-510 + T.Gv41 + T.M10 | 10 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + T.Gv41 + T.M10 | 5 ml/L + Tricho $10^6$ spores $ml^{-1}$ (5 ml/plant in | soil drenching | every 7 days in polystyrene box/15 days in |

TABLE 18a-continued

| Treatment | Concentration | Treatment Method | Frequency of Application |
|---|---|---|---|
| | polystyrene box; 50 ml/plant in field) | | field |
| ABP-510 + T.Gv41 + T. M10 | 3 ml/L + Tricho $10^6$ spores $ml^{-1}$ (5 ml/plant in polystyrene box; 50 ml/plant in field) | soil drenching | every 7 days in polystyrene box/15 days in field |
| Trichoderma Gv41 + M10 | Tricho $10^6$ spores $ml^{-1}$ (5 ml/plant in polystyrene box; 50 ml/plant in field) | soil drenching | every 7 days in polystyrene box/15 days in field |
| ABP-510 | 10 ml/$L^{-1}$ (5 ml/plant in polystyrene box; 50 ml/plant in field) | soil drenching | every 7 days in polystyrene box/15 days in field |
| ABP-510 | 5 ml/L (5 ml/plant in polystyrene box; 50 ml/plant in field) | soil drenching | every 7 days in polystyrene box/15 days in field |
| ABP-510 | 3 ml/L (5 ml/plant in polystyrene box; 50 ml/plant in field) | soil drenching | every 7 days in polystyrene box/15 days in field |
| Negative control | H2O (5 ml/plant in polystyrene box; 50 ml/plant in field) | soil drenching | every 7 days in polystyrene box/15 days in field |
| ABP-510 + M10 | 10 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + M10 | 5 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + M10 | 3 ml/L + Tricho $10^6$ spores $ml^{-1}$ (5 ml/plant in polystyrene box; 50 ml/plant in field) | soil drenching | every 7 days in polystyrene box/15 days in field |
| M10 | M10 $10^6$ spores $ml^{-1}$ (5 ml/plant in polystyrene box; 50 ml/plant in field) | soil drenching | every 7 days in polystyrene box/15 days in field |
| ABP-510 + GV41 | 10 ml/L + Tricho $10^6$ spores $ml^{-1}$ 5 ml/plant in polystyrene box; 50 ml/plant in field) | soil drenching | every 7 days in polystyrene box/15 days in field |
| ABP-510 + GV41 | 5 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + GV41 | 3 ml/L + Tricho $10^6$ spores $ml^{-1}$ (5 ml/plant in polystyrene box; 50 ml/plant in field) | soil drenching | every 7 days in polystyrene box/15 days in field |
| GV41 | GV41 $10^6$ spores $ml^{-1}$ (5 ml/plant in polystyrene box; 50 ml/plant in field) | soil drenching | every 7 days in polystyrene box/15 days in field |

Experimental Design and description: Each treatment consisted of 20 plants in randomized blocks. There were 16 treatments and the total number of plants was 320. Dosage as per indications in Table 18a. No additional chemicals were applied to the plants.

Potting Media: Synthetic commercial bagged soil (universal peat moss) "Green Habitat", Valcofort s.r.l., Florence, Italy.

Treatments: Three weeks after sowing in polystyrene boxes, Turnip cabbage seedlings were washed with 5 ml of single and combined solutions (M10+Gv41+ABP510; M10+ABP 510; GV41+ABP510). A subsequent application was made after seven days. Subsequently the plants were transplanted in soil in open field and were washed with 50 ml of single and combined solutions. Negative control was obtained by drenching the soil with water only. The treatments were repeated every 15 days, for four months, by drenching the soil with 50 ml of single and combined solution.

Duration of the test: 12 weeks after transplant in soil under plastic tunnels

Inoculation technique: Four week-old plants of turnip cabbage were transplanted in soil in open field.

Fungicide ABP-510 was used at three different concentrations; 10, 5 and 3 ml/L, and the combined solution was obtained by diluting in the product a suspension of spores of Trichoderma spp. obtaining a final concentration of $10^6$ spores $ml^{-1}$. Turnip cabbage plants, after transplanting in field, were washed with 50 ml of single and combined solutions (ABP510+Trichoderma). Eight successive applications were performed every 15 days for four months. Negative control was obtained by drenching the soil with water only.

Data Collection and Evaluation

Improvement of plant productivity and quality crop: After four months of the transplant in the field, the circumference of the green part, the length of roots, fresh and dry weight the green part and root, were assessed by determining the percentage increase (in the circumference of the green part (stem), fresh weight the stem and root) of turnip cabbage plants treated with Trichoderma spp. in combination with the product ABP 510 at different concentrations, compared to treatment Trichoderma spp. alone and ABP 510 alone.

Summary of Results

Preliminary results (FIGS. 34 to 39) showed that the combination of ABP-510 at all concentrations tested and *T. harzianum* M10 seems to be more effective in terms of promoting growth. This treatment also appears to be clearly synergistic compared to single applications (only product and only Trichoderma).

In particular the application of the combinations ABP 510 10 ml/l+M10 and ABP 510 5 ml/l+M10 resulted in an increase of the circumference of stems, approximately of 20%, compared to the product applied alone. Also the fresh weight was increased by 20% compared to the product applied alone.

The results also showed that the fungicide ABP 510, at three concentrations tested did not effect on growth promoting of turnip cabbage plants Example 2.4

Plant Growth Promotion Effects of Combined Applications of the Product ABP 510 and Trichoderma Spp on Tomato Plants Objective: Determine the effects, in terms of growth promotion on tomato plants (*Solanum lycopersicum* cv. San Marzano), of combined applications of the product fungicide ABP-510 with three strains of Trichoderma that belong to two different species; *T. virens* GV41 and *T. harzianum* T22 and M10.

The treatments applied to the plants are set out in Table 18b below.

TABLE 18b

| Treatment | Concentration | Treatment Method | Frequency of Application |
|---|---|---|---|
| ABP-510 + T.22 | 10 ml/L + Tricho $10^6$ spores $ml^{-1}$ (50 ml/plant) | soil drenching | every 7 days |
| ABP-510 + T.22 | 5 ml/L + Tricho $10^6$ spores $ml^{-1}$ (50 ml/plant) | soil drenching | every 7 days |
| ABP-510 + T.22 | 3 ml/L + Tricho $10^6$ spores $ml^{-1}$ (50 ml/plant) | soil drenching | every 7 days |
| Trichoderma harzianum T22 | Tricho $10^6$ spores $ml^{-1}$ (50 ml/plant) | soil drenching | every 7 days |
| ABP-510 | 10 ml/$L^{-1}$ (50 ml/plant) | soil drenching | every 7 days in |
| ABP-510 | 5 ml/L (50 ml/plant) | soil drenching | every 7 days |
| ABP-510 | 3 ml/L (50 ml/plant) | soil drenching | every 7 days |
| Negative control | H2O (50 ml/plant) | soil drenching | every 7 days |
| ABP-510 + M10 | 10 ml/L + Tricho $10^6$ spores $ml^{-1}$ (50 ml/plant) | soil drenching | every 7 days |
| ABP-510 + M10 | 5 ml/L + Tricho $10^6$ spores $ml^{-1}$ (50 ml/plant) | soil drenching | every 7 days |
| ABP-510 + M10 | 3 ml/L + Tricho $10^6$ spores $ml^{-1}$ (50 ml/plant) | soil drenching | every 7 days |
| M10 | M10 $10^6$ spores $ml^{-1}$ (50 ml/plant) | soil drenching | every 7 days |
| ABP-510 + GV41 | 10 ml/L + Tricho $10^6$ spores $ml^{-1}$ (50 ml/plant) | soil drenching | every 7 days |
| ABP-510 + GV41 | 5 ml/L + Tricho $10^6$ spores $ml^{-1}$ ((50 ml/plant) | soil drenching | every 7 days |
| ABP-510 + GV41 | 3 ml/L + Tricho $10^6$ spores $ml^{-1}$ (50 ml/plant) | soil drenching | every 7 days |
| GV41 | GV41 $10^6$ spores $ml^{-1}$ (50 ml/plant) | soil drenching | every 7 days |

Experimental Design and description: All plants were positioned together on the same bench. There were 16 different treatments, each applied to 10 plants, giving a total number of plants of 160. Dosage per treatment was as indicated in Table 18b. No additional chemicals were applied.

Potting Media: Synthetic commercial bagged soil (universal peat moss) "Green Habitat", Valcofort s.r.l., Florence, Italy. Soil was autoclaved for one hr at 120° C.

Treatments: Tomato seedlings which had germinated two weeks after sowing in polystyrene boxes were transplanted into 14 cm diameter pots containing sterilized soil and washed with 50 ml of single and combined solutions (M10+Gv41+ABP510; M10+ABP 510;GV41+ABP510). Four applications were performed weekly.

Negative control was obtained by drenching soil with water only

Duration of the test: 4 weeks after transplant.

Inoculation technique: Two week-old plants of *Solanum lycopersucum* cv. San Marzano were transplanted into 14 cm diameter pots containing sterilised soil. Plants were incubated in a greenhouse under controlled temperature.

Fungicide ABP-510 was used at three different concentrations: 10, 5 and 3 ml/L, and the combined solution was obtained by diluting in the product a suspension of spores of Trichoderma spp. obtaining a final concentration of $10^6$ spores $ml^{-1}$. Tomato plants, after transplanting in sterile soil, were watered with 50 ml of single and combined solutions (ABP510+Trichoderma). Three successive applications were performed weekly. Negative control was obtained by drenching the soil with water only.

Data Collection and Evaluation

Growth promotion effects: After four treatments was determined the length and fresh and dry weight of stem and root of plants by assessing the percentage increase (in length and fresh and dry weight of stem and root) of tomato plants treated with *Trichoderma* spp. in combination with the product ABP-510 at different concentrations, compared to treatment *Trichoderma* spp. alone and ABP-510 alone Summary of Results The results (FIGS. 40 to 43) show that the combination of ABP-510 at all concentrations tested and *T. harzianum* M10 seems to be more effective in terms of promoting growth. This treatment also appears to be clearly synergistic compared to single applications (only product ABP-510 and only *Trichoderma*).

In particular the application of the combinations ABP 510 5 ml/l+M10 and ABP 510 3 ml/l+M10 resulted in an increase of the length and fresh and dry weight of stem and root compared to the product applied alone.

Example 2.5

Plant Growth Promotion Effects of Combined Applications of the Product ABP 510 and *Trichoderma* Spp on Lettuce Plants Objective: Determine the effects on lettuce plants (cv. Penelope), in terms of improvement of plant productivity and quality crop, of a simultaneous application of the product ABP 510 with a combination of two strains that belong to two different species of *Trichoderma: T. virens* GV41 and *T. harzianum* M10.

The treatments applied to the plants are given in Table 18c below.

TABLE 18c

| Treatment | Concentration | Treatment Method | Frequency of Application |
|---|---|---|---|
| ABP-510 + T.Gv41 + T. M10 | 10 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + T.Gv41 + T. M10 | 5 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + T.Gv41 + T. M10 | 3 ml/L + Tricho $10^6$ spores $ml^{-1}$ (5 ml/plant in polystyrene box; 50 ml/plant in field) | soil drenching | every 7 days in polystyrene box/15 days in field |
| *Trichoderma* Gv41 + M10 | Tricho $10^6$ spores $ml^{-1}$ (5 ml/plant in polystyrene box; 50 ml/plant in field) | soil drenching | every 7 days in polystyrene box/15 days in field |
| ABP-510 | 10 $ml/L^{-1}$ (5 ml/plant in polystyrene box; 50 ml/plant in field) | soil drenching | every 7 days in polystyrene box/15 days in field |
| ABP-510 | 5 ml/L (5 ml/plant in polystyrene box; 50 ml/plant in field) | soil drenching | every 7 days in polystyrene box/15 days in field |
| ABP-510 | 3 ml/L (5 ml/plant in polystyrene box; 50 ml/plant in field) | soil drenching | every 7 days in polystyrene box/15 days in field |
| Negative control | H2O (5 ml/plant in polystyrene box; 50 ml/plant in field) | soil drenching | every 7 days in polystyrene box/15 days in field |
| ABP-510 + M10 | 10 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + M10 | 5 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + M10 | 3 ml/L + Tricho $10^6$ spores $ml^{-1}$ (5 ml/plant in polystyrene box; 50 ml/plant in field) | soil drenching | every 7 days in polystyrene box/15 days in field |
| M10 | M10 $10^6$ spores $ml^{-1}$ (5 ml/plant in polystyrene box; 50 ml/plant in field) | soil drenching | every 7 days in polystyrene box/15 days in field |
| ABP-510 + GV41 | 10 ml/L + Tricho $10^6$ spores $ml^{-1}$ 5 ml/plant in polystyrene box; 50 ml/plant in field | soil drenching | every 7 days in polystyrene box/15 days in field |

TABLE 18c-continued

| Treatment | Concentration | Treatment Method | Frequency of Application |
|---|---|---|---|
| ABP-510 + GV41 | 5 ml/L + Tricho $10^6$ spores $ml^{-1}$ (5 ml/plant in polystyrene box; 50 ml/plant in field) | soil drenching | every 7 days in polystyrene box/15 days in field |
| ABP-510 + GV41 | 3 ml/L + Tricho $10^6$ spores $ml^{-1}$ (5 ml/plant in polystyrene box; 50 ml/plant in field) | soil drenching | every 7 days in polystyrene box/15 days in field |
| GV41 | GV41 $10^6$ spores $ml^{-1}$ (5 ml/plant in polystyrene box; 50 ml/plant in field) | soil drenching | every 7 days in polystyrene box/15 days in field |

Experimental Design and description: Each of the 16 treatments was applied to 20 plants in randomized blocks, with a total number of 320 plants. Dosage was as indicated in Table 18c. No additional chemicals were applied.

Potting Media: Synthetic commercial bagged soil (universal peat moss) "Green Habitat", Valcofort s.r.l., Florence, Italy. Soil was autoclaved for one hr at 120° C.

Treatments: Three weeks after sowing in polystyrene boxes, lettuce seedlings were washed with 5 ml of single and combined solutions (M10+Gv41+ABP510; M10+ABP 510; GV41+ABP510). A subsequent application was made after seven days. Subsequently the plants were transplanted in soil under plastic tunnels and were washed with 50 ml of single and combined solutions. Negative control was obtained by drenching the soil with water only. The treatments (table 1) were repeated every 15 days, for two months, by drenching the soil with 50 ml of single and combined solution.

Duration of the test: 8 weeks after transplant in soil under plastic tunnels.

Inoculation technique: Four-week-old lettuce plants were transplanted in field under plastic tunnel.

Fungicide ABP-510 was used at three different concentrations; 10, 5 and 3 ml/L, and the combined solution was obtained by diluting in the product a suspension of spores of *Trichoderma* spp. obtaining a final concentration of $10^6$ spores $ml^{-1}$. Lettuce plants, after transplanting in field, were washed with 50 ml of single and combined solutions (ABP510+*Trichoderma*). Four successive applications were performed every 15 days for two months. Negative control was obtained by drenching the soil with water only.

Data Collection and Evaluation

Improvement of plant productivity and quality crop: After two months of the transplant in field was assessed the circumference of the green part, the length of roots, fresh and dry weight the green part and root, by determining the percentage increase (in the circumference of the green part, the length of roots, fresh and dry weight the green part and root) of lettuce plants treated with *Trichoderma* spp. in combination with the product ABP-510 at different concentrations, compared to treatment *Trichoderma* spp. alone and ABP-510 alone.

Summary of Results

The results (FIGS. 44 to 54) show that the combination of ABP-510 at a concentration of 3 ml/l and *T. harzianum* M10 seems to be more effective in terms of growth promoting. This treatment also appears to be clearly synergistic compared to single applications (only product and only *Trichoderma*).

In particular the application of this combination resulted in an increase of the circumference of the green part, approximately of 10%, compared to the product applied alone. Also the fresh weight of the whole plant was increased by 30% compared to the product applied alone, with an increase of fresh weight of the green part and roots respectively of the 10 and 30%. Concerning the dry weight of the green part was increased by 50% compared to the product applied alone.

Example 2.6

Plant Growth Promotion Effects of Combined Applications of the Product ABP-510 and *Trichoderma* Spp on Tomato Plants (vv. Rodelinda F1)

Objective: Determine the effects on tomato plants (cv. Rodelinda F1), in terms of improvement of plant productivity and quality crop, of a simultaneous application of the product ABP-510 with a combination of two strains that belong to two different species of *Trichoderma*: *T. virens* GV41 and *T. harzianum* M10.

The treatments applied to the plants are set out in table 18d below.

TABLE 18d

| Treatment | Concentration | Treatment Method | Frequency of Application |
|---|---|---|---|
| ABP-510 + T.Gv41 + T. M10 | 10 ml/L + Tricho $10^6$ spores $ml^{-1}$ (5 ml/plant in polystyrene box; 50 ml/ plant in pots) | soil drenching | every 7 days in polystyrene box/15 days in pots |

TABLE 18d-continued

| Treatment | Concentration | Treatment Method | Frequency of Application |
|---|---|---|---|
| ABP-510 + T.Gv41 + T. M10 | 5 ml/L + Tricho $10^6$ spores $ml^{-1}$ (5 ml/plant in polystyrene box; 50 ml/plant in pots) | soil drenching | every 7 days in polystyrene box/15 days in field |
| ABP-510 + T.Gv41 + T. M10 | 3 ml/L + Tricho $10^6$ spores $ml^{-1}$ (5 ml/plant in polystyrene box; 50 ml/plant in field) | soil drenching | every 7 days in polystyrene box/15 days in pots |
| Trichoderma Gv41 + M10 | Tricho $10^6$ spores $ml^{-1}$ (5 ml/plant in polystyrene box; 50 ml/plant in pots) | soil drenching | every 7 days in polystyrene box/15 days in pots |
| ABP-510 | 10 $ml/L^{-1}$ (5 ml/plant in polystyrene box; 50 ml/plant in pots) | soil drenching | every 7 days in polystyrene box/15 days in pots |
| ABP-510 | 5 ml/L (5 ml/plant in polystyrene box; 50 ml/plant in pots) | soil drenching | every 7 days in polystyrene box/15 days in pots |
| ABP-510 | 3 ml/L (5 ml/plant in polystyrene box; 50 ml/plant in pots) | soil drenching | every 7 days in polystyrene box/15 days in pots |
| Negative control | H2O (5 ml/plant in polystyrene box; 50 ml/plant in pots) | soil drenching | every 7 days in polystyrene box/15 days in pots |
| ABP-510 + M10 | 10 ml/L + Tricho $10^6$ spores $ml^{-1}$ (5 ml/plant in polystyrene box; 50 ml/plant in pots) | soil drenching | every 7 days in polystyrene box/15 days in pots |
| ABP-510 + M10 | 5 ml/L + Tricho $10^6$ spores $ml^{-1}$ (5 ml/plant in polystyrene box; 50 ml/plant in pots) | soil drenching | every 7 days in polystyrene box/15 days in pots |
| ABP-510 + M10 | 3 ml/L + Tricho $10^6$ spores $ml^{-1}$ (5 ml/plant in polystyrene box; 50 ml/plant in pots) | soil drenching | every 7 days in polystyrene box/15 days in pots |
| M10 | M10 $10^6$ spores $ml^{-1}$ (5 ml/plant in polystyrene box; 50 ml/in pots) | soil drenching | every 7 days in polystyrene box/15 days in pots |
| ABP-510 + GV41 | 10 ml/L + Tricho $10^6$ spores $ml^{-1}$ 5 ml/plant in polystyrene box; 50 ml/plant in pots | soil drenching | every 7 days in polystyrene box/15 days in pots |
| ABP-510 + GV41 | 5 ml/L + Tricho $10^6$ spores $ml^{-1}$ (5 ml/plant in polystyrene box; 50 ml/plant in pots) | soil drenching | every 7 days in polystyrene box/15 days in pots |
| ABP-510 + GV41 | 3 ml/L + Tricho $10^6$ spores $ml^{-1}$ (5 ml/plant in polystyrene box; 50 ml/plant in pots) | soil drenching | every 7 days in polystyrene box/15 days in pots |
| GV41 | GV41 $10^6$ spores $ml^{-1}$ (5 ml/plant in polystyrene box; 50 ml/plant in pots) | soil drenching | every 7 days in polystyrene box/15 days in pots |

Experimental Design and description: Each of the 16 treatments was applied 6 plants in randomized blocks, giving a total of 96 plants. The dosages applied were as indicated in Table 18d above. No additional chemicals were applied.

Potting Media: Synthetic commercial bagged soil (universal peat moss) "Green Habitat", Valcofort s.r.l., Florence, Italy.

Treatments: Ten days after sowing in polystyrene boxes, the germinated tomato seedlings were washed with 5 ml of single and combined solutions (M10+Gv41+ABP510; M10+ABP 510; GV41+ABP510). Three successive applications were performed weekly. Subsequently the plants were transplanted into 24 cm diameter pots and washed with 50 ml of single and combined solutions. The treatments were repeated at intervals of 15 days, for four months by drenching the soil with 50 ml of single and combined solution.

Duration of the test: 12 weeks after transplant in soil under plastic tunnels

Inoculation technique: Four week-old tomato plants were transplanted in into 24 cm diameter pots containing soil.

Fungicide ABP-510 was used at three different concentrations; 10, 5 and 3 ml/L, and the combined solution was obtained by diluting in the product a suspension of spores of *Trichoderma* spp. obtaining a final concentration of $10^6$ spores $ml^{-1}$. Tomato plants, after transplanting in field, were washed with 50 ml of single and combined solutions (ABP510+*Trichoderma*). Eight successive applications were performed every 15 days for four months. Negative control was obtained by drenching the soil with water only.

Data Collection and Evaluation

Improvement of plant productivity and crop quality: After four months of the transplant into 24 cm diameter pots the total mean fruit weight yield (kg/treatment) was measured, as was the total number of fruits for each group of plants, for treatments with single and combined solutions (ABP-510+*Trichoderma*)

Summary of Results

Figure 55:
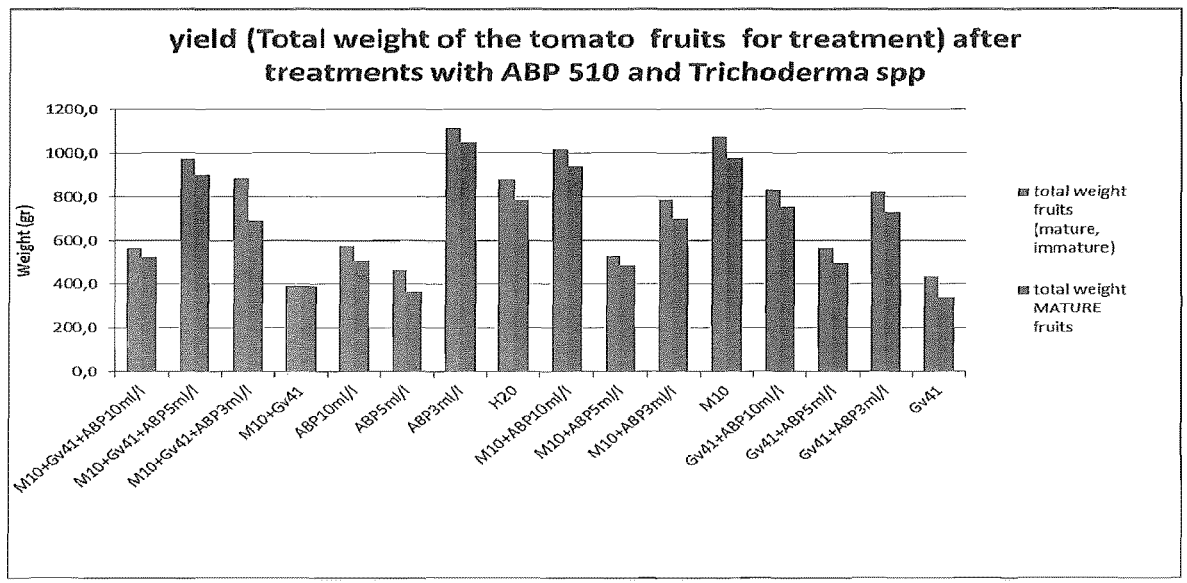
FIG. 55 shows the yield of tomatoes in terms of kg total of the fruits produced for each treatment.
Figure 56:
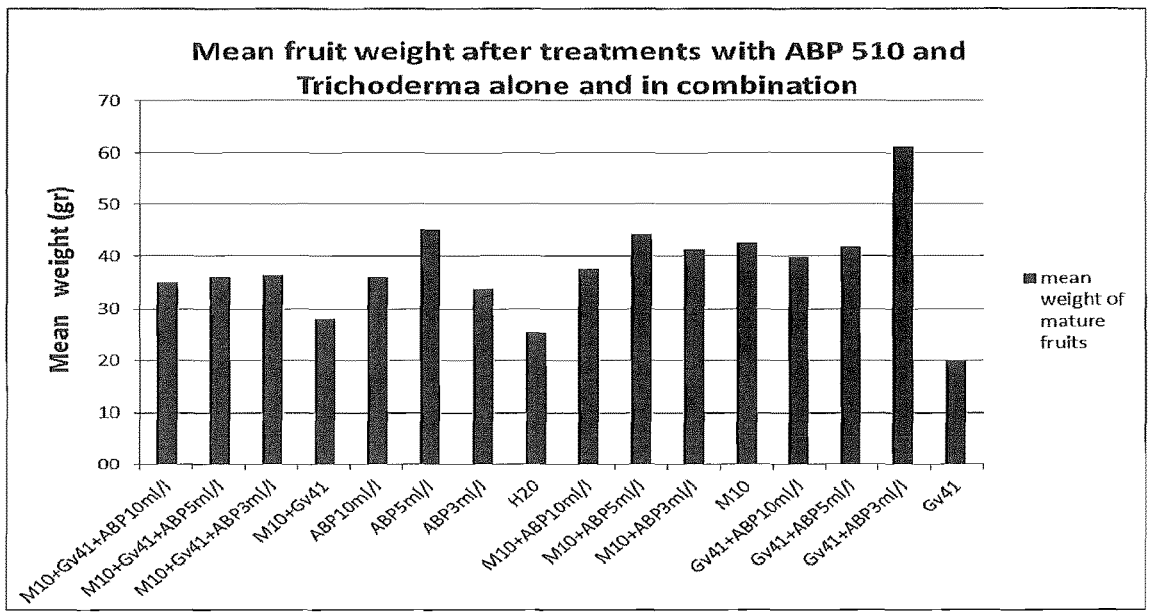
FIG. 56 shows the mean weight of tomato fruits from plants treated with each treatment.
Figure 57:
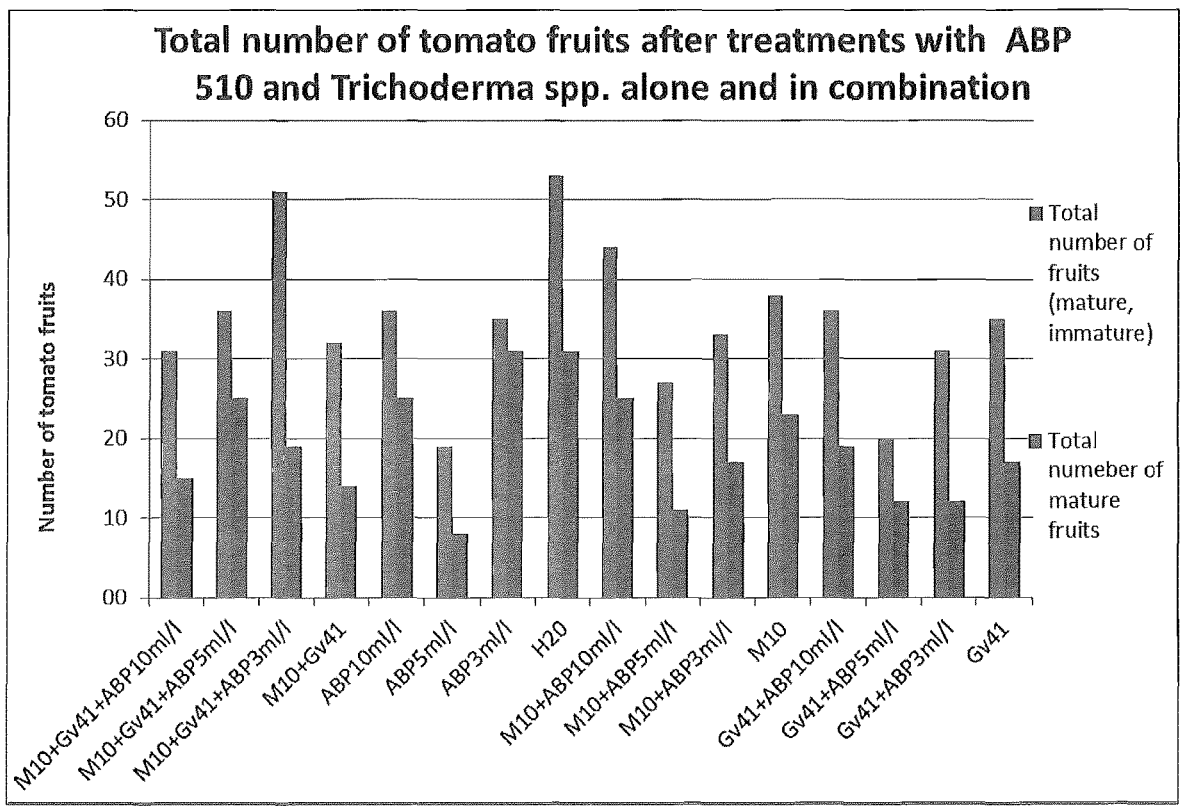
FIG. 57 shows the total number of tomato fruits for each treatment.

The results (FIGS. 55 to 57) show that the highest yield in terms of kg of tomato fruits per treatment occurred for the ABP-510 3 ml/L treatment. In fact, this treatment obtained the highest production of tomato fruits (in term of total kg per treatment) with an increase of the total yield of about 22% compared to water control and with a percentage of mature-red fruits of about 94%, and a mean weight per fruit of 35 g.

For the treatments with ABP-510 at concentrations of 5 and 10 ml/l the productive yield was lower compared to the water control with a decrease of about 40%.

For treatments carried out with mixtures of ABP and *Trichoderma* spp. the best combination was M10 +ABP-510 10 ml/L. This treatment resulted in an increase of the total yield (in term of total kg per treatment) with 90% mature-red fruits of mean weight of 38 g per fruit.

Example 3

Nematode Control

Example 3.1

In Vitro Testing

*Meloidogyne hapla* larvae were culture on tomato plants under controlled conditions and plants were uprooted in order to collect the egg-masses. The egg-mass were kept in small size (4 cm) petri plate containing a little amount of water at 25±1° C. in an incubator for hatching of second stage larvae.

For in vitro testing, twenty-four well ELISA plates were used to perform the in-vitro nematicidal bioassay of ABP and *Trichoderma* spp. For the ABP, treatment solutions with sterilized distilled water were applied on the wells to reach the final indicated concentration, followed a suspension of nematodes at 50 nematodes/well. For *Trichoderma* (applied as living conidia), the wells were filled with 1/5 of PDB (150 μl/well), sterilized distilled water (200 μl), *Trichoderma* conidial suspension (10 to the 7) in 200 μl and then 50 μl of nematode larvae suspension. The experiments were carried out under aseptic conditions and the ELISA plates were covered with its lid throughout the experiment duration. The PDB containing plates were kept at 25±1° C. for three days and others at room temperature. The quantification of nematode mortality was performed microscopically at various time intervals by counting the specimens immobilized or showing a slender form (dead nematodes).

For in vivo testing, twenty days old tomato (cv s marzano nano) seedling roots were dipped in the solutions according to the invention (fungal spore solutions were at $10^7$) containing the various active principles for 30 minute and then transplanted into soil/pots (each pot containing 100 gm sterilized mixture of 1:2 soil and perlite). Each treatment included at least 10 plants per plot with four replicates and arranged in a completely randomized design. One ml of the remaining active principle solution was drenched around each plant after transplantation. Eighteen to 24 hours after of transplantation of seedlings, 17 days old hatched $J_2$ of the nematodes were inoculated at a rate of 2500 $J_2$/pot near to plant roots. The plants were watered daily and drenched weekly with MS media nutrient starting after $3^{rd}$ week of nematodes inoculation. The measurements were made on shoot length, root length, fresh weight of shoot and root, number of galls per plant, chlorophyll contents and dry weight of shoot and roots of each plant.

Figure 28:
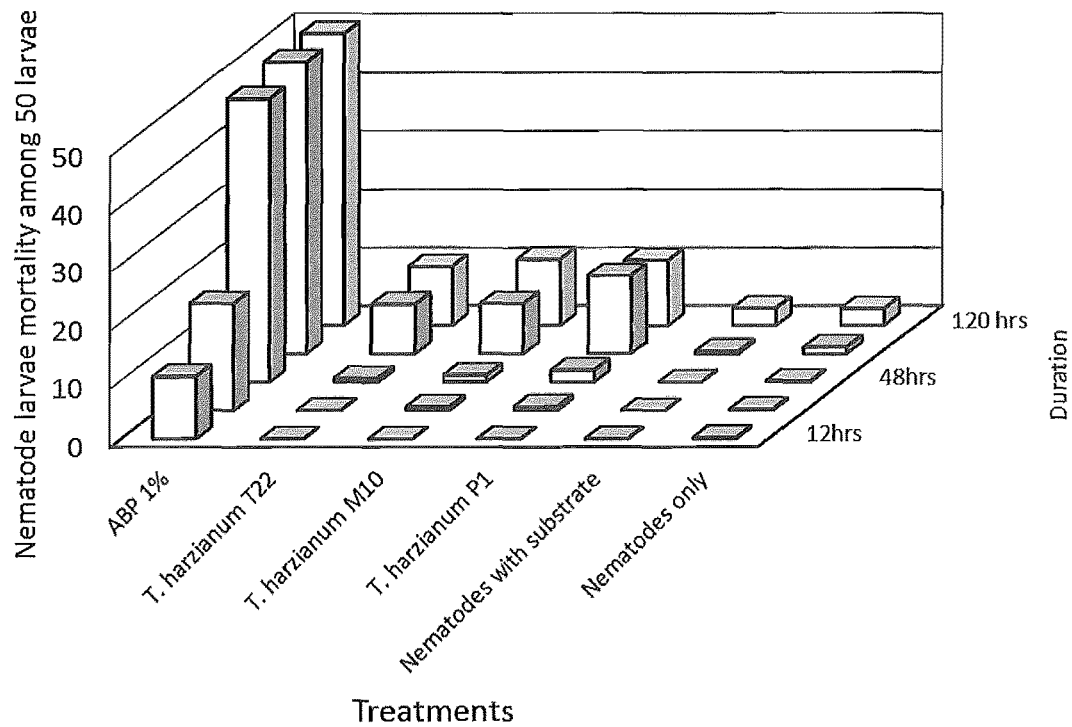
FIG. 28 shows the effect in vitro of ABP-510 and *Trichoderma* spp. on *Meloidogyne hapla* larvae.
Figure 29:
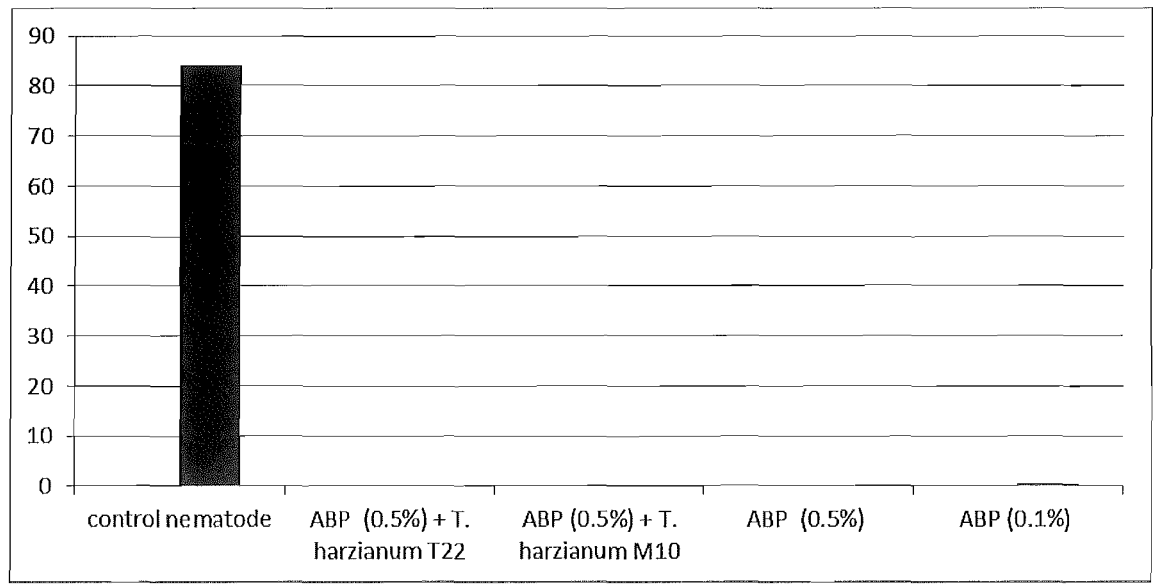
FIG. 29 shows the effect in vitro of ABP-510 plus *Trichoderma* spp. on *Meloidogyne hapla* adult survival (as measured by percentage of living nematodes).
Figure 30:
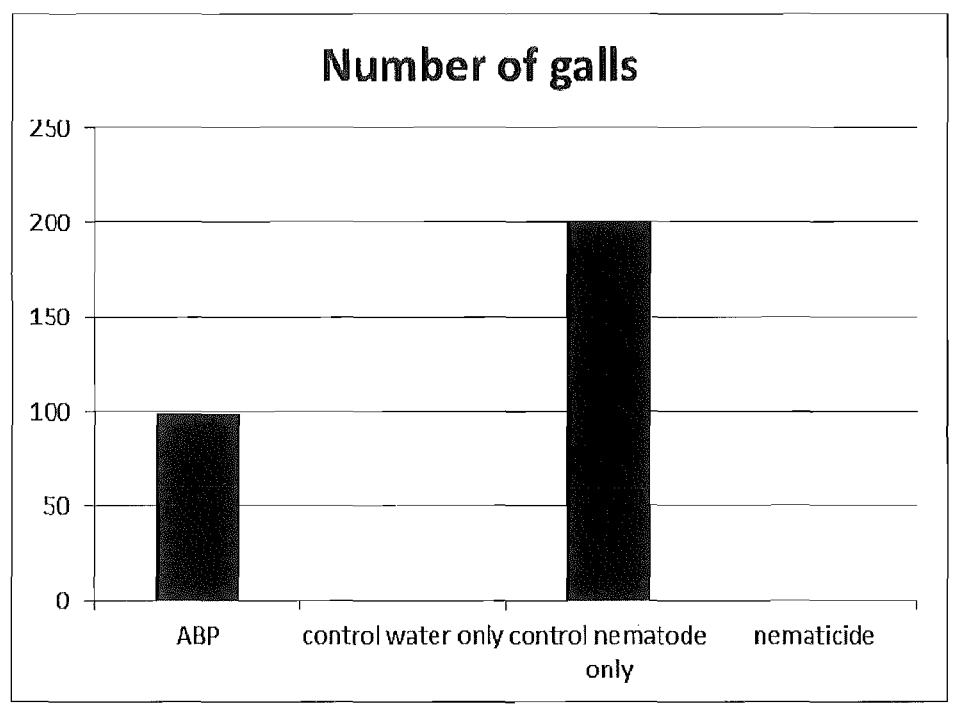
FIG. 30 shows the effect of ABP-510 on the number of galls produced by *Meloidogyne hapla* on tomato (average number of galls per plant).

The solutions which were tested comprised one or both of (i) spores of *Trichoderma harzianum* and (ii) ABP-510 at a concentration of 0.5% or 0.1%. The solutions comprising (i) and (ii) are solutions according to the invention. FIG. 28 shows the effect in vitro of ABP-510 and *Trichoderma* spp. on *Meloidogyne hapla* larvae as measured by nematode mortality. FIG. 29 shows the effect in vitro of ABP-510 plus *Trichoderma* spp. on *Meloidogyne hapla* adult survival (as measured by percentage of living nematodes). FIG. 30 shows the effect of ABP-510 on the number of galls produced by *Meloidogyne hapla* on tomato (average number of galls per plant).

What is claimed is:

1. method for controlling fungi or oomycetes at a locus, which method comprises treating the locus simultaneously or sequentially with:
    (a) one or more alkali metal salts of fatty acids, wherein the fatty acids are compounds of formula $RCO_2H$ where R is a saturated or unsaturated aliphatic hydrocarbon group, and wherein the fatty acids are selected from unsaturated and saturated $C_{12\text{-}24}$ fatty acids; and
    (b) a strain, culture, culture filtrate, spores, or mycelia of a species of a fungus or a metabolite produced by a species of a fungus, which strain, culture, culture filtrate, spores, mycelia, metabolite directly or indirectly (i) inhibits the growth or reproduction of plant pathogens or (ii) kills plant pathogens, wherein the fungus belongs to the genus *Trichoderma*.

2. A method according to claim 1 wherein the locus, the part or all of the plant itself, the seed from which the plant grows, or the place at which the plant grows, is treated with a frequency of from once every 3 days to once every 20 days, for a period of from 7 days to 100 days.

3. A method according to claim 1, wherein the locus, the part, or all of the plant itself, the seed from which the plant grows, or the place at which the plant grows, is treated with a composition comprising components (a) and (b).

4. A method according to claim 3, wherein the locus, the part or all of the plant itself, the seed from which the plant grows, or the place at which the plant grows, is treated with from 50 L/hectare to 2000 L/hectare of the composition.

5. A method according to claim 1, wherein the locus is a plant selected from tomato plants, grape plants, zucchini plants, pepper plants, bean plants, melon plants, and strawberry plants.

6. A method according to claim 1 wherein the fatty acids are selected from unsaturated and saturated $C_{14-22}$ fatty acids.

7. A method according to claim 1 wherein the fatty acids are selected from unsaturated and saturated $C_{14-22}$ fatty acids and the alkali metal salts are sodium or potassium salts.

8. A method according to claim 1 wherein the fatty acids are selected from unsaturated and saturated $C_{14-18}$ fatty acids and the alkali metal salts are sodium or potassium salts.

9. A method according to claim 1 wherein the fatty acids are selected from unsaturated and saturated $C_{14-18}$ fatty acids and the alkali metal salts are potassium salts.

\* \* \* \* \*